(12) United States Patent
Smith, Jr.

(10) Patent No.: US 9,732,906 B2
(45) Date of Patent: Aug. 15, 2017

(54) HYDROGEN ENERGY SYSTEMS

(71) Applicant: Paul H. Smith, Jr., Scottsdale, AZ (US)

(72) Inventor: Paul H. Smith, Jr., Scottsdale, AZ (US)

(*) Notice: Subject to any disclaimer, the term of this patent is extended or adjusted under 35 U.S.C. 154(b) by 635 days.

(21) Appl. No.: 13/949,199

(22) Filed: Jul. 23, 2013

(65) Prior Publication Data

US 2013/0306495 A1 Nov. 21, 2013

Related U.S. Application Data

(63) Continuation-in-part of application No. 13/397,611, filed on Feb. 15, 2012, now Pat. No. 8,651,270, which is a continuation-in-part of application No. 12/684,420, filed on Jan. 8, 2010, now Pat. No. 8,651,268, which is a continuation-in-part of application No. 12/212,571, filed on Sep. 17, 2008, now Pat. No. 9,123,925.

(60) Provisional application No. 61/443,599, filed on Feb. 16, 2011, provisional application No. 61/160,608, filed on Mar. 16, 2009, provisional application No. 61/143,272, filed on Jan. 8, 2009, provisional application No. 60/973,369, filed on Sep. 18, 2007, provisional application No. 61/022,572, filed on Jan. 22, 2008, provisional application No. 61/024,856, filed on Jan. 30, 2008, provisional application No. 61/675,295, filed on Jul. 24, 2012.

(51) Int. Cl.
| | | |
|---|---|---|
| *F17C 3/00* | (2006.01) | |
| *F17C 11/00* | (2006.01) | |
| *F02B 43/10* | (2006.01) | |
| *H01M 8/04* | (2016.01) | |
| *C01B 3/00* | (2006.01) | |
| *H01M 8/065* | (2016.01) | |
| *H01M 8/04082* | (2016.01) | |
| *C01B 3/04* | (2006.01) | |

(52) U.S. Cl.
CPC .............. *F17C 3/00* (2013.01); *C01B 3/0026* (2013.01); *C01B 3/0084* (2013.01); *C01B 3/04* (2013.01); *F17C 11/005* (2013.01); *H01M 8/04201* (2013.01); *H01M 8/04216* (2013.01); *H01M 8/065* (2013.01); *Y02E 60/321* (2013.01); *Y02E 60/327* (2013.01); *Y02E 60/364* (2013.01); *Y02E 60/50* (2013.01); *Y10T 29/49* (2015.01)

(58) Field of Classification Search
None
See application file for complete search history.

(56) References Cited

U.S. PATENT DOCUMENTS

| | | | |
|---|---|---|---|
| 4,361,461 A * | 11/1982 | Chang | ............... H01L 21/30621 204/192.32 |
| 5,360,461 A | 11/1994 | Meinzer | |
| 5,407,645 A | 4/1995 | Daeumer et al. | |
| 5,728,464 A | 3/1998 | Checketts | |

(Continued)

*Primary Examiner* — Colin W Slifka
(74) *Attorney, Agent, or Firm* — Lodestar Patents, PLLC; Raymond J. E. Hall

(57) ABSTRACT

Hydrogen energy systems for obtaining hydrogen gas from a solid storage medium using controlled lasers. Also disclosed are systems for charging/recharging magnesium with hydrogen to obtain magnesium hydride. Other relatively safe systems assisting storage, transport and use (as in vehicles) of such solid storage mediums are disclosed.

23 Claims, 23 Drawing Sheets

(56) References Cited

U.S. PATENT DOCUMENTS

| | | | |
|---|---|---|---|
| 5,817,157 A | 10/1998 | Checketts | |
| 6,319,565 B1 | 11/2001 | Todd | |
| 6,337,146 B1 | 1/2002 | Sogabe et al. | |
| 6,420,067 B1 | 7/2002 | Yoshioka | |
| 6,569,518 B2 | 5/2003 | Yadav | |
| 7,029,517 B2 | 4/2006 | Lemmon et al. | |
| 7,029,649 B2 | 4/2006 | Meisner et al. | |
| 7,169,489 B2 | 1/2007 | Redmond | |
| 7,279,222 B2 | 10/2007 | Hearley et al. | |
| 2004/0023087 A1 | 2/2004 | Redmond | |
| 2004/0065171 A1 | 4/2004 | Hearley et al. | |
| 2004/0213998 A1 | 10/2004 | Hearley et al. | |
| 2006/0013753 A1 | 1/2006 | Vajo et al. | |
| 2006/0013766 A1 | 1/2006 | Vajo et al. | |
| 2006/0041175 A1 | 2/2006 | Thorn et al. | |
| 2007/0237060 A1 | 10/2007 | Ohno et al. | |
| 2008/0274873 A1* | 11/2008 | Schubert | C01B 3/001 502/60 |
| 2009/0123360 A1* | 5/2009 | Mills | C01B 3/02 423/347 |
| 2010/0163434 A1 | 7/2010 | Smith, Jr. | |
| 2011/0000781 A1 | 1/2011 | Krishna et al. | |

\* cited by examiner

HYDROGEN ENERGY SYSTEMS

CROSS-REFERENCE TO RELATED APPLICATIONS

The present application is a continuation-in-part and is related to and claims priority from non-provisional patent application Ser. No. 13/397,611, filed Feb. 15, 2012 entitled "HYDROGEN ENERGY SYSTEMS", which is related to and claims priority from prior provisional application Ser. No. 61/443,599, filed Feb. 16, 2011, entitled "HYDROGEN ENERGY SYSTEMS" and which is additionally a continuation-in-part and is related to and claims priority from non-provisional patent application Ser. No. 12/684,420, filed Jan. 8, 2010, entitled "HYDROGEN ENERGY SYSTEMS", which is related to and claims priority from prior provisional application Ser. No. 61/160,608, filed Mar. 16, 2009, entitled "HYDROGEN ENERGY SYSTEMS"; and which is also related to and claims priority from prior provisional application Ser. No. 61/143,272, filed Jan. 8, 2009, entitled "HYDROGEN ENERGY SYSTEMS"; and which is further related to International Patent Application No. PCT/US2008/076900, filed Sep. 18, 2008, entitled "HYDROGEN ENERGY SYSTEMS"; and which is moreover is related to Canadian National Stage Patent Application No. 2,737,518, filed Mar. 16, 2011, entitled "HYDROGEN ENERGY SYSTEMS"; and which is even further related to European Regional Stage Patent Application No. 08 831 749.0, filed Apr. 19, 2010, entitled "HYDROGEN ENERGY SYSTEMS"; and which is additionally a continuation-in-part and is related to and claims priority from non-provisional patent application Ser. No. 12/212,571, filed Sep. 17, 2008, entitled "HYDROGEN ENERGY SYSTEMS", which claims priority to related prior provisional application Ser. No. 60/973,369, filed Sep. 18, 2007, entitled "HYDROGEN ENERGY SYSTEMS", prior provisional application Ser. No. 61/022,572, filed Jan. 22, 2008, entitled "HYDROGEN ENERGY SYSTEMS", and prior provisional application Ser. No. 61/024,856, filed Jan. 30, 2008, entitled "HYDROGEN ENERGY SYSTEMS"; and this application is also related to and claims priority from prior provisional application Ser. No. 61/675,295, filed Jul. 24, 2012, entitled "HYDROGEN ENERGY SYSTEMS"; and this application is further related to International Patent Application No. PCT/US2010/027548, filed Mar. 16, 2010, entitled "HYDROGEN ENERGY SYSTEMS"; and this application moreover is related to Korean National Stage Patent Application No. 10-2011-7024393, filed Oct. 17, 2011, entitled "HYDROGEN ENERGY SYSTEMS"; and this application additionally is related to Japanese National Stage Patent Application No. 2012-500908, filed Sep. 16, 2011, entitled "HYDROGEN ENERGY SYSTEMS"; and which is even further related to European Regional Stage Patent Application No. 10 754 015.5, filed Oct. 14, 2011, entitled "HYDROGEN ENERGY SYSTEMS"; and this application is further related to International Patent Application No. PCT/US2012/25466, filed Feb. 16, 2012, entitled "HYDROGEN ENERGY SYSTEMS"; the contents of all of which are incorporated herein by this reference and are not admitted to be prior art with respect to the present invention by the mention in this cross-reference section.

BACKGROUND

This invention relates to providing hydrogen energy systems. More particularly, this invention relates to providing hydrogen energy systems using magnesium hydride for hydrogen storage. Even more particularly, this invention relates to such hydrogen energy systems using laser excitation to assist adsorption of hydrogen gas from the magnesium hydride.

In using hydrogen energy systems, it is difficult to safely store hydrogen gas for use in providing energy for systems, such as vehicles, given the highly combustible nature of hydrogen. While hydrogen has a high energy to weight ratio, storage of hydrogen in a gaseous state (even compressed) yields a low energy to volume ratio making such storage impractical, particularly for mobile use. Thus, it would be useful to provide safe and compact storage of hydrogen energy near a location where hydrogen gas will be used for energy purposes.

OBJECTS AND FEATURES OF THE INVENTION

A primary object and feature of the present invention is to provide a system overcoming the above-mentioned problem.

It is a further object and feature of the present invention to provide such a hydrogen energy system wherein such magnesium hydride may be safely stored.

Another object and feature of the present invention is to provide such magnesium hydride in the form of a "disk" resembling a CD.

Yet another object and feature of the present invention is to provide a laser system to cooperate with the magnesium hydride disk to provide release of hydrogen gas therefrom.

A further object and feature of the present invention is to provide a laser system utilizing an array of lasers to cooperate with the magnesium hydride disk to provide release of hydrogen gas therefrom.

Yet another object and feature of the present invention is to provide controlled coherent light energy to successive portions of a surface of such magnesium hydride disk to provide controlled release of hydrogen gas.

A further object and feature of the present invention is to provide a system for recharging such disks with hydrogen after such controlled release of hydrogen gas.

Another object and feature of the present invention is to provide hydrogen energy for at least one vehicle, preferably an automobile, in the form of hydrogen gas controllably released from such storage in magnesium hydride disks.

Another primary object and feature of the present invention is to provide a system of manufacturing magnesium hydride disks, which disks may releasably store hydrogen within a compact volume.

A further object and feature of the present invention is to provide a system of manufacturing magnesium hydride disks, which disks are perforated to expose a large surface area of interaction and may releasably store hydrogen within a compact volume.

A further primary object and feature of the present invention is to provide such hydrogen energy systems that are efficient, inexpensive, and handy. Other objects and features of this invention will become apparent with reference to the following descriptions.

SUMMARY OF THE INVENTION

In accordance with a preferred embodiment hereof, this invention provides a hydrogen energy method comprising the steps of: using at least one material deposition apparatus structured and arranged to manufacture at least one hydrogen storer; and manufacturing such at least one hydrogen storer structured and arranged to store at least one substantial amount of hydrogen; wherein such at least one hydrogen storer comprises at least one hydrogen-release permitter structured and arranged to permit photonic-excitation-assisted release of stored hydrogen from such at least one hydrogen storer; and providing such at least one hydrogen storer to assist at least one commercial use of hydrogen gas. Moreover, it provides such a hydrogen energy method wherein the step of using at least one material deposition apparatus comprises the step of using at least one filtered cathodic arc deposition apparatus. Additionally, it provides such a hydrogen energy method wherein the step of manufacturing such at least one hydrogen storer comprises the step of forming at least one layer of hydrogen storer material. Also, it provides such a hydrogen energy method wherein such hydrogen storer material comprises magnesium.

In addition, it provides such a hydrogen energy method wherein such hydrogen storer material comprises magnesium hydride. And, it provides such a hydrogen energy method wherein the step of manufacturing such at least one hydrogen storer further comprises the step of forming alternating layers comprising such at least one layer of hydrogen storer material and at least one layer of Nitinol. Further, it provides such a hydrogen energy method wherein such hydrogen storer material comprises magnesium. Even further, it provides such a hydrogen energy method wherein such hydrogen storer material comprises magnesium hydride. Moreover, it provides such a hydrogen energy method wherein the step of forming at least one layer of hydrogen storer material comprises the step of deposition of such hydrogen storer material on at least one substrate structured and arranged to receive deposition of such hydrogen storer material. Additionally, it provides such a hydrogen energy method wherein such at least one substrate comprises stainless steel. Also, it provides such a hydrogen energy method wherein such hydrogen storer material comprises magnesium. In addition, it provides such a hydrogen energy method wherein such at least one substrate comprises Nitinol.

And, it provides such a hydrogen energy method wherein such hydrogen storer material comprises magnesium hydride. Further, it provides such a hydrogen energy method wherein such at least one hydrogen storer comprises a thickness greater than about 15 microns. Even further, it provides such a hydrogen energy method wherein such at least one hydrogen storer comprises a thickness between about 15 microns and about 30 microns. Moreover, it provides such a hydrogen energy method of Claim 1 further comprising the step of forming at least one pattern of cavities structured and arranged to provide substantially uniform porosity. Additionally, it provides such a hydrogen energy method wherein such at least one pattern of cavities comprises at least one angle, with respect to at least one surface of hydrogen storer material, of about 45°. Also, it provides such a system wherein each of such cavities comprises a diameter of about 50 µm. In addition, it provides such a hydrogen energy method wherein the step of forming at least one layer of hydrogen storer material comprise the step of creating at least one magnetic field encompassing such hydrogen storer material during formation of such at least one layer. And, it provides such a hydrogen energy method wherein the step of manufacturing such at least one hydrogen storer comprises the step of forming such at least one hydrogen storer as a disk.

In accordance with another preferred embodiment hereof, this invention provides a hydrogen energy system comprising: at least one hydrogen storer structured and arranged to store at least one substantial amount of hydrogen; wherein such at least one hydrogen storer comprises at least one hydrogen-release permitter structured and arranged to permit photonic-excitation-assisted release of stored hydrogen from such at least one hydrogen storer, and a unified matrix of granules in a material structured and arranged to cyclically store hydrogen and release stored hydrogen; and wherein controlled storage and release of hydrogen is achieved to assist at least one commercial use. Further, it provides such a hydrogen energy system wherein such a unified matrix of granules comprises grain sizes less than about 300 nm. Even further, it provides such a hydrogen energy system wherein such a unified matrix of granules comprises grain sizes less than about 150 nm.

In accordance with another preferred embodiment hereof, this invention provides a hydrogen energy system comprising: at least one hydrogen storer structured and arranged to store at least one substantial amount of hydrogen; wherein such at least one hydrogen storer comprises at least one hydrogen-release permitter structured and arranged to permit photonic-excitation-assisted release of stored hydrogen from such at least one hydrogen storer, and a unified matrix of granules in a material structured and arranged to cyclically store hydrogen and release stored hydrogen; and at least one photonic exciter structured and arranged to photonically excite such at least one hydrogen storer to assist release of such stored hydrogen from such at least one hydrogen storer; wherein such at least one photonic exciter comprises at least one controller structured and arranged to control such photonic-excitation-assisted release of hydrogen; and wherein controlled storage and release of hydrogen is achieved to assist at least one commercial use.

In accordance with another preferred embodiment hereof, this invention provides a hydrogen energy system comprising: at least one hydrogen storer structured and arranged to store at least one substantial amount of hydrogen; wherein such at least one hydrogen storer comprises at least one hydrogen-release permitter structured and arranged to permit photonic-excitation-assisted release of stored hydrogen from such at least one hydrogen storer; and at least one photonic exciter structured and arranged to photonically excite such at least one hydrogen storer to assist release of such stored hydrogen from such at least one hydrogen storer; wherein such at least one photonic exciter comprises at least one controller structured and arranged to control such photonic-excitation-assisted release of hydrogen gas so as to assist at least one commercial use. Moreover, it provides such a hydrogen energy system wherein such at least one hydrogen-release permitter comprises at least one plasmonic-effect-capable dielectric structured and arranged to permit creation of surface plasmon polaritons. Additionally, it provides such a hydrogen energy system wherein such at least one plasmonic-effect-capable dielectric comprises at least one super-elastic material layer structured and arranged to permit resilience through multiple absorption-desorption cycles. Also, it provides such a hydrogen energy system wherein such at least one photonic exciter comprises at least one array of lasers. In addition, it provides such a hydrogen energy system wherein such at least one plasmonic-effect-capable dielectric comprises at least Nitinol and magnesium.

In accordance with another preferred embodiment hereof, this invention provides a hydrogen energy system comprising: at least one metal surface portion capable of absorbing hydrogen; at least one supply of hydrogen gas; and at least one electromagnetic field generator structured and arranged to generate at least one electromagnetic field sufficient to form at least one supply of hydrogen plasma; wherein such at least one electromagnetic field generator is located in at least one position such that such at least one supply of hydrogen plasma is located in at least one second position; and at least one metal surface locator structured and arranged to locate such at least one metal surface portion within such at least one second position; wherein such at least one metal surface portion may absorb hydrogen to form at least one metal hydride surface portion. And, it provides such a hydrogen energy system wherein such at least one metal surface portion comprises at least one plasmonic-effect-capable dielectric structured and arranged to permit creation of surface plasmon polaritons. Further, it provides such a hydrogen energy system wherein such at least one plasmonic-effect-capable dielectric comprises at least one super-elastic material layer structured and arranged to permit resilience through multiple absorption-desorption cycles. Even further, it provides such a hydrogen energy system wherein such at least one plasmonic-effect-capable dielectric comprises at least Nitinol and magnesium. Moreover, it provides such a system according to Claim 7 wherein such at least one metal surface portion comprises at least one pattern of cavities structured and arranged to provide substantially uniform porosity. Additionally, it provides such a system wherein such at least one pattern of cavities comprises at least one angle, with respect to such at least one metal surface portion, of about 45°. Also, it provides such a system wherein each of such cavities comprises a diameter of about 50 µm. In addition, it provides such a system wherein such at least one metal surface portion comprises magnesium hydride.

In accordance with another preferred embodiment hereof, this invention provides a method, relating to manufacturing at least one hydrogen storer, comprising the steps of: vapor depositing at least one hydrogen storer material adapted to store hydrogen onto at least one substrate; wherein such at least one hydrogen storer material and such at least one substrate comprise at least one plasmonic-effect-capable dielectric structured and arranged to permit creation of surface plasmon polaritons; cutting such at least one hydrogen storer material into at least one geometric shape; and perforating such at least one hydrogen storer material; wherein such method produces at least one hydrogen storer. And, it provides such a method wherein such at least one geometric shape comprises at least one disk. Further, it provides such a method wherein the step of perforating comprises the step of drilling at least one hole. Even further, it provides such a method wherein the step drilling comprises at least one laser. Even further, it provides such a method wherein such at least one chemical comprises HCl. Even further, it provides such a method wherein such at least one substrate comprises at least one super-elastic material structured and arranged to permit resilience through multiple absorption-desorption cycles. Even further, it provides such a method wherein such at least one hydrogen storer material comprises magnesium.

In accordance with another preferred embodiment hereof, this invention provides a process, relating to controlled commercial use of hydrogen gas, comprising the steps of: providing at least one supply of hydrogen gas; and providing at least one electromagnetic field sufficient to form at least one supply of hydrogen plasma; wherein such at least one supply of hydrogen plasma is formed adjacent to at least one metal surface portion capable of storing hydrogen; and wherein such at least one metal surface portion absorbs hydrogen from such at least one supply of hydrogen plasma to form at least one metal hydride; and providing at least one hydrogen storer structured and arranged to store, using such at least one metal hydride, at least one substantial amount of hydrogen so as to permit photonic-excitation-assisted release of stored hydrogen; using at least one photonic exciter to photonically excite such at least one hydrogen storer to assist release of such stored hydrogen as hydrogen gas; and controlling such photonic-excitation-assisted release of such hydrogen gas so as to assist at least one commercial use.

In accordance with another preferred embodiment hereof, this invention provides a hydrogen energy system comprising: at least one hydrogen storer structured and arranged to store at least one substantial amount of hydrogen; wherein such at least one hydrogen storer comprises at least one hydrogen-release permitter structured and arranged to permit photonic-excitation-assisted release of stored hydrogen from such at least one hydrogen storer; and at least one photonic exciter structured and arranged to photonically excite such at least one hydrogen storer to assist release of such stored hydrogen from such at least one hydrogen storer; wherein such at least one photonic exciter comprises at least one controller structured and arranged to control such photonic-excitation-assisted release of hydrogen gas so as to assist at least one commercial use.

In accordance with a preferred embodiment hereof, this invention also provides a hydrogen energy system comprising: at least one hydrogen storer structured and arranged to store at least one substantial amount of hydrogen; wherein such at least one hydrogen storer comprises at least one hydrogen-release permitter structured and arranged to permit photonic-excitation-assisted release of stored hydrogen from such at least one hydrogen storer; and at least one photonic exciter structured and arranged to photonically excite such at least one hydrogen storer to assist release of the stored hydrogen from such at least one hydrogen storer; wherein such at least one photonic exciter comprises at least one controller structured and arranged to control photonic-excitation-assisted release of hydrogen; and at least one hydrogen collector structured and arranged to assist collection of released hydrogen; wherein hydrogen may be stored in such at least one hydrogen storer until controllably released to permit use as desired.

Moreover, it provides such a hydrogen energy system wherein such at least one photonic exciter comprises at least one wavelength of light between about 530 nm and about 1700 nm. Additionally, it provides such a hydrogen energy system wherein such at least one photonic exciter comprises at least one wavelength of light of about 784 nm. Also, it provides such a hydrogen energy system wherein such at least one photonic exciter comprises at least one power between about 200 mW and about 2000 mW. In addition, it provides such a hydrogen energy system wherein such at least one photonic exciter comprises at least one power of about 200 mW.

And, it provides such a hydrogen energy system wherein such at least one hydrogen collector comprises at least one negative pressure environment. Further, it provides such a hydrogen energy system wherein such at least one negative pressure environment comprises at least one pressure between about negative one millimeter of mercury and about negative two atmospheres. Even further, it provides such a hydrogen energy system wherein such at least one negative pressure environment comprises at least one pressure of about negative one atmosphere.

Moreover, it provides such a hydrogen energy system wherein such at least one photonic exciter comprises at least one beam of light with at least one radius of between about 10 nm and about 2 mm. Additionally, it provides such a hydrogen energy system wherein such at least one photonic exciter comprises at least one beam of light with at least one radius of about 15 nm. Also, it provides such a hydrogen energy system wherein such at least one photonic exciter is structured and arranged to excite at least one portion of such at least one hydrogen storer to induce at least one temperature between about 280° C. and about 390° C. in such at least one portion. In addition, it provides such a hydrogen energy system wherein such at least one hydrogen storer comprises at least one hydride.

In accordance with another preferred embodiment hereof, this invention provides a hydrogen energy system comprising: at least one metal surface portion capable of absorbing hydrogen; at least one supply of hydrogen gas; and at least one electromagnetic field generator structured and arranged to generate at least one electromagnetic field sufficient to form at least one supply of hydrogen plasma; wherein such at least one electromagnetic field generator is located in at least one position such that such at least one supply of hydrogen plasma is located in at least one second position; and at least one metal surface locator structured and arranged to locate such at least one metal surface portion within such at least one second position; wherein such at least one metal surface portion may absorb hydrogen to form at least one metal hydride surface portion.

And, it provides such a hydrogen energy system wherein such at least one electromagnetic field generator comprises: at least one microwave field generator; and at least one radio wave field generator. Further, it provides such a hydrogen energy system wherein such at least one microwave field generator comprises at least two microwave field generators.

In accordance with another preferred embodiment hereof, this invention provides a hydrogen energy system comprising: at least one hydrogen storer comprising at least one disk structured and arranged to store at least one substantial amount of hydrogen; wherein such at least one hydrogen storer comprises at least one central spin axis locator structured and arranged to locate at least one central spin axis of such at least one disk; and wherein such at least one disk may rotate about such at least one central spin axis of such at least one disk; and wherein such at least one disk comprises at least one spinner motor gripper capable of being gripped by at least one motor driven spinner; wherein such at least one spinner motor gripper is substantially concentric to such at least one central spin axis; wherein such at least one spinner motor gripper is structured and arranged to assist enabling such at least one disk to be spun about such at least one central spin axis of such at least one disk by such at least one motor driven spinner; and wherein such at least one disk is structured and arranged to spin substantially stably.

Even further, it provides such a hydrogen energy system wherein such at least one disk further comprises at least one outer diameter between about 50 mm and about 150 mm. Moreover, it provides such a hydrogen energy system wherein such at least one disk further comprises at least one outer diameter of about 120 mm. Additionally, it provides such a hydrogen energy system wherein such at least one central spin axis locator comprises at least one diameter between about 5 mm and about 15 mm. Also, it provides such a hydrogen energy system wherein such at least one central spin axis locator comprises at least one diameter of about 15 mm.

In addition, it provides such a hydrogen energy system wherein such at least one disk comprises at least one hydride disk. And, it provides such a hydrogen energy system wherein such at least one hydride disk further comprises at least one outer diameter between about 50 mm and about 150 mm. Further, it provides such a hydrogen energy system wherein such at least one hydride disk further comprises at least one outer diameter of about 120 mm. Even further, it provides such a hydrogen energy system wherein such at least one central spin axis locator comprises at least one diameter between about 5 mm and about 15 mm. Moreover, it provides such a hydrogen energy system wherein such at least one central spin axis locator comprises at least one diameter of about 15 mm.

Additionally, it provides such a hydrogen energy system wherein such at least one hydride disk comprises at least one thickness of about one millimeter. Also, it provides such a hydrogen energy system wherein such at least one hydride disk further comprises at least one metal hydride. In addition, it provides such a hydrogen energy system wherein such at least one hydride disk substantially comprises magnesium hydride. And, it provides such a hydrogen energy system wherein such at least one hydride disk comprises hydrogenated AZ31B.

Further, it provides such a hydrogen energy system wherein such at least one hydride disk further comprises at least one catalyst structured and arranged to assist hydrogenation of such at least one hydride disk. Even further, it provides such a hydrogen energy system wherein such at least one catalyst comprises nickel. Moreover, it provides such a hydrogen energy system wherein such at least one catalyst comprises palladium. Additionally, it provides such a hydrogen energy system wherein such at least one catalyst comprises titanium. Also, it provides such a hydrogen energy system wherein such at least one hydride disk comprises surface irregularities of less than about two micrometers. In addition, it provides such a hydrogen energy system further comprising at least one disk coating comprising at least one optically clear mineral oil.

And, it provides such a hydrogen energy system further comprising: at least one photonic-exciter structured and arranged to photonically excite such at least one hydrogen storer to assist release of the stored hydrogen from such at least one hydrogen storer; and wherein such at least one hydrogen storer comprises at least one hydrogen-release permitter structured and arranged to permit photonic-excitation-assisted release of stored hydrogen from such at least one hydrogen storer; and wherein such at least one photonic-exciter comprises at least one controller structured and arranged to control photonic-excitation-assisted release of hydrogen; and at least one hydrogen collector structured and arranged to assist collection of released hydrogen; and wherein hydrogen may be stored in such at least one hydrogen storer until controllably released permitting use as desired.

Further, it provides such a hydrogen energy system wherein such at least one disk comprises at least one hydride. The hydrogen energy system wherein such at least one disk is stored in at least one optically clear mineral oil. Even further, it provides such a hydrogen energy system wherein such at least one hydrogen collector further comprises at least one mineral oil condenser structured and arranged to assist collection of mineral oil vaporized during such photonic-exciter-assisted release of hydrogen.

Moreover, it provides such a hydrogen energy system further comprising: at least one hydrogen fuel user structured and arranged to use hydrogen as at least one fuel in at least one vehicle; wherein such at least one hydrogen fuel user comprises at least one energy converter structured and arranged to assist conversion of collected hydrogen through at least one energy-conversion process; and wherein such at least one energy-conversion process provides energy to operate such at least one vehicle. Additionally, it provides such a hydrogen energy system further comprising at least one hydrogen container structured and arranged to contain at least one volume of hydrogen sufficient to supply increased fuel demand from such at least one vehicle during acceleration. Also, it provides such a hydrogen energy system wherein such at least one energy converter comprises at least one combustion engine.

In addition, it provides such a hydrogen energy system further comprising at least one hydrogen container structured and arranged to contain at least one volume of hydrogen sufficient to supply increased fuel demand from such at least one vehicle during acceleration. And, it provides such a hydrogen energy system wherein such at least one energy converter comprises at least one hydrogen fuel cell.

Further, it provides such a hydrogen energy system further comprising: at least one supply of hydrogen gas; and at least one electromagnetic field generator structured and arranged to generate at least one electromagnetic field sufficient to form at least one supply of hydrogen plasma; wherein such at least one electromagnetic field generator is located in at least one position such that the at least one supply of hydrogen plasma is located in at least one second position; and wherein such at least one hydrogen storer further comprises at least one metal surface portion capable of absorbing hydrogen; and at least one metal surface locator structured and arranged to locate such at least one metal surface portion within such at least one second position; wherein such at least one metal surface portion may absorb hydrogen to form at least one metal hydride surface portion.

Even further, it provides such a hydrogen energy system wherein a plurality of such at least one hydrogen storers locate serially through such at least one second position. Moreover, it provides such a hydrogen energy system wherein such at least one hydride disk is stored in at least one optically clear mineral oil. Additionally, it provides such a hydrogen energy system wherein such plurality of such at least one hydrogen storers may remain in such at least one optically clear mineral oil.

In accordance with another preferred embodiment hereof, this invention provides a process, relating to use of hydrogen, comprising the steps of: providing at least one supply of hydrogen gas; and providing at least one electromagnetic field sufficient to form at least one supply of hydrogen plasma; wherein such at least one hydrogen plasma is formed adjacent to at least one metal surface portion capable of storing hydrogen; and wherein such at least one metal surface portion may absorb hydrogen from such at least one supply of hydrogen plasma to form at least one metal hydride.

In accordance with another preferred embodiment hereof, this invention provides a process, relating to use of hydrogen, comprising the steps of: providing at least one hydride disk capable of releasing hydrogen through photonically induced heating; removing at least one hydrogen-expended hydride disk from at least one vehicle; replacing such at least one hydrogen-expended hydride disk with such at least one hydride disk; and disposing of such at least one hydrogen-expended hydride disk. Also, it provides such a process wherein such step of disposing comprises recycling of such at least one hydrogen-expended hydride disk.

In accordance with another preferred embodiment hereof, this invention provides a process, relating to use of hydrogen, comprising the steps of: providing at least one hydrogen-expended hydride disk capable of being recycled; purging such at least one hydrogen-expended hydride disk of any unreleased hydrogen; and recharging such purged at least one hydrogen-expended hydride disk with hydrogen forming at least one hydride disk capable of releasing hydrogen through photonically induced heating.

In accordance with another preferred embodiment hereof, this invention provides a hydrogen energy system comprising: at least one hydrogen storer structured and arranged to store at least one substantial amount of hydrogen; wherein such at least one hydrogen storer comprises at least one substantially full state when such at least one hydrogen storer stores such at least one substantial amount of hydrogen; wherein such at least one hydrogen storer comprises at least one substantially empty state when such at least one hydrogen storer stores substantially no amount hydrogen; and wherein such at least one hydrogen storer comprises at least one substantial variation between transparency of such at least one substantially full state and transparency of such at least one substantially empty state; and at least one transparency variation detection device structured and arranged to detect such at least one substantial variation in transparency of such at least one hydrogen storer; at least one transparency variation data collector structured and arranged to collect transparency variation data from such at least one transparency variation detection device; and at least one transparency variation data processor structured and arranged to evaluate collected transparency variation data; wherein such evaluation results in at least one value indicative of hydrogen content of such system.

In accordance with another preferred embodiment hereof, this invention provides a hydrogen energy system comprising: hydrogen storer means for storing at least one substantial amount of hydrogen; wherein such hydrogen storer means comprises hydrogen-release permitter means for permitting photonic-excitation-assisted release of stored hydrogen from such hydrogen storer means; and photonic-exciter means for photonically exciting such hydrogen storer means to assist release of the stored hydrogen from such hydrogen storer means; wherein such photonic-exciter means comprises controller means for controlling photonic-excitation-assisted release of hydrogen; and hydrogen collector means for assisting collecting released hydrogen; wherein hydrogen may be stored in such hydrogen storer means until controllably released to permit use as desired.

In accordance with another preferred embodiment hereof, this invention provides a hydrogen energy system comprising: metal surface portion means for providing at least one metal surface portion capable of absorbing hydrogen; hydrogen supply means for providing at least one supply of hydrogen gas; and electromagnetic field generator means for generating at least one electromagnetic field sufficient to form at least one supply of hydrogen plasma; wherein such electromagnetic field generator means is located in at least one position such that the at least one supply of hydrogen plasma is located in at least one second position; and metal surface locator means for locating such metal surface portion means within such at least one second position; wherein such metal surface portion means may absorb hydrogen to form at least one metal hydride surface portion.

In accordance with another preferred embodiment hereof, this invention provides a hydrogen energy system comprising: hydrogen storer means, comprising at least one disk, for storing at least one substantial amount of hydrogen; wherein such hydrogen storer means comprises central spin axis locator means for locating at least one central spin axis of such at least one disk; wherein such at least one disk may rotate about such at least one central spin axis of such at least one hydride disk; wherein such hydrogen storer means comprises spinner motor gripper means for being by at least one motor driven spinner; wherein such spinner motor gripper means is substantially concentric to such at least one central spin axis; wherein such spinner motor gripper means enables such at least one disk to be spun about such at least one central spin axis of such at least one disk by such at least one motor driven spinner; and wherein during spinning, such at least one disk spins substantially stably.

In accordance with another preferred embodiment hereof, this invention provides such a system wherein such at least one metal surface portion comprises at least one pattern of cavities structured and arranged to provide substantially uniform porosity. In accordance with another preferred embodiment hereof, this invention provides such a system wherein such at least one pattern of cavities comprises at least one angle, with respect to such at least one metal surface portion, of about 45°. In accordance with another preferred embodiment hereof, this invention provides such a system wherein each of such cavities comprises a diameter of about 50 µm. In accordance with another preferred embodiment hereof, this invention provides a system wherein such at least one metal surface portion comprises precipitated magnesium plate adapted to be cut into disks and contain such holes. In accordance with another preferred embodiment hereof, this invention provides such a system wherein such at least one metal surface portion comprises magnesium hydride. In accordance with another preferred embodiment hereof, this invention provides such a system wherein such at least one metal surface portion comprises a plurality of non-porous strut portions structured and arranged to add stiffness. In accordance with another preferred embodiment hereof, this invention provides such a system wherein such at least one metal surface portion comprises at least one thin, stiff non-magnesium frame structured and arranged to add stiffness. In accordance with another preferred embodiment hereof, this invention provides such a system wherein such at least one metal surface portion comprises at least one thin surface-coating substantially comprising nickel and $Mg_2Ni$. And, it provides such a system wherein such at least one photonic exciter comprises at least one array of lasers. In accordance with another preferred embodiment hereof, this invention provides such a system wherein such at least one catalyst comprises nickel. In accordance with another preferred embodiment hereof, this invention provides such a system wherein such at least one catalyst comprises palladium.

In accordance with another preferred embodiment hereof, this invention provides a method, relating to manufacturing at least one hydrogen storer, comprising the steps of: precipitating at least one hydrogen storer material adapted to store hydrogen; cutting such at least one hydrogen storer material into at least one geometric shape; perforating such at least one hydrogen storer material; etching at least one surface of such at least one hydrogen storer material with at least one chemical; washing such at least one surface to remove such at least one chemical; embedding, in such at least one surface, at least one catalyst structured and arranged to assist hydrogenation of such at least one surface; coating such at least one surface with at least one surface reaction preventer; whereby such method produces at least one hydrogen storer. Further, it provides such a method wherein such at least one geometric shape comprises at least one disk. Even further, it provides such a method wherein the step of perforating comprises the step of drilling at least one hole. Even further, it provides such a method wherein the step drilling comprises at least one laser. Even further, it provides such a method wherein such at least one chemical comprises HCl. Even further, it provides such a method wherein such at least one surface reaction preventer comprises nickel and $Mg_2Ni$. Even further, it provides such a method wherein such at least one hydrogen storer material comprises magnesium. In accordance with preferred embodiments hereof, this invention provides for each and every novel feature, element, combination, step and/or method disclosed or suggested by this patent application.

DETAILED DESCRIPTION OF THE BEST MODES AND PREFERRED EMBODIMENTS OF THE INVENTION

Hydrogen absorption within reversible metal hydrides (including metal alloys) may be used as hydrogen storage devices. Applicant has found, by testing, that adsorbing hydrogen (as by destabilizing hydrogen bonds) from such metal hydrides at reasonable temperatures and with reasonable energy expenditures may be best accomplished by very finely controlled heating. It has been found that this may provide an economical return of greater than about 5% (by weight) of hydrogen from a storage medium, with minimal energy consumption and system weight.

It is desirable to increase the absorbed hydrogen mass within the metal hydride while simultaneously reducing the energy required to release the hydrogen. Applicant has found that metallic alloys and metallic capping layers, along with metal-doped chemical and organic carriers, are excellent storage media for hydrogen. However, one primary obstacle to releasing hydrogen, from such storage media, is a need for heat, since decomposition temperatures are typically greater than 200° C.

Figure 1:
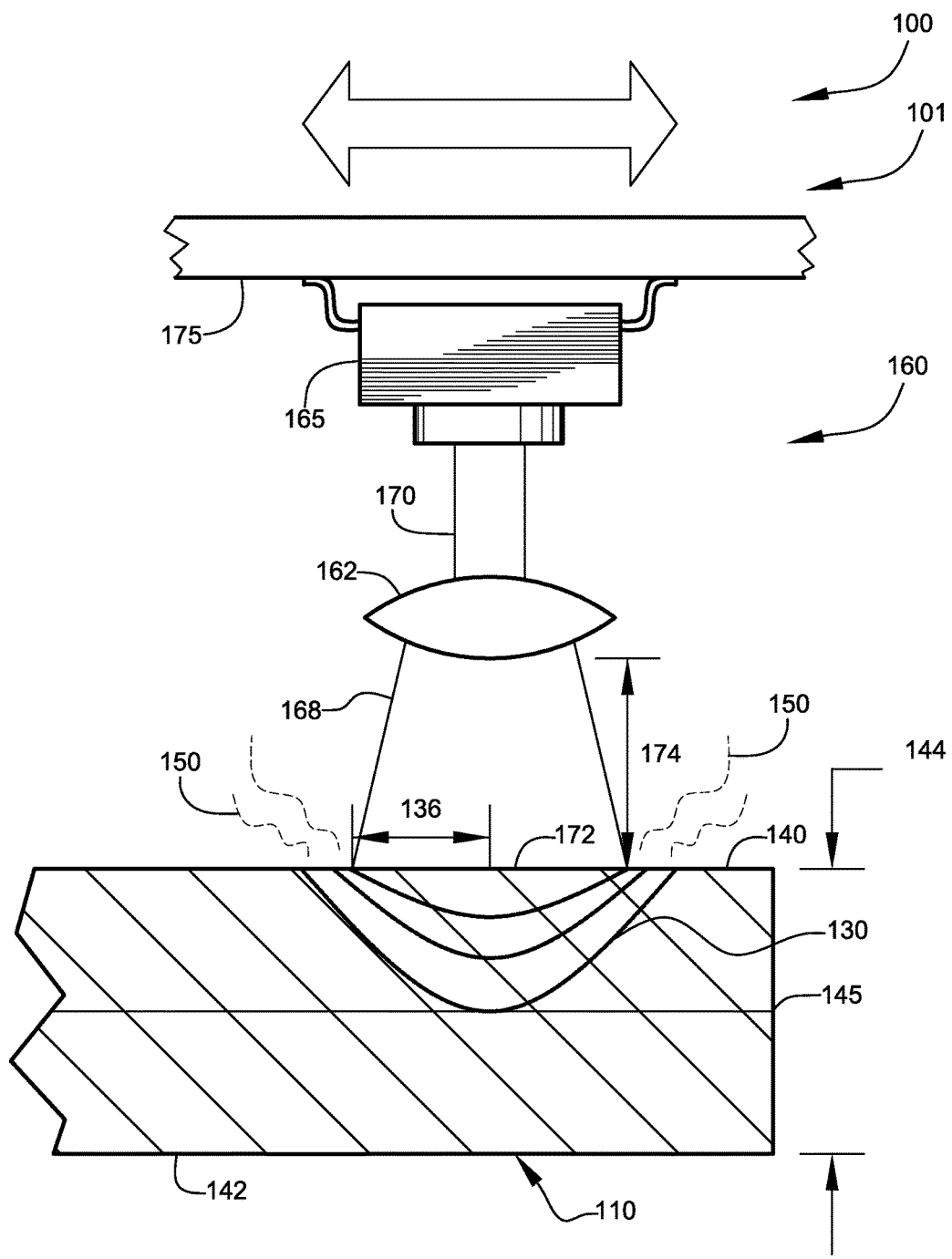
FIG. 1 shows a partial side view of a preferred hydride disk, illustrating release of hydrogen gas, preferably by laser heating, according to a preferred embodiment of the present invention.

Applicant has determined that laser heating of magnesium hydride is one preferred method for extracting hydrogen, with available technology and minimal energy cost. Employment of at least one laser diode, using pulsed-power, preferably provides ample heating of magnesium hydride to release hydrogen, as shown in FIG. 1. Applicant has found, including through experimentation, that less than about 80 continuous watts are needed to heat enough magnesium hydride to release about 10 lbs (4.5 kg) of hydrogen at rates of up to about 2 lbs (0.9 kg) per hour. Such rates of hydrogen may theoretically provide internal combustion, hybrid, and hydrogen-fuel-cell vehicles a range in excess of about 200 miles, while adding less than about 330 lbs (150 kg) and about 6.3 cubic feet (0.18 cubic meters) or about 47 gallons (178 liters). Conventional CD (compact disk) motors, along with modified laser circuitry, may preferably expose at least one magnesium hydride disk to at least one laser beam at rotations of up to about 24,000 rpm.

FIG. 1 shows a partial side view of at least one hydride disk 110, illustrating release of hydrogen gas 150 preferably by laser heating, according to a preferred embodiment of the present invention. Hydrogen energy system 100 preferably comprises embodiment 101, as shown. Hydride disk 110 preferably comprises at least one metal hydride, preferably substantially magnesium hydride. As discussed herein, concentration of hydrogen, stored in hydride disk 110, preferably should be greater than about 5% by weight, for economical efficiency. Magnesium hydride theoretically maximally stores about 7.6% hydrogen by weight. Upon reading this specification, those skilled in the art will now appreciate that, under appropriate circumstances, considering such things as then available forms of metal hydride, abilities to place such forms in a rotatable "disk" shape structure for use with controlled laser heating, etc., other "disks" than unitary and/or complete "disks", such segmented, liquid, or non-unitary "disks", etc., may suffice.

Heating of hydride disk 110 preferably comprises localized heating by photonic excitation using at least one coherent light source 160, as shown. Coherent light source 160 preferably comprises at least one semiconductor laser diode 165, as shown. Upon reading this specification, those skilled in the art will now appreciate that, under appropriate circumstances, considering such things as then available light sources, cost, used hydrogen storage medium, etc., other light sources, such as focused sunlight, phosphorescent light, biochemical light, etc., may suffice. Semiconductor laser diode 165 preferably produces a beam of coherent light 170, as shown, preferably between about 530 nm and about 1700 nm in wavelength, preferably about 784 nm in wavelength and with preferably between about 200 mW and about 2000 mW of power, preferably about 200 mW of power. Upon reading this specification, those skilled in the art will now appreciate that, under appropriate circumstances, considering such things as then available lasers, cost, used hydrogen storage medium, etc., other wavelengths of coherent light, such as other infrared wavelengths, visible spectrum, ultraviolet, etc., may suffice. To assist keeping semiconductor laser diode 165 from overheating, power is preferably pulsed instead of continuous.

Preferably, as coherent light 170 adsorbs hydrogen gas 150, size of hydride disk 110 will preferably initially increase due to thermal expansion and then preferably reduce to pre-hydrogenated volumes. Some small amount of hydrogen movement from higher concentration to lower concentration theoretically can be expected in hydride disk 110 after adsorption of a particular track; but applicant has found such movement to be inconsequential in most circumstances.

Preferably, coherent light source 160 further comprises at least one defocusing lens 162, as shown. Defocusing lens 162 preferably alters focus of coherent light 170 to form at least one defocused laser beam 168, as shown. Defocused laser beam 168 preferably comprises at least one beam radius 136 at surface 140, as shown. Beam radius 136 preferably ranges between about 10 nm and about 2 mm, preferably about 15 nm, as shown. Clearance 174 between defocusing lens 162 and surface 140 preferably is about two millimeters, as shown, assisting protecting defocusing lens 162 from impacting surface 140 due to slight deformations that may occur in surface 140.

Applicant has determined, including by testing, that decomposition of magnesium hydride using at least one surface temperature of about 390° C., in a vacuum at about −5 bar, is reached within about 10 ns with enough conductivity to release 100% of stored hydrogen (up to about 7.6 wt %) within beam radius 136, to a depth of about 20 micrometers. At at least one maximum effective decomposition distance 145 comprising about ½ mm, the temperature decreases to about 280° C., dropping release of stored hydrogen to about 39.5% of maximum (up to about 3 wt %). Since magnesium typically melts at about 650° C., applicant has found that a surface temperature of about 390° C. (60% of melting temperature) roughly minimizes adiabatic evaporation of magnesium.

Coherent light source 160 preferably rides on at least one rail 175, preferably moving radially, near at least one surface 140 of hydride disk 110, as shown. Hydride disk 110 preferably spins about a central axis 215 (see FIG. 2), preferably positioning surface 140 for defocused laser beam 168 to induce heating, as shown.

Absorptivity to infrared radiation is inversely proportional to thermal conductivity. Applicant has determined that, unlike for magnesium, thermal conductivity of magnesium hydride increases with rising temperature, attributable to radiation and "the Smoluchowski effect" (described in Marian Smoluchowski's paper 'Zur kinetischen Theorie der Brownshen molekular Bewegung and der Suspensionen' in Annalen der Physik, 21, 1906, 756-780). Heat capacity is also greater in magnesium hydride as compared to magnesium. Magnesium has a specific heat capacity of about 1050 J/(kg·K) (at 298 K) and the specific heat capacity of magnesium hydride is about 1440 J/(kg·K) (at 298 K). Further, magnesium's thermal conductivity is about 156 W/(m·k), while magnesium hydride's thermal conductivity is about 6 W/(m·k).

One formula, as determined by applicant, for thermal diffusivity (a) (a factor in the depth of thermal penetration), using thermal conductivity (λ), density (p), and specific heat (c) is:

$$a = \lambda / \rho c$$

Calculating thermal diffusivity for magnesium hydride gives:

$$a = (6 \text{ W}/(\text{m·K})/(0.001450 \text{ kg/m}^3 \times 1440 \text{ J/(kg·K)}))$$
$$= 2.87 \times 10^6 \text{ J}/(\text{m}^3\text{K})$$

Using this calculation of thermal diffusivity for magnesium hydride, applicant estimates thermal penetration (Z), based on a pulse time of 115 ns at 4× rotational speeds and 19 ns at 48× rotational speeds, as:

$$Z = \sqrt{(4 \cdot a \cdot t)} = 36334 \text{ nm at } 4 \times (0.036 \text{ mm})$$

$$Z = \sqrt{(4 \cdot a \cdot t)} = 14769 \text{ nm at } 48 \times (0.015 \text{ mm})$$

Estimated thermal penetration is inadequate for release of all stored hydrogen in hydride disk 110 by a factor of about 30, for a 1 mm thickness. Applicant has determined, however, that since magnesium hydride has a refractive index of about 1.96, which provides about 80% transparency, that optical penetration may aid in increasing release of stored hydrogen. Applicant has found that, through modification of power density to find at least one optimal power setting and beam radius 136, maximum effective decomposition distance 145, comprising about ½ mm, may be reached, as shown. In order to instigate hydrogen adsorption substantially through thickness 144 of hydride disk 110, preferably, defocused laser beam 168 may also be incident upon opposing surface 142.

Power density, mathematically defined as:

$$E = q / \pi \cdot r^2$$

where q is beam power and r is beam radius, determines peak temperature, near surface 140, and thermal interaction at interface 172 of hydride disk 110 and defocused laser beam 168. Applicant has found that a power density capable of adsorbing hydrogen from magnesium hydride need only be concerned with the melting point of magnesium.

For magnesium hydride, coherent light source 160 preferably produces at least one temperature profile 130 in hydride disk 110, due to thermal interaction at interface 172, as shown. Temperature profile 130 preferably ranges from about 390° C., near surface 140, to about 280° C. at maximum effective decomposition distance 145, as shown.

Applicant has found by testing that, after the course of repeated hydrogen absorption and desorption cycles, the fabricated disks appear lose the ability to absorb hydrogen to the full extent (0.345 wt %) initially noted when the disks were new. Analysis of the disks indicated that contaminants had blocked interstitial spaces and eventually coated areas along the surface of the disks. These contaminants might be considered (theoretically) to be related to the lack of 100% purity and may be to be an inevitable consequence of the hydrogen source.

In testing and analysis of the previously mentioned lower-capacity disks, there was evidence of deuterium in the form of observed Time of Flight ("ToF") hydrogen deuterium ("HD") signals which were not evident in new disks. Time of Flight does not provide quantitative analysis, and testing did identify the isotopes of hydrogen. A Secondary Ion Mass Spectrometry (SIMS) study may be necessary to determine evidence of increased concentration with each absorption and desorption cycle.

The evidence of detectable amounts of deuterium in desorbed disks may theoretically be explained by the stable, but larger structure of the HD molecule, along with its permanent dipole moment. These characteristics may explain limited desorption of deuterium from the medium. Reducing the laser pulse length into the tens of femtoseconds would increase photon absorption by this molecule and potentially increase desorption. However, this approach may not reduce the general rise in contamination by other elements.

An explanation of the contamination by deuterium is inconclusive. The predominant theory is that the molecules of HD and $D_2$ and even $MgD_2$ are more stable, individually and within the metal lattice, to the particular wavelengths and energy densities selected for desorption of $H_2$ from $Mg_2NiH_4 + MgH_2$. Over multiple cycles (using this theory), the concentration of deuterium rises in the material and reduces the recharging capability.

According to a less predominant theory, it may be suspected that a transmutation may occur due to: (1) the high degree of ionization afforded within the beam channels and (2) the fact that the molecular ions entering into the beam channels are subjected to intense vibration and oscillation in the presence of a nano-scale level electrostatic ion trap with increasing potentials. Support for this less predominant theory may be found in: (1) occasions of thermal run-away in which unexplained increases in temperature are clearly detected and (2) the failure of the material to return to ambient temperature within the timeframe expected for the power density and EM pulse directed at the material.

Figure 2:
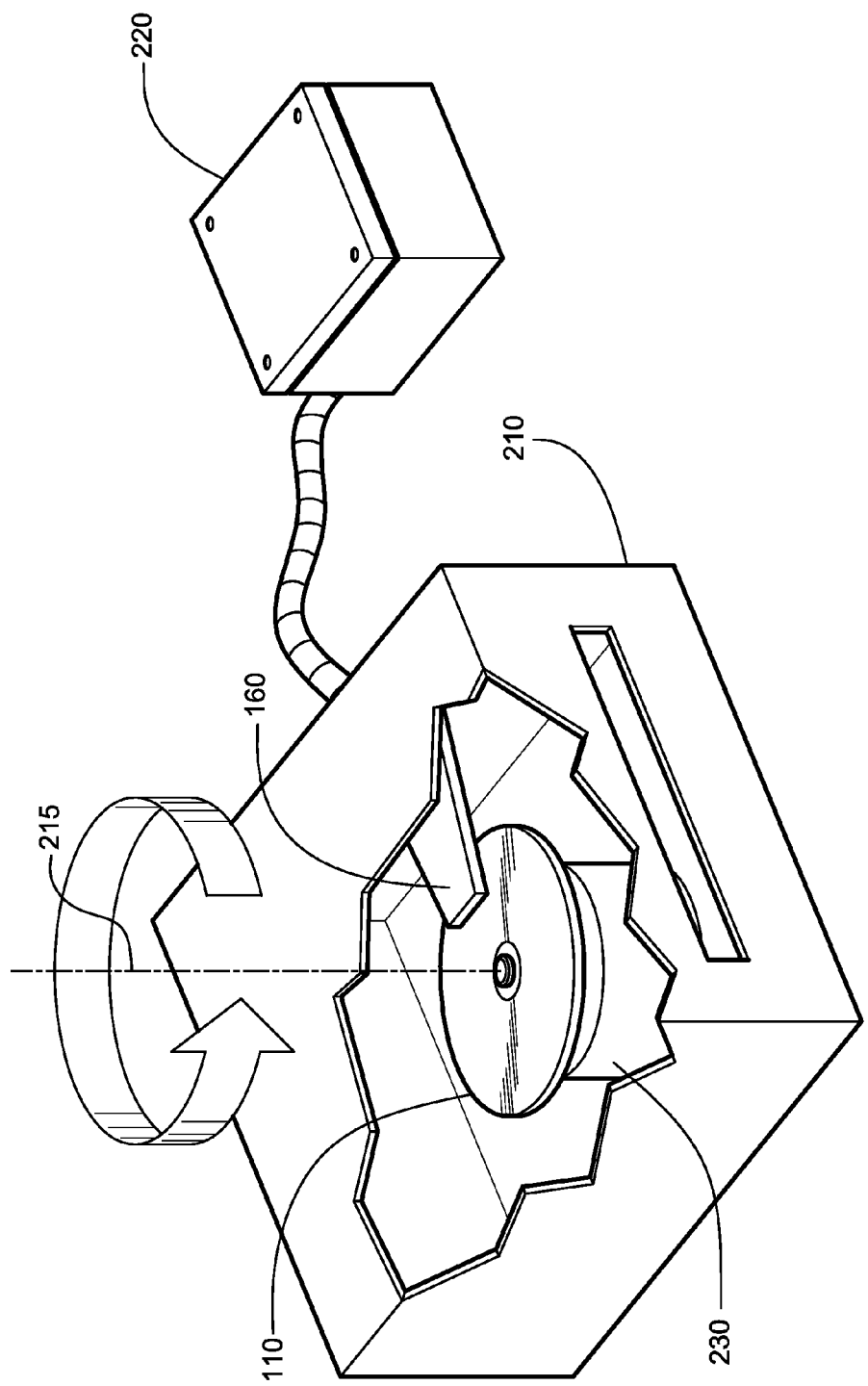
FIG. 2 shows a cutaway perspective view, illustrating a preferred disk player, according to the preferred embodiment of FIG. 1.

FIG. 2 shows a cutaway perspective view, illustrating at least one preferred disk player 210, according to the preferred embodiment of FIG. 1. As shown, disk player 210 preferably comprises at least one spinning motor 230, coherent light source 160 and disk changing mechanics. Such disk changing mechanics preferably accept at least one hydride disk 110, preferably move such at least one hydride disk 110 to spinning motor, and preferably remove such at least one hydride disk 110, once expended, from disk player 210. Spinning motor 230 preferably spins hydride disk 110 to achieve at least one linear motion of up to about 63 meters per second, preferably while coherent light source 160 liberates hydrogen gas 150 from hydride disk 110, as shown. Disk player 210 preferably operates under vacuum between about −1 torr to about −5 torr. Such vacuum preferably serves to evacuate liberated hydrogen gas 150, as shown in FIG. 1, and preferably maintains a neutral atmosphere around hydride disk 110.

At least one control circuit 220, as shown, preferably adjusts speed of spinning motor 230, preferably moves coherent light source 160 on rail 175, and preferably adjusts power output of coherent light source 160 (at least embodying herein at least one photonic exciter structured and arranged to photonically excite such at least one hydrogen storer to assist release of the stored hydrogen from such at least one hydrogen storer) to preferably optimize release of hydrogen gas 150. Output of hydrogen gas 150 is preferably optimized to demand for hydrogen gas 150 from at least one hydrogen-driven device 830 (see discussion relating to FIG. 8).

Applicant has determined that disk player 210 may preferably be reconfigured from existing compact disc writer (CD-R) technology. Applicant adapted at least one CD writer drive ("Iomega model 52x" CDRW drive) to adsorb stored hydrogen from hydride disk 110. In order to adapt such at least one CD writer to use hydride disk 110, at least one control circuit 220, as shown, preferably bypasses internal feedback controls of such at least one CD writer drive. Rather than relying on feedback information, control circuit 220 preferably uses direct manipulation of controlled components of disk player 210, preferably allowing precise control. Further, internal laser of CD writer preferably may be used provided such laser fulfills requirements given for semiconductor laser diode 165.

Manufacturing Magnesium Hydride Disks

Figure 3:
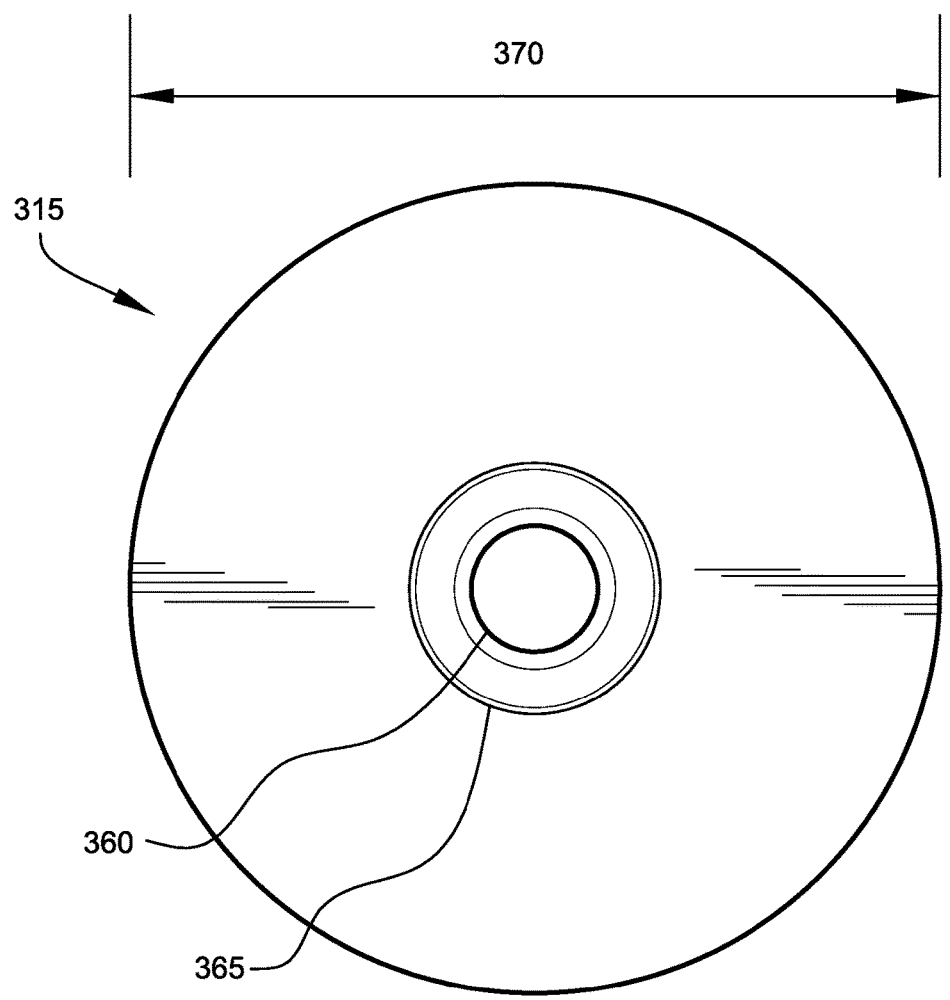
FIG. 3 shows a top view, illustrating a preferred disk, according to the preferred embodiment of FIG. 1.

FIG. 3 shows a top view, illustrating at least one disk 315 according to embodiment 101 of FIG. 1. Such at least one disk 315 is preferably formed by cutting from at least one sheet preferably comprising at least one material capable of absorbing hydrogen, preferably metal, preferably made substantially of magnesium, preferably AZ31B (available commercially). Upon reading this specification, those skilled in the art will appreciate that, under appropriate circumstances, considering such things as available materials, economics, stored hydrogen density, etc. other materials capable of absorbing hydrogen, such as other metals, plastics, glass, etc., may suffice. Upon reading this specification, those skilled in the art will appreciate that, under appropriate circumstances, considering such things as safety, economics, materials used, etc. other disk formation methods, such as using injection molds, machining, laser cutting, etc., may suffice.

Disk 315 is preferably cut using at least one water cutter, alternately preferably using at least one stamp cutter. Disk 315 preferably is about one millimeter thick. Diameter 370 of disk 315 is cut preferably to between about 50 mm and about 150 mm, preferably about 120 mm. A center hole 360 is preferably cut in disk 315, preferably between about five millimeters and about 15 millimeters in diameter, preferably about 15 millimeters. Preferably, center hole 360 allows disk 315 to be centered for stable spinning. Disk 315 preferably comprises at least one ring 365 concentric to center hole 360 (at least embodying herein wherein such at least one hydrogen storer comprises at least one central spin axis locator structured and arranged to locate at least one central spin axis of such at least one disk) preferably providing at least one friction grippable surface preferably to allow application of rotational torque to spin disk 315, as shown (this arrangement at least embodying herein wherein such at least one disk comprises at least one spinner motor gripper capable of being gripped by at least one motor driven spinner).

Figure 4A:
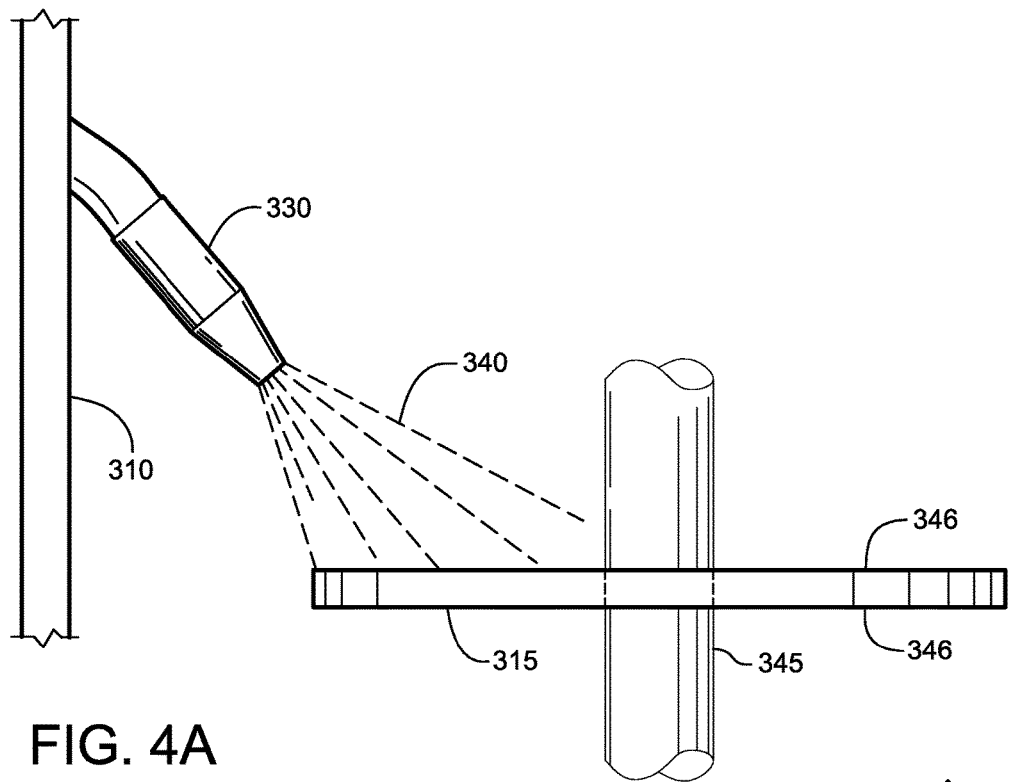
FIG. 4A shows a side view of a preferred disk, illustrating a preferred surface preparation, according to the preferred embodiment of FIG. 1.

FIG. 4A shows a side view of preferred disk 315, illustrating surface preparation, according to embodiment 101 of FIG. 1. Preferably, after fabrication, oxidization layers, vapor deposits and other physical obstructions to hydrogenation must be removed from disk 315. Surfaces 346 of disk 315 preferably may be smoothed to a mirror-like finish with irregularities of preferably less than two micrometers while incorporating small amounts of hydrogenation catalysts. Additionally, disk 315 preferably is structurally balanced so, when spun, surfaces 346 have minimal wobbling. Irregularities of surfaces 346 may be distorted, by the addition of hydrogen gas 150, up to approximately 2½ micrometers as disk 315 expands.

Figure 5:
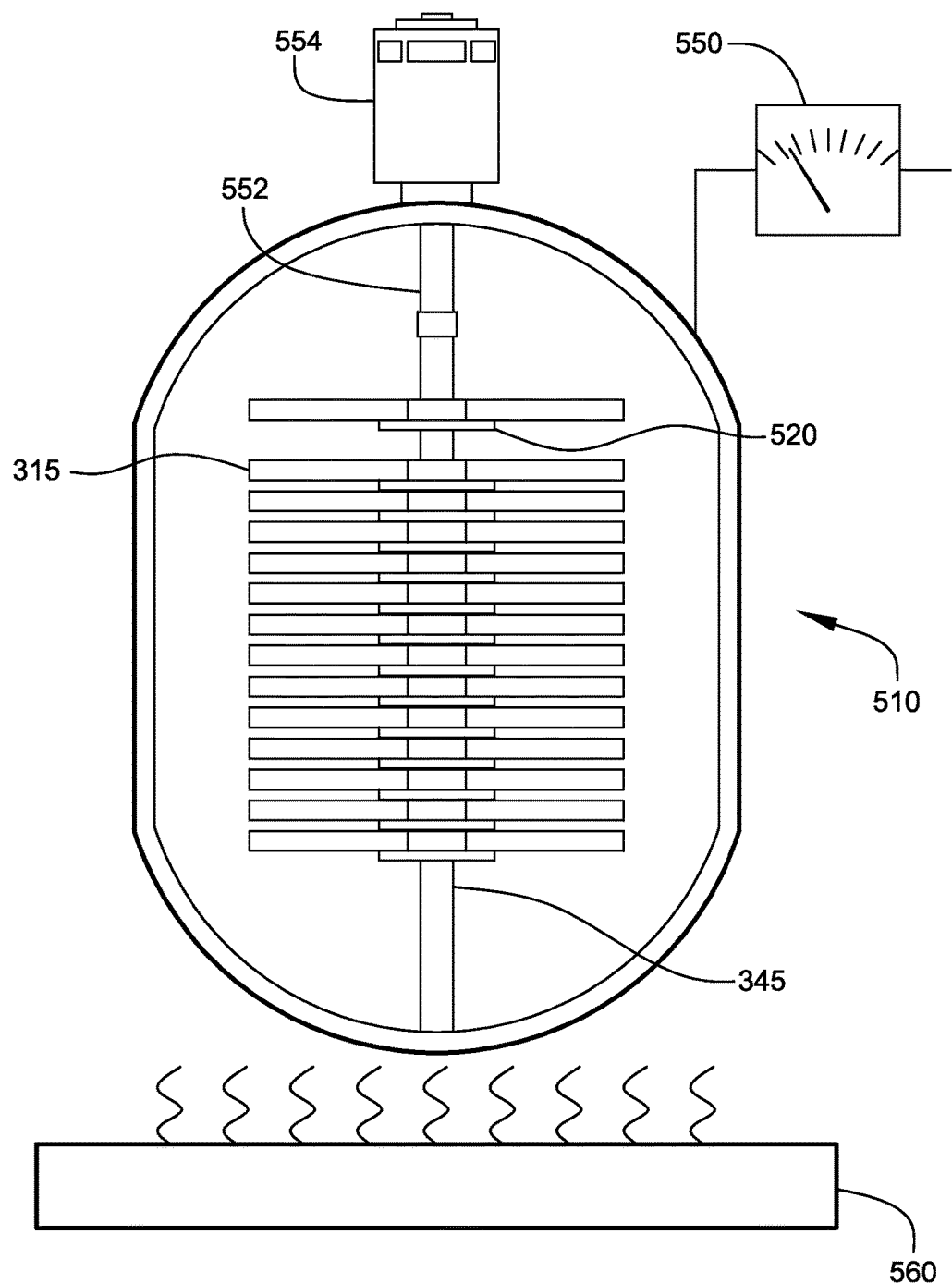
FIG. 5 shows a diagrammatic view of a preferred stainless-steel high-temperature pressure reactor, illustrating hydrogenation of a plurality of the preferred disks on a preferred spindle, according to the preferred embodiment of FIG. 4.

Disk 315 preferably is lightly sanded with titanium oxide to remove surface oxidation. Disk 315 preferably is then washed with 2% HF to remove bulk oxides and then preferably with dilute pepsin/HCL cleaning solution to remove residual sub-oxides. A plurality of such disks 315 are preferably stacked on at least one spindle 345 with at least one stainless steel washer 520, as shown in FIG. 5, between each disk 315. Dimensions of stainless steel washer 520 preferably comprise about 15.3 mm in inner diameter, about 18 mm in outer diameter, and about four millimeters in thickness. Spindle 345 preferably comprises steel, preferably stainless steel. Spindle 345 preferably comprises a diameter of about 14.9 mm. Spindle 345 preferably is positioned in vacuum chamber 310, as shown. At least one vacuum chamber 310 is preferably purged with nitrogen. Vacuum chamber 310 is brought to preferably about 0.7 torr (0.014 psi) (0.001 bar) for preferably about one hour. After about 1 hour, the plurality of such disks 315, on spindle 345, preferably is rotated at about 18,000 rpm. At least one spray nozzle 330, preferably designed for blasting at least one powder 340, preferably is at a fixed distance from disk 315, as shown. Powder 340 preferably comprises nickel powder, comprising a particle-size range of preferably about 2.6 micrometers to about 3.3 micrometers, preferably nickel powder commercially available as "Inco Type 287". Powder 340 is preferably blasted onto disk 315, as shown, at about 50 psi preferably using argon gas. Disk 315 preferably is subsequently sandblasted with progressively smaller 99.9+% nickel particles, preferably from about −325 mesh to about −500 mesh (American Elements CAS no. 7440-02-0) at preferably about 40 psi using preferably nitrogen gas.

Figure 4B:
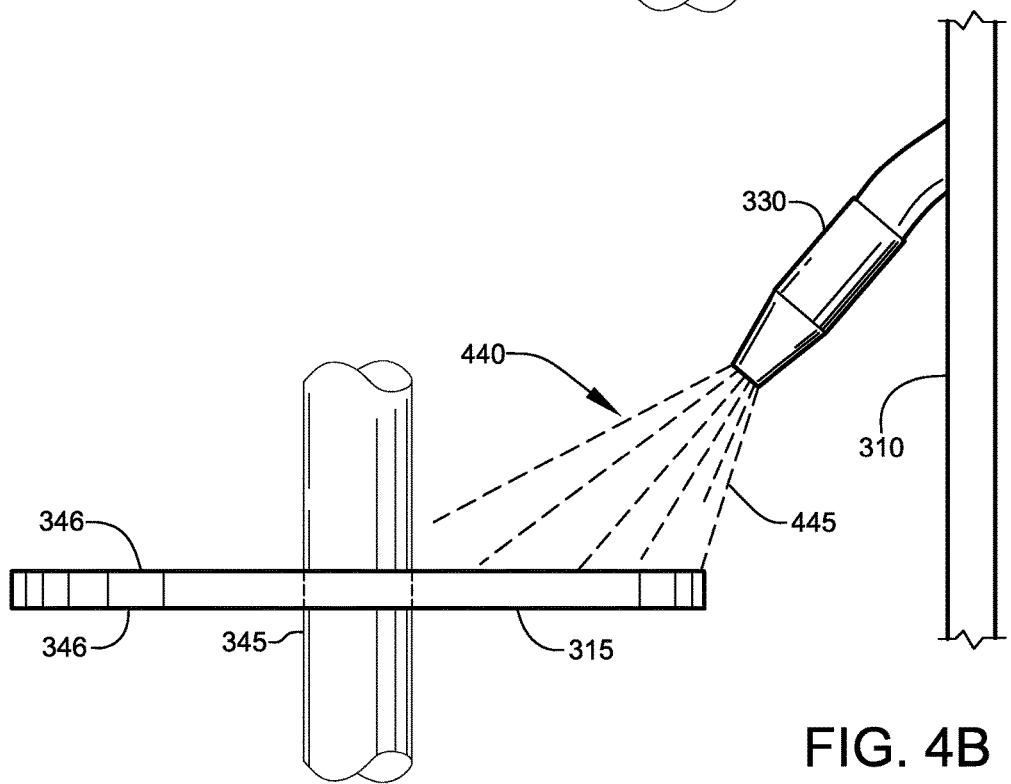
FIG. 4B shows a side view of the preferred disk, illustrating introduction of preferred hydrogenation catalysts, according to the preferred embodiment of FIG. 3.

FIG. 4B shows a side view of disk 315, illustrating introduction of preferred hydrogenation catalysts 440, according to embodiment 101 of FIG. 1. Inside vacuum chamber 310, disk 315 is preferably further treated with hydrogenation catalysts 440, as shown. Hydrogenation catalysts 440 preferably comprise at least one submicron powder 445, as shown. Hydrogenation catalysts 440 preferably are each applied for between about 10 minutes and about 15 minutes at preferably about 35 psi. Each of preferably three submicron powders 445 preferably comprises a purity of greater than about 99.999%. One Submicron powder 445 preferably comprises 99.999+% nickel. Another submicron powder 445 alternately preferably comprises 99.999+% palladium. Yet another submicron powder 445 alternately preferably comprises 99.999+% titanium. Upon reading this specification, those skilled in the art will now appreciate that, under appropriate circumstances, considering such things as then available materials, other catalyst technologies, cost, hydride material used, etc. other catalysts, such as other metals, plastics, resins, slurries, etc., may suffice.

Hydrogenation catalysts 440, preferably as described, preferably are serially applied such that application of all hydrogenation catalysts 440 comprises between about 30 minutes and about 45 minutes. The amount of hydrogenation catalysts 440 used is insufficient for capping, and instead preferably serves as a "door man" to preferably keep hydrogen moving past outer layer of surfaces 346 where magnesium hydride formation and buildup could prevent further absorption of hydrogen. Surface preparation and treatments with hydrogenation catalysts 440 preferably provides necessary surface smoothness and preferably impregnates, through adhesion, a preferred amount of hydrogenation catalysts 440 without significant ablation of surfaces 346.

Vacuum chamber 310 preferably is then returned to atmospheric pressure, preferably with nitrogen, and disk 315 preferably is removed to at least one stainless-steel high-temperature pressure reactor 510, as shown in FIG. 5. Stainless-steel high-temperature pressure reactor 510 preferably is nitrogen-purged with 0.1 torr on the evacuation cycle, preferably through at least two purging cycles to prepare for hydrogenation. Disk 315 preferably is then ready for hydrogenation.

FIG. 5 shows a diagrammatic view of stainless-steel high-temperature pressure reactor 510, illustrating preferred hydrogenation of disk 315 on spindle 345, according to embodiment 101 of FIG. 1. At least one heating element 560 preferably heats stainless-steel high-temperature pressure reactor 510, as shown, from preferably about 20° C. to preferably about 350° C. The coefficient of thermal expansion (a) of magnesium is about $27 \cdot 10^{-6}/°$ C., which provides that disk 315 will expand from a diameter of about 120 mm to about 121 mm when raised from about 20° C. to about 350° C. Because being raised from about 20° C. to about 350° C. effects closing of diameter of central hole by as much as about ½ mm, prevention of size reduction of central hole by thermal expansion or hydrogenation is necessary. The plurality of disks 315 are preferably placed on spindle 345, as shown, in order to prevent central hole closing. The coefficient of thermal expansion of stainless steel is about $17 \times 10^{-6}/°$ C. Spindle 345 expands from about 14.9 mm, at about 20° C., to about 15 mm in diameter, at about 350° C. Since magnesium is less dense than stainless steel, spindle 345 preferably constrains disk 315 to expand vertically and radially outward as disk 315 is heated and hydrogenated.

Thermal and internal strain from forced expansion away from spindle 345 theoretically reduces absorption of hydrogen near center hole 360 of disk 315, approximately within ring 365. Such reduction in absorption is inconsequential since central area of hydride disk 110, including ring 365, is preferably not lased. Furthermore, heating is preferably incremented slowly to allow enough time for thermal equilibrium and expansion without undue stress. Such slow heating is preferably accompanied by slow increases in pressure. Hydrogenating slowly preferably allows greater absorption of hydrogen gas 150 because build up of magnesium hydride does not occur near surfaces 346 impeding complete hydrogenation.

Pressure is preferably raised to atmospheric pressure with hydrogen gas 150 and at least one thermocouple 550, as shown, is preferably set to about 21.1° C. to establish initial temperature. Small increments of temperature and pressure preferably are applied preferably over about 6 hours to preferably raise pressure to about 35 bar (500 psi) and temperature to preferably about 350° C. Final temperature and pressure are preferably maintained for about an additional 2 hours.

At least one step motor 554, which preferably can rotate disk 315 at about 18,000 rpm, preferably comprises at least one axle 552, as shown. Axle 552 is preferably passed into stainless-steel high-temperature pressure reactor 510, as shown. Spindle 345 is preferably attached to axle 552, as shown, allowing step motor 554 to spin spindle 345 inside stainless-steel high-temperature pressure reactor 510. Rotation at about 18,000 rpm preferably allows additionally between about 700 psi and about 3000 psi to be exerted radially on disk 315, once initial hydrogenation is complete, and preferably allows a small amount of hydrogen "over loading". Step motor 554 is preferably activated to spin spindle 345 and disk 315 at preferably about 18,000 rpm for about 1 hour. Afterwards, disk 315 preferably is slowed to a stop and preferably allowed to remain at full pressure and temperature for about 1 hour more.

Hydride disk 110 preferably is formed as Disk 315 preferably becomes fully hydrogenated to nearly 100% magnesium hydride preferably with a hydrogen content of about 7.6%. Disk 315 theoretically grows dimensionally during hydrogenation by as much as about 17%, but the surface area of hydride disk 110 to be lased preferably remains the same. Hydride disk 110 is highly reactive in air, and great caution should be taken in handling and storage.

Magnesium hydride ignites spontaneously in air to form magnesium oxide and water. Such ignition is a violent reaction, which cannot be stopped by addition of water or carbon dioxide. Therefore, consideration of the practicality of creating, storing, and transporting hydride disks 110, comprising magnesium hydride, is important. Hydride disk 110 preferably is stored in at least one inert environment.

Before removing hydride disk 110 from stainless-steel high-temperature pressure reactor 510, pressure should preferably be allowed to return to atmospheric pressure through release of hydrogen gas 150. Then, optically clear mineral oil 610 (preferably "Sontex LT-100") is preferably pumped into stainless-steel high-temperature pressure reactor 510, preferably to displace any remaining hydrogen gas 150. Stainless-steel high-temperature pressure reactor 510 may be opened preferably only after a volume of optically clear mineral oil 610, equal to the interior volume of stainless-steel high-temperature pressure reactor 510 less the volume of hydride disk 110 and spindle 345, has been pumped.

Alternately, hydride disks 110 are preferably stored in a light (−1 to −2 bar) vacuum. When storing in such light vacuum, optically clear mineral oil 610 need not be applied to hydride disks 110. By not applying optically clear mineral oil 610, other special handling to account for optically clear mineral oil 610 may be preferably bypassed. Upon reading this specification, those skilled in the art will now appreciate that, considering such issues as cost, future technologies, etc., other inert environments, such as, for example, inert gasses, other inert fluids, coatings, etc., may suffice.

Optically clear mineral oil 610, as shown, (preferably $C_nH2_{n+2}$) preferably comprises a highly purified organic aliphatic hydrocarbon, preferably comprising an index of refraction of about 1.47 and a light transmittance of about 0.99972. Optically clear mineral oil 610 preferably does not interact with hydride disk 110. Optically clear mineral oil 610 preferably acts as an atmospheric insulator to prevent oxidation and static discharge. Upon reading this specification, those skilled in the art will now appreciate that, under appropriate circumstances, considering such things as wavelength of light source, cost, available materials, etc., other atmospheric insulators, such as resins, other oils, solutions, etc., may suffice.

In addition, flow of hydrogen, due to concentration differences, is minimal due to inherently high hydrogen content of optically clear mineral oil 610. Preferably, care should be taken to avoid any moisture content in optically clear mineral oil 610, as well as in manufacturing environment, when stainless-steel high-temperature pressure reactor 510 is opened. Such moisture may cause formation of hydrogen peroxide ($H_2O_2$) in optically clear mineral oil 610. In addition, ambient air preferably should be as dry as possible, also to preferably prevent hydrogen peroxide development in optically clear mineral oil 610. Optically clear mineral oil 610 preferably has a loss of only about 0.028% of light passing through. Preferably, optically clear mineral oil 610 has a molecular weight of about 40.106, a flash point of about 135° C., a specific gravity greater then 0.8, and a boiling point approximately 300° C. Hydride disk 110 preferably may now be removed from stainless-steel high-temperature pressure reactor 510 and preferably immediately placed in at least one holding container 600 of optically clear mineral oil 610, as shown. Preferably, optically clear mineral oil 610 remains around hydride disks 110 to prevent contact with air. As mentioned, such contact may result in a violent reaction creating a magnesium fire.

Figure 6:
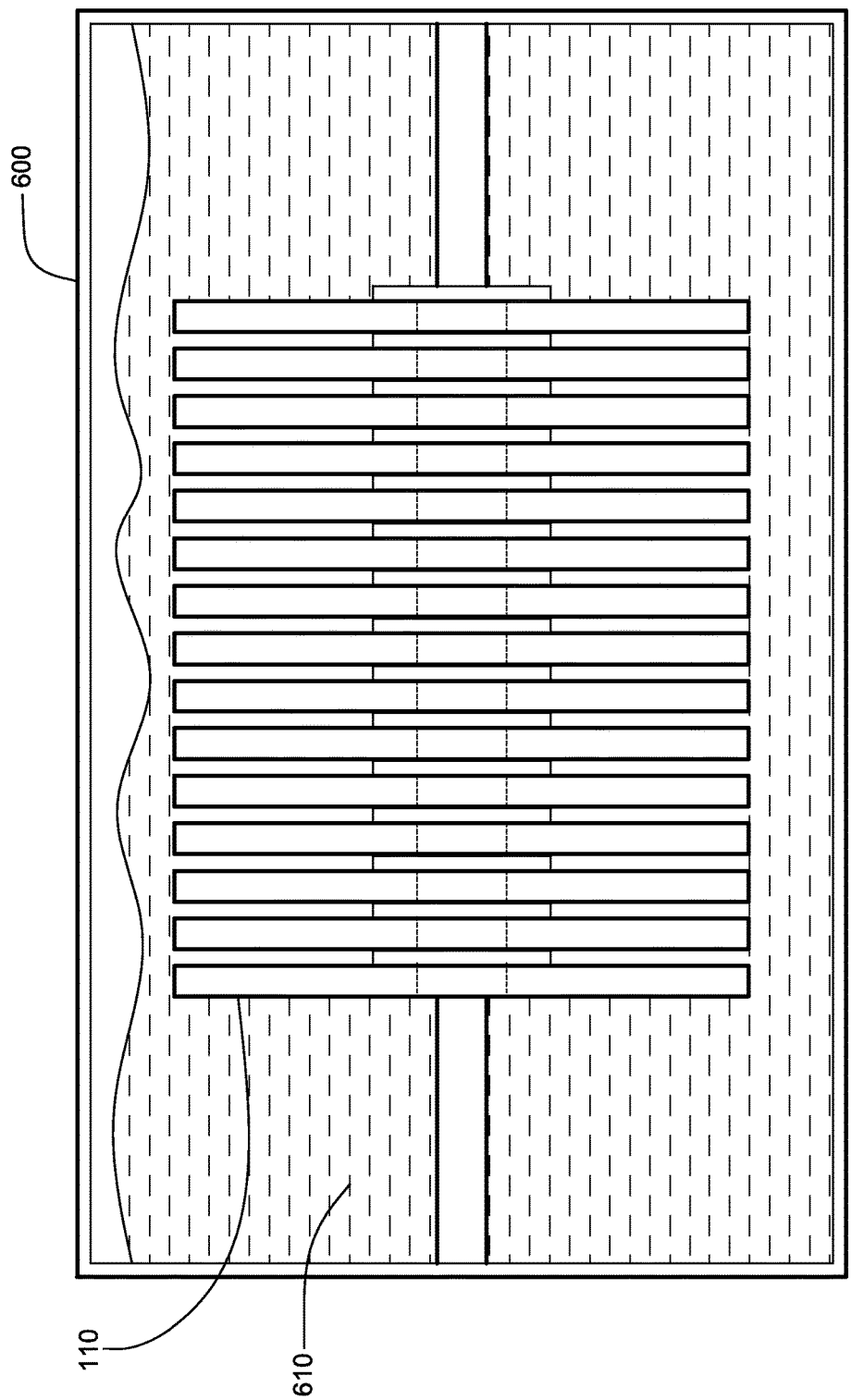
FIG. 6 shows a diagrammatic view, illustrating at least one preferred holding container for a plurality of the preferred hydride disks, according to the preferred embodiment of FIG. 1.

FIG. 6 shows a diagrammatic view, illustrating at least one holding container 600 for a plurality of hydride disks 110, according to embodiment 101 of FIG. 1. Transfer of hydride disk 110 from stainless-steel high-temperature pressure reactor 510 to optically clear mineral oil 610 in holding container 600 preferably should only be performed with proper safety apparel and adequate fire suppression available. An understanding of proper handling and methods of fire extinguishing of magnesium hydride is paramount. The information provided in this application is not an adequate substitute for proper training. Eye protection should be worn (preferably a welder's mask) because of the brilliance of a magnesium fire. Also, heat and fire resistant clothing should be worn due to the intensity of a magnesium hydride fire. Sand, in plastic bags, should preferably be available to place on a fire should one erupt. Tabletops and flooring should preferably be of soap stone or other inert material, not metal or wood. Carbon dioxide ($CO_2$) extinguishers or water should never be used on a magnesium fire, since such extinguishers promote the reaction. Alternately, holding container 600 preferably maintains a light vacuum for storage of hydride disk 110, negating need for optically clear mineral oil 610.

Figure 7A:
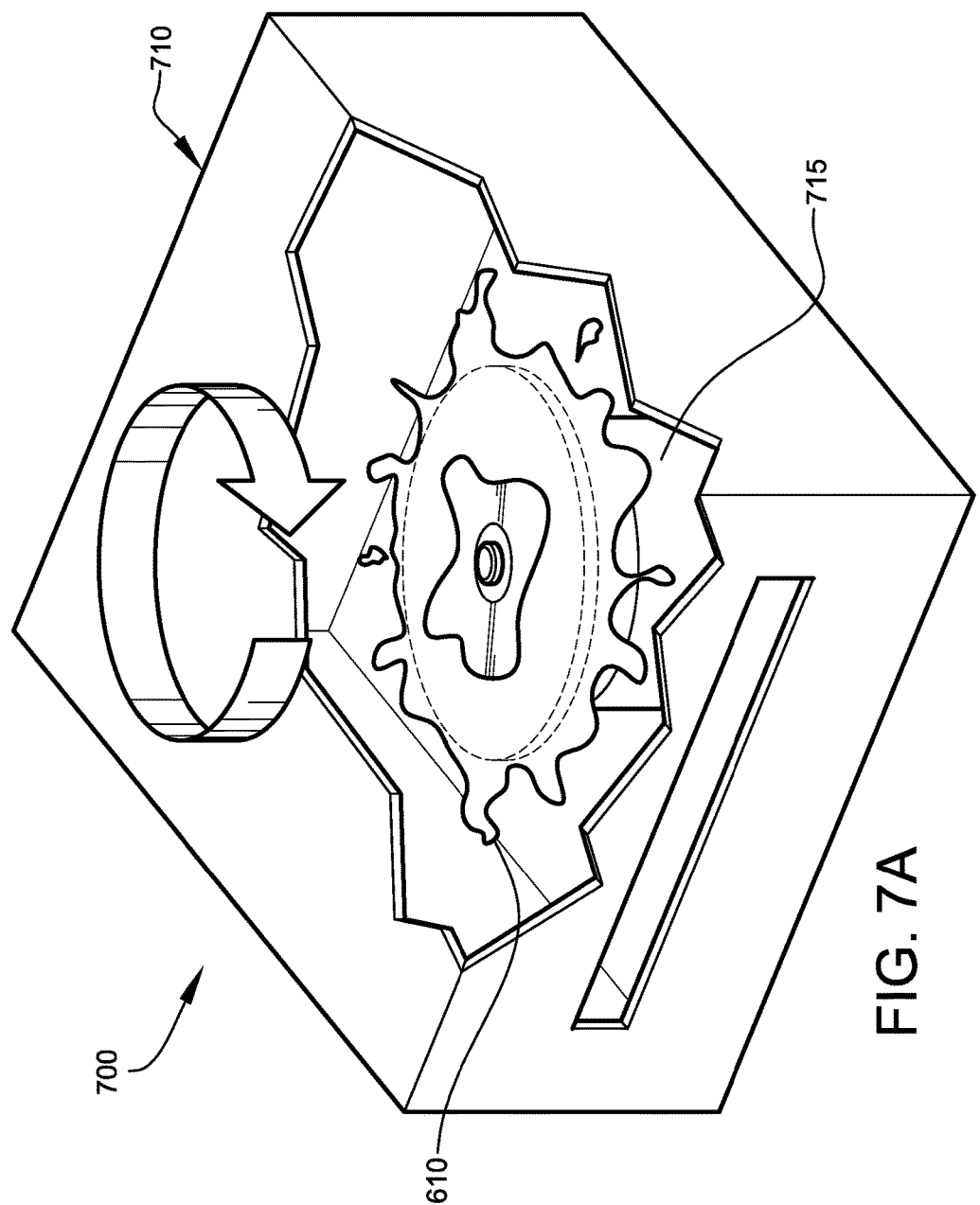
FIG. 7A shows a diagrammatic view of at least one preferred mineral oil removal system, illustrating removal of the preferred optically clear mineral oil from the preferred hydride disk, according to the preferred embodiment of FIG. 6.

FIG. 7A shows a diagrammatic view of at least one mineral-oil removal system 700, illustrating removal of optically clear mineral oil 610 from hydride disk 110, according to embodiment 101 of FIG. 1. When using optically clear mineral oil 610, optically clear mineral oil 610 preferably is removed from hydride disk 110, using mineral-oil removal system 700. The heat of vaporization of optically clear mineral oil 610, comprising about 214 kJ/kg, is particularly important. The more optically clear mineral oil 610 left on hydride disk 110, the more power needed to efficiently adsorb the stored hydrogen, since optically clear mineral oil 610 left on hydride disk 110 will absorb a portion of the heat generated by coherent light 170.

Mineral-oil removal system 700 preferably comprises at least one disk spinner 710, as shown. Disk spinner 710 preferably comprises at least one spinner motor 715, as shown. Disk spinner 710 preferably operates in an area of negative pressure. Disk spinner 710 preferably may be adapted from at least one CD drive. To adapt such at least one CD drive, all electronic components preferably must be shielded from exposure to optically clear mineral oil 610, preferably by at least one polymer, preferably polyvinyl. Prior to use, hydride disk 110 is preferably moved into disk spinner 710, as shown, and preferably spun by spinner motor 715 to about 24,000 rpm to recover most of optically clear mineral oil 610, preferably for reuse.

Figure 7B:
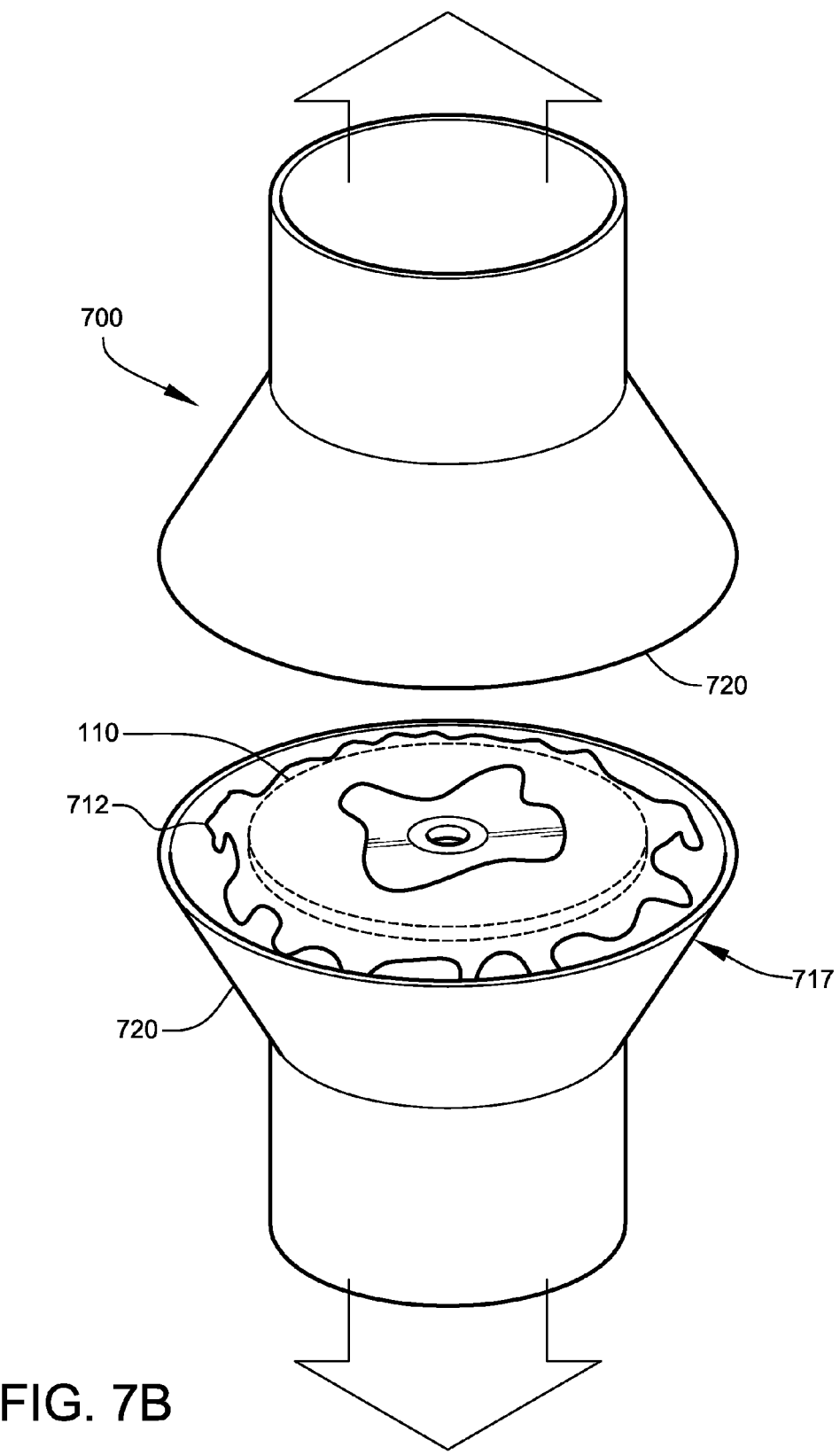
FIG. 7B shows a diagrammatic view of the mineral oil removal system, illustrating removal of residual mineral oil from the preferred hydride disk, according to the preferred embodiment of FIG. 7A.

FIG. 7B shows a diagrammatic view of mineral oil removal system 700, illustrating removal of residual mineral oil 712 from hydride disk 110, according to embodiment 101 of FIG. 7A. Mineral oil removal system 700 preferably further comprises at least one residual mineral oil remover 717, as shown. Residual mineral oil remover 717 preferably comprises at least two opposing suction vacuums 720, as shown. After spinning, opposing suction vacuums 720 preferably pump off any residual mineral oil 712, comprising optically clear mineral oil 610, for reuse, as shown. Opposing suction vacuums 720 preferably substantially cover diameter of hydride disk 110, as shown. 100% recovery, of optically clear mineral oil 610, may not be possible without vaporization during lasing of hydride disk 110. Minimization of vaporization preferably minimizes energy consumption of the lasing process. Vaporized mineral oil preferably should be collected for ecological and safety reasons. After removing optically clear mineral oil 610, hydride disk 110 preferably is passed to disk player 210, as discussed in FIG. 8, for hydrogen adsorption, as discussed herein (See FIGS. 1 & 2).

Figure 8:
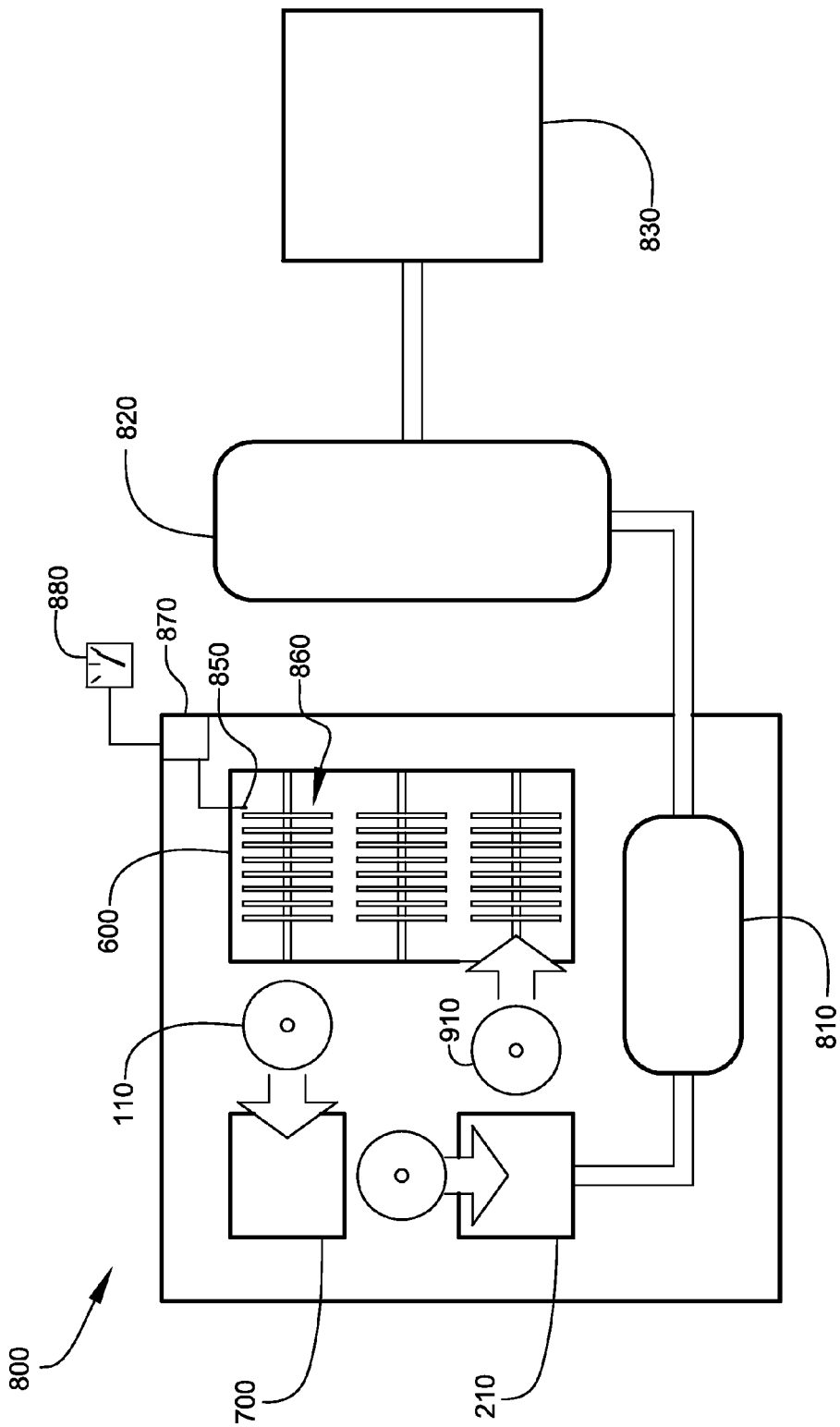
FIG. 8 shows a diagrammatic view, illustrating at least one preferred hydrogen supply system, according to the preferred embodiment of FIG. 1.

FIG. 8 shows a diagrammatic view, illustrating at least one hydrogen supply system 800, according to the preferred embodiment of FIG. 1. Hydrogen supply system 800 preferably comprises holding container 600, mineral oil removal system 700 and disk player 210, as shown. Hydride disk 110 is preferably moved from holding container 600 to mineral oil removal system 700, preferably for optically clear mineral oil 610 removal, as shown. After optically clear mineral oil 610 is substantially removed, hydride disk 110 preferably transfers to disk player 210 for hydrogen adsorption, as shown. After completing at least one adsorption process, used hydride disk 910 preferably is returned to holding container 600, as shown, for safe storage. Processing of hydride disk 110 is preferably conducted under negative pressure (about −1 torr) preferably to allow for hydrogen collection and preferably preventing exposure of hydride disk 110 to air.

Unlike magnesium hydride, exhibiting 80% transparency, magnesium exhibits mirror like opacity, when manufactured as discussed herein. Transparency variation of hydride disk 110 from used hydride disk 910 therefore preferably indicates hydrogen content. Such transparency variation may preferably be used to distinguish at least one used hydride disk 910 from such at least one hydride disk 110, and may also preferably be used as at least one "gas" gauge 880. At least one transparency probe 850 preferably polls stored disks 860. Transparency information passes to at least one processor 870 where quantities of such at least one hydride disk 110 and such at least one used hydride disk 910 are determined. At least one value is then calculated for available hydrogen stores and may be displayed as such at least one "gas" gauge 880.

Hydrogen supply system 800 preferably further comprises at least one condensing tank 810, as shown. Gases released from processing may contain vaporized mineral oil (when using optically clear mineral oil 610), in addition to hydrogen gas 150. Such gases are preferably collected and preferably pass into condensing tank 810. Condensing tank 810 preferably comprises at least one cooling environment at atmospheric pressure. Optically clear mineral oil 610 is not dissociated into its constituent elements by vaporization in an anaerobic atmosphere. Optically clear mineral oil 610 is preferably recaptured within condensing tank 810, as shown.

After condensation of optically clear mineral oil 610 in condensing tank 810, hydrogen gas 150 is preferably supplied to hydrogen-driven device 830. Alternately preferably, hydrogen gas 150 is pressurized in at least one pressure tank 820 to at least one atmosphere of pressure, before being supplied to hydrogen-driven device 830, as shown. Hydrogen gas 150 supplied by hydrogen supply system 800 preferably maintains supply of hydrogen gas required by hydrogen-driven device 830 to operate steadily. Pressure tank 820 preferably acts as a hydrogen gas reserve, allowing accelerated use of hydrogen gas 150, for a limited time, beyond the hydrogen adsorption rate of hydrogen supply system 800. Pressure tank 820 may preferably be sized to provide sufficient quantity according to at least one brief increased supply need of hydrogen-driven device 830.

Hydrogen-driven device 830 preferably comprises at least one vehicle engine adapted for using hydrogen gas 150. Such at least one vehicle engine preferably comprises at least one combustion engine, alternately preferably at least one hybrid engine, alternately preferably at least one hydrogen power cell driven engine. Upon reading this specification, those skilled in the art will now appreciate that, under appropriate circumstances, considering such things as then availability, cost, purpose, etc., other hydrogen-driven devices, such as cooking devices, generators, heaters, etc., may suffice. For application to such at least one vehicle engine, pressure tank 820 preferably comprises a size of about two liters which may hold up to about ½ kg of hydrogen gas 150. Applicant has determined that, under relevant circumstances, an about-two-liter size of pressure tank 820 allows for about a 30-second burst of increased consumption for acceleration. After such 30-second burst, pressure tank 820 may preferably recharge giving, as similarly determined by applicant, about a 50-second recovery time.

For hydrogen-driven device 830 comprising at least one typical vehicle, hydrogen supply system 800 should deliver a supply rate of about 1.3 kg/hour of hydrogen to maintain better than 50 miles per hour. Thickness 144, rotation speed of hydride disks 110, power of semiconductor laser diode 165, and the number of semiconductor laser diodes 165 should be optimized to reach such at least one supply rate. If semiconductor laser diode 165 is too weak, then rotation speed of hydride disks 110 has to be slowed in order to liberate enough hydrogen. The slowed rotation speed of hydride disks 110 will then require a plurality of semiconductor laser diodes 165 and a plurality of disk players 210 to maintain an adequate supply of fuel.

Applicant has determined, including by experimentation, that using one semiconductor laser diode 165 (at about 760 nm) at an operating speed of about 2× (about 2.6 m/s) requires about 33 minutes to release about 1.2 grams of hydrogen. Using this operating speed requires about 148 disk players 210 with about 8 semiconductor laser diodes 165 each to deliver such at least one supply rate of about 1.3 kg per hour. This would require an additional 10 kg and 2 cubic feet to accommodate. The total laser power comprises about 236 watts (0.32 horsepower) and such about 148 disk players with disk changing mechanisms would require about 300 watts (0.4 horsepower). Preferably, when using a plurality of semiconductor laser diodes 165, each semiconductor laser diode 165 differs in power proportional to the distance from the center of hydride disk 110, since actual linear speed is a function of the radius. Multiple semiconductor laser diodes 165 preferably may be replaced with at least one diode laser array, preferably at least one bar laser (this arrangement at least herein embodying wherein such at least one photonic exciter comprises at least one array of lasers).

By comparison, applicant has determined, including by experimentation, that using another semiconductor laser diode 165 (at about 780 nm) at an operating speed of about 48× requires only 3 minutes. At about 48×, about 14 disk players 210 with about 8 semiconductor laser diodes 165 each delivers such at least one supply rate. Under these conditions, operating hydrogen supply system 800 requires about 0.25 horsepower.

Applicant has determined that the percentage of the power produced needed to run hydrogen supply system 800, based on experimental findings and a fuel cell efficiency of about 50%, comprises about one percent.

Figure 9:
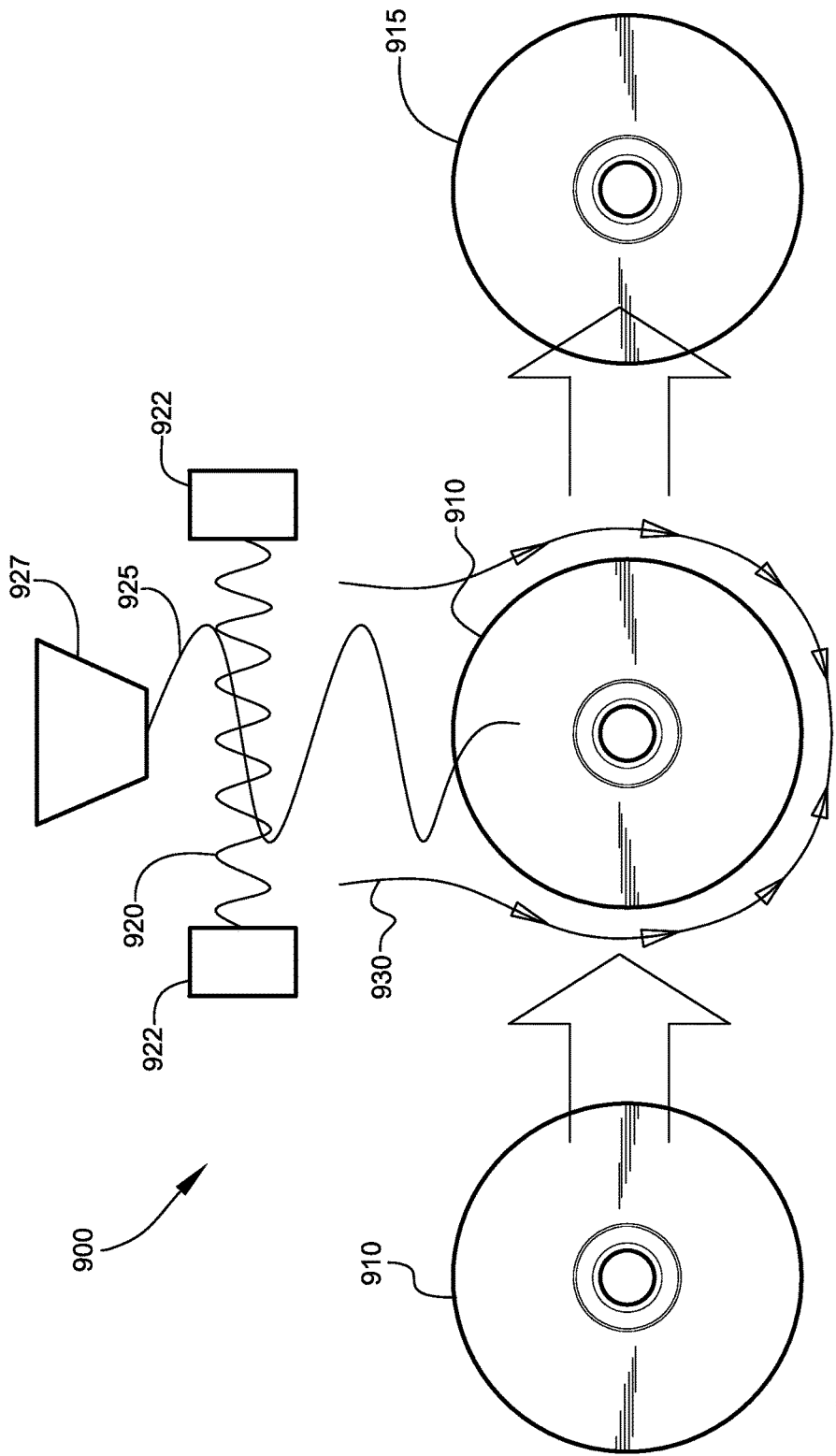
FIG. 9 shows a diagrammatic view of at least one preferred hydrogen recharging system, illustrating preferred re-hydrogenation of a used hydride disk, according to the preferred embodiment of FIG. 1.

FIG. 9 shows a diagrammatic view of at least one hydrogen recharging system 900, illustrating re-hydrogenation of used hydride disks 910, according to embodiment 101 of FIG. 1. At least one used hydride disk 910 preferably recharges by passing into at least one hydrogen plasma stream 930, as shown. Hydrogen plasma stream 930 preferably comprises highly charged hydrogen ions, as shown. Hydrogen plasma stream 930 is preferably created from hydrogen gas injected preferably with at least one microwave 920 and at least one radio wave 925, preferably at least two microwaves 920 and such at least one radio wave 925, as shown. Microwave 920 is preferably generated from at least one microwave generator 922, as shown. Radio wave 925 is preferably generated from at least one radio-wave generator 927, as shown (these generators at least embodying herein at least one electromagnetic field generator structured and arranged to generate at least one electromagnetic field sufficient to form at least one supply of hydrogen plasma). Hydrogen plasma stream 930 preferably comprises a temperature of about 2000° C. Hydrogen plasma stream 930, being highly charged, preferably envelops used hydride disk 910, as shown. As hydrogen plasma stream 930 envelops used hydride disk 910, hydrogen plasma stream 930 will cool and is preferably absorbed into used hydride disk 910, as shown. Hydrogen recharging system 900 preferably exposes used hydride disk 910 to hydrogen plasma stream 930 for about 0.15 seconds, preferably resulting in a recharged hydride disk 915, as shown, preferably substantially similar to and about as useable as hydride disk 110. Preferably, hydrogen recharging system 900 may proceed while used hydride disk 910 is within holding container 600, preferably reducing risk of combustion of recharged hydride disk 915.

Figure 10:
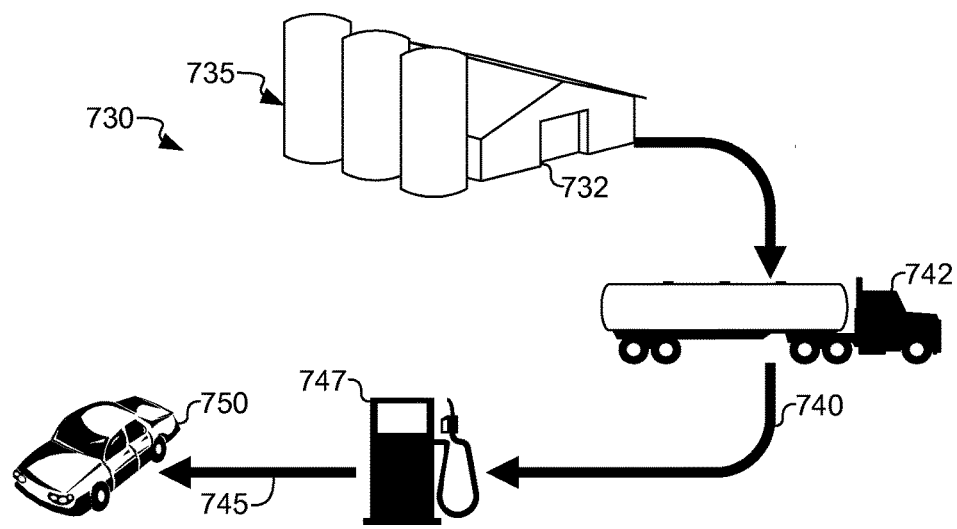
FIG. 10 shows a diagram illustrating at least one preferred refueling method according to the preferred embodiment of FIG. 1.

FIG. 10 shows a diagram illustrating at least one refueling method 730 according to embodiment 101 of FIG. 1. Hydrogen gas 150 preferably is stored at and manufactured in at least one factory 732, as shown, in step Manufacture and Store Hydrogen 735. Hydrogen gas 150 preferably is transported, in at least one hydrogen transportation vehicle 742, to at least one refueling center 747, as shown, in step Transport Hydrogen to Refueling Center 740. At least one hydrogen-powered vehicle 750 preferably refuels, preferably using hydrogen recharging system 900, as described in FIG. 9, in step Recharge Magnesium Hydride Disks 745, as shown. Refueling method 730 preferably allows multiple cycles of refueling and use without replacing hydride disk 110.

Figure 11:
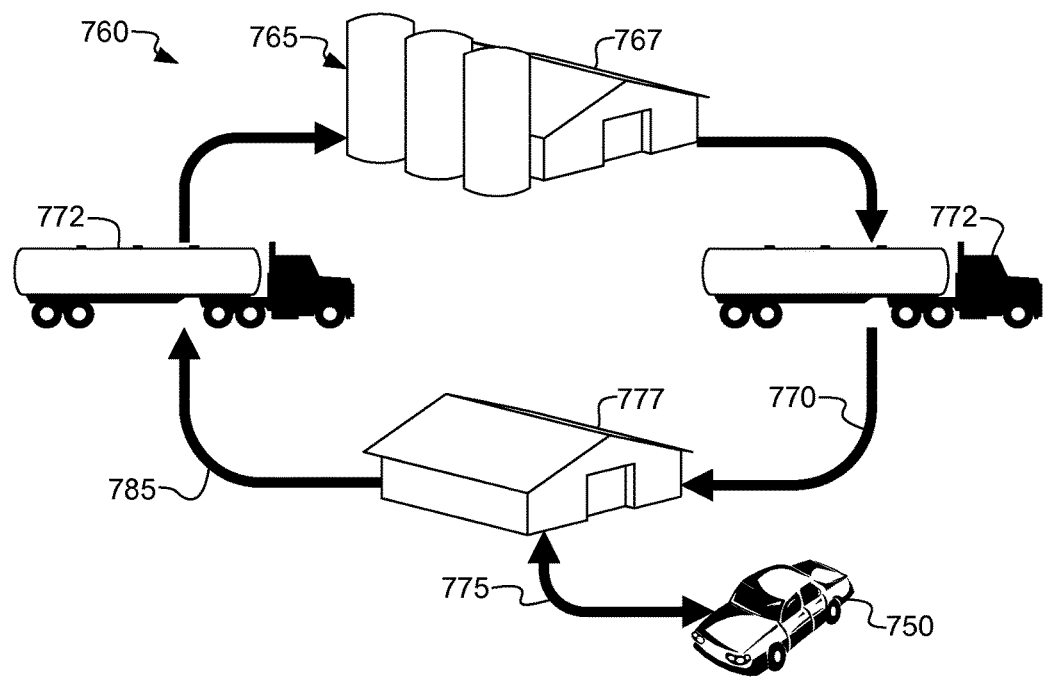
FIG. 11 shows a diagram illustrating at least one preferred disk exchange method according to the preferred embodiment of FIG. 1.

FIG. 11 shows a diagram illustrating at least one disk exchange method 760 according to embodiment 101 of FIG. 1. When such at least one used hydride disks 910 are insufficiently rechargeable, used hydride disks 910 may preferably be swapped out for hydride disks 110, as shown. A plurality of such at least one hydride disks 110 are preferably manufactured, as described in FIG. 3-6, in at least one factory 767 in step Manufacture Disks 765, as shown. Additionally, in step Manufacture Disks 765, materials required to manufacture hydride disks 110 preferably may be recycled from used hydride disks 910, as shown. A plurality of such at least one hydride disks 110 are preferably transported, in at least one disk transportation vehicle 772, to at least one service station 777, as shown, in step Transport Disks to Service Station 770. Such transported plurality of such at least one hydride disk 110 (at least embodying herein at least one hydrogen storer structured and arranged to store at least one substantial amount of hydrogen) preferably are immersed in optically clear mineral oil 610 during transport, as during storage in holding container 600 (see FIG. 6). At service station 777, each used hydride disk 910 in hydrogen-powered vehicle 750 is preferably replaced with new hydride disk 110 in step Exchange Disks 775, as shown. A plurality of used hydride disks 910 are preferably transported back, in disk transportation vehicle 772, to factory 767 for recycling, as shown, in step Return Disks for Recycling 785.

Figure 12A:
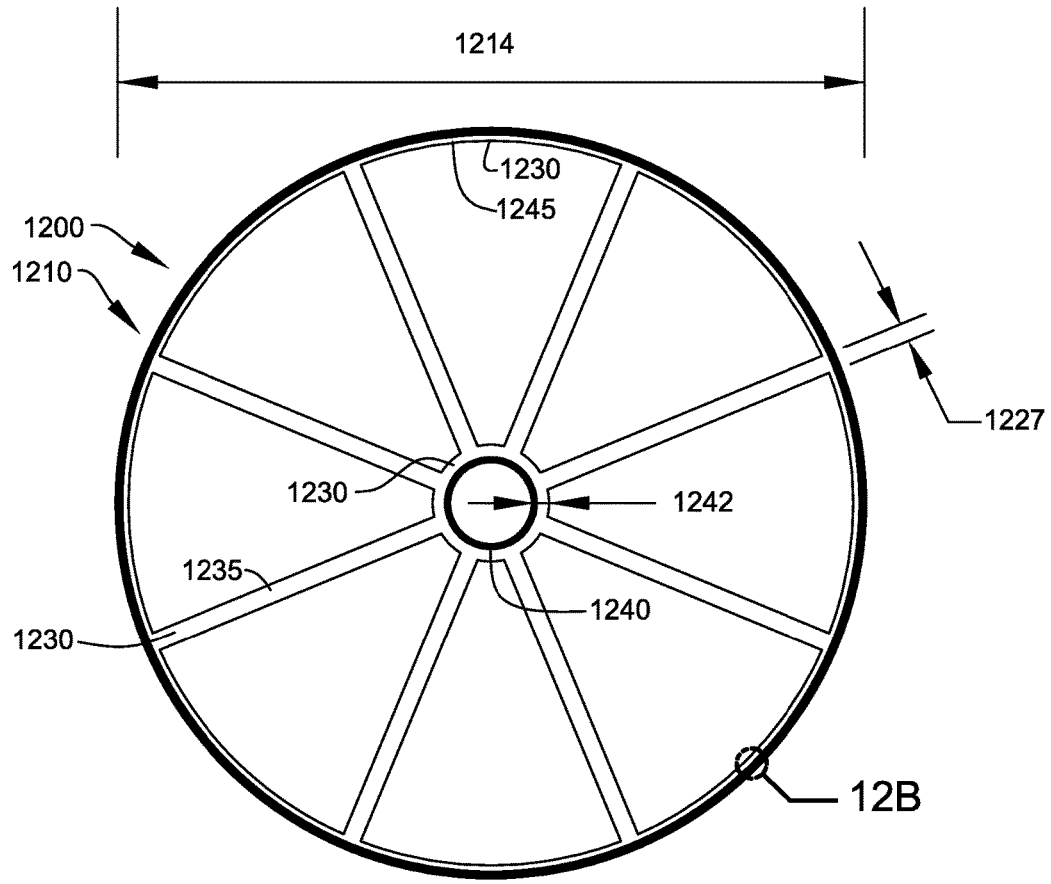
FIG. 12A shows a plan view illustrating at least one hydride disk according to a preferred embodiment of the present invention.

FIG. 12A shows a plan view illustrating at least one hydride disk 1210 according to a preferred embodiment of the present invention.

Figure 12B:
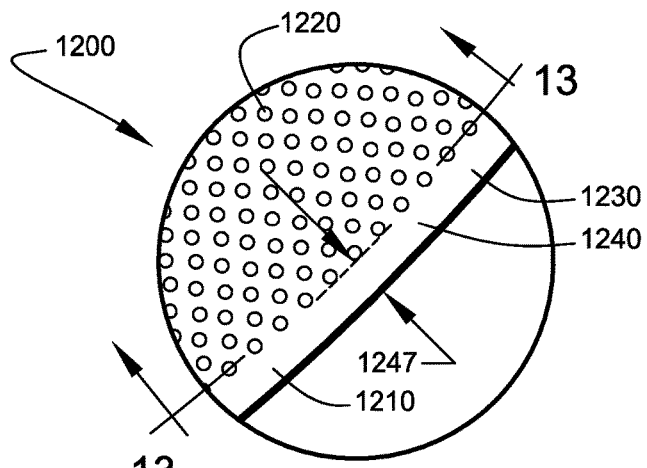
FIG. 12B shows a magnified view of such preferred hydride disk according to the preferred embodiment of FIG. 12A.

FIG. 12B shows a magnified view of hydride disk 1210 according to the preferred embodiment of FIG. 12A.

Referring to FIGS. 12A and 12B, although most features of embodiment 1200 are repeated from preferred embodiment 101, in embodiment 1200, as shown, embodiment 1200 preferably comprises hydride disk 1210, as shown. Hydride disk 1210 preferably comprises primarily magnesium hydride (at least herein embodying wherein such at least one metal surface portion comprises magnesium hydride). Upon reading this specification, those skilled in the art will now appreciate that, under appropriate circumstances considering such issues as future materials, economics, stored hydrogen density, etc. other materials capable of absorbing hydrogen, such as other metals, plastics, glass, etc., may suffice.

Hydride disk 1210 preferably comprises a thickness 1212 of about ½ mm. Hydride disk 1210 preferably comprises an outer diameter 1214 of between about 50 mm and about 150 mm, preferably about 120 mm. Hydride disk 1210 preferably comprises an inner diameter of preferably between about 5 mm and about 15 mm, preferably about 15 mm. Upon reading this specification, those skilled in the art will now appreciate that, under appropriate circumstances considering such issues as future technology, cost, future applications, etc. other dimensions may suffice.

Figure 13:
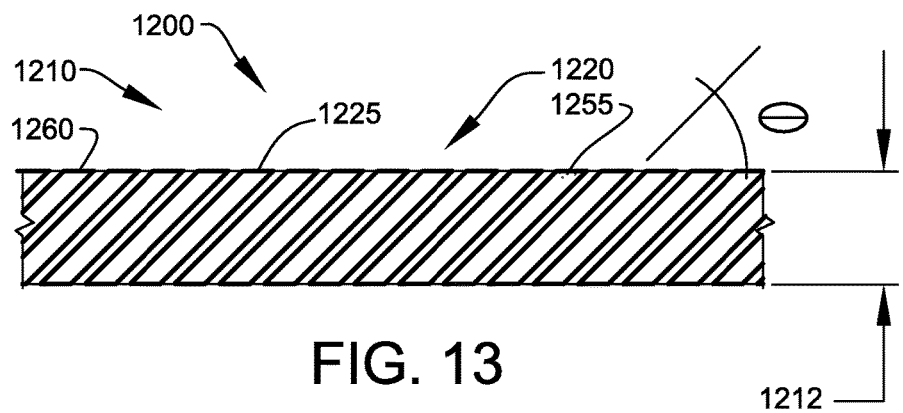
FIG. 13 shows an enlarged view of section 13-13 of FIG. 12B.

Hydride disk 1210 preferably further comprises at least one surface area extender 1220, preferably perforations 1225 (see FIG. 13). Surface area extender 1220 preferably increases the amount of surface area of hydride disk 1210, which preferably reduces hydrogenation time and hydrogenation pressures. Each perforation 1225 preferably comprises a diameter of preferably between about 100 nm and about 50 μm, preferably about 50 μm (at least herein embodying wherein each of such cavities comprises a diameter of about 50 μm). Upon reading this specification, those skilled in the art will now appreciate that, under appropriate circumstances considering such issues as material expansion, cost, future perforation methods, etc. other dimensions may suffice.

Multiple perforations 1225 preferably are spaced about 150 μm apart (measured center-to-center). Perforations 1225 preferably comprise a polar array in arrangement, as shown. Upon reading this specification, those skilled in the art will now appreciate that, under appropriate circumstances considering such issues as future technology, cost, materials, etc. other arrangements, such as, for example, linear arrays, hexagonal arrays, etc., may suffice.

Hydride disk 1210 preferably additionally comprises at least one structural integrity maintainer 1230, as shown. Structural integrity maintainer 1230 preferably comprises at least one non-perforated "strut" or band 1235 (at least herein embodying wherein such at least one metal surface portion comprises a plurality of non-porous strut portions structured and arranged to add stiffness), as shown. Non-perforated band 1235 preferably extends from inner diameter to outer diameter of hydride disk 1210, as shown. Non-perforated band 1235 preferably comprises a width 1227 of about 2¾ mm, as shown. Structural integrity maintainer 1230 preferably comprises at least one non-perforated inner ring 1240 and at least one non-perforated outer ring 1245, as shown. Non-perforated inner ring 1240 preferably comprises a radial width 1242, as shown, of about 2 mm. Non-perforated outer ring 1245 preferably comprises a radial width 1247 of about 1 mm. Non-perforated band 1235, non-perforated inner ring 1240, and non-perforated outer ring 1245 preferably comprise no perforations 1225. Non-perforated inner ring 1240 and non-perforated outer ring 1245 are preferably concentric with the center of hydride disk 1210. Upon reading this specification, those skilled in the art will now appreciate that, under appropriate circumstances considering such issues as future technology, cost, materials, etc. other structural integrity geometries, such as, for example, greater than three concentric rings, radially-staggered bands, parallel bands, etc., may suffice.

FIG. 13 shows an enlarged sectional view of section 13-13 of FIG. 12B.

Perforations 1225 preferably penetrate completely through hydride disk 1210, as shown. Upon reading this specification, those skilled in the art will now appreciate that, under appropriate circumstances considering such issues as future technology, cost, materials, etc. other penetration depths, such as, for example, about half way through, varying depths, etc., may suffice.

Perforations 1225 are preferably angled at about 45° (angle θ, as shown) from perpendicular to surface 1250 of hydride disk 1210, as shown (this arrangement at least herein embodying wherein such at least one pattern of cavities comprises at least one angle, with respect to such at least one metal surface portion, of about 45°). Upon reading this specification, those skilled in the art will now appreciate that, under appropriate circumstances considering such issues as future technology, cost, laser incidence, etc. other perforation angles may suffice.

Perforations 1225 are preferably linear, as shown. Upon reading this specification, those skilled in the art will now appreciate that, under appropriate circumstances considering such issues as future technology, cost, materials, etc. other perforation geometries, such as, for example, helical, spiral, elbowed, etc., may suffice.

Perforations 1225 (at least herein embodying wherein such at least one metal surface portion comprises at least one pattern of cavities structured and arranged to provide substantially uniform porosity) preferably comprise a circular cross-section perpendicular to the central axis. Upon reading this specification, those skilled in the art will now appreciate that, under appropriate circumstances considering such issues as future technology, cost, laser incidence, etc. other perforation cross-sections, such as, for example, ovular, hexagonal, slit, etc., may suffice.

Hydride disk 1210 preferably further comprises catalyst particles 1255 embedded near surface 1250, as shown. Catalyst particles 1255 preferably comprise nickel, and preferably palladium. Catalyst particles 1255 preferably each comprise at least one near-atomic size. Upon reading this specification, those skilled in the art will now appreciate that, under appropriate circumstances considering such issues as future technology, cost, materials, etc. other catalysts, such as, for example, magnesium, carbon, plastics, etc., may suffice.

Hydride disk 1210 additionally preferably comprises at least one coating 1260, as shown. Coating 1260 preferably comprises interspersed Ni and stoichiometric $Mg_2Ni$. Eutectic compounds formed at surface 1250 between coating 1260, catalyst particles 1255 and magnesium in hydride disk 1210 preferably prevent separation of coating 1260 (at least herein embodying wherein such at least one metal surface portion comprises at least one thin surface-coating comprising substantially nickel and $Mg_2Ni$) from hydride disk 1210. Upon reading this specification, those skilled in the art will now appreciate that, under appropriate circumstances considering such issues as future technology, cost, materials, etc. other coatings, such as, for example, pure $Mg_2Ni$, pure nickel, plastics, cermets, etc., may suffice.

Figure 14:
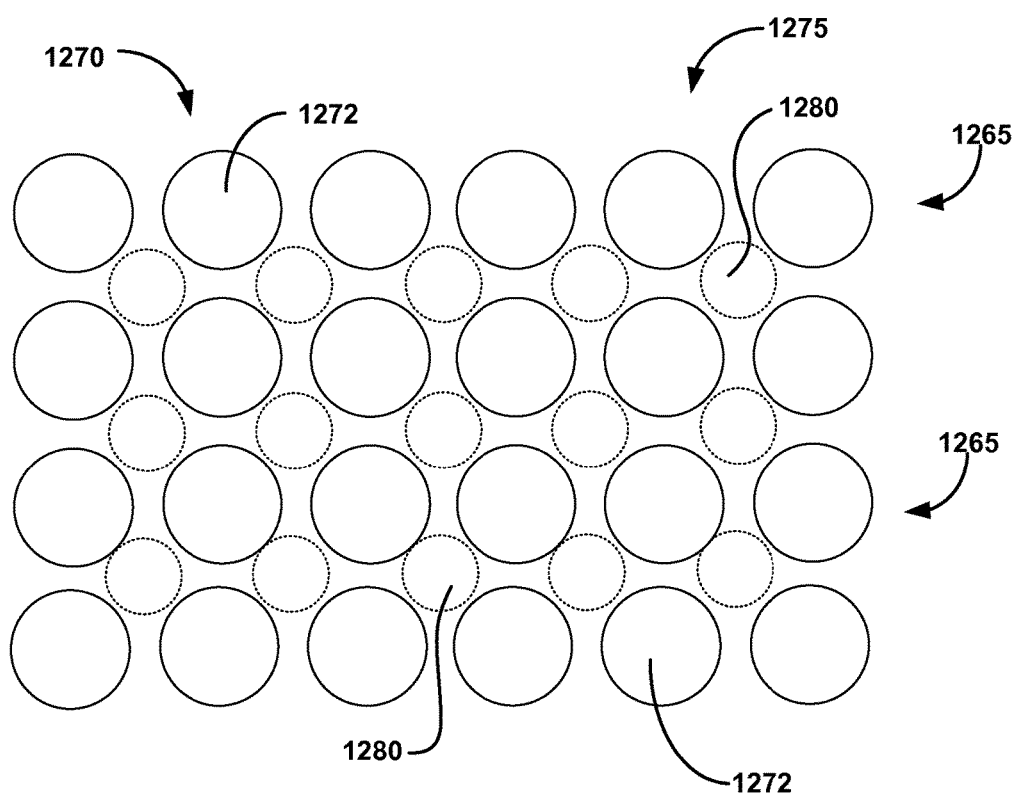
FIG. 14 shows a diagrammatic view, illustrating the atomic order of such preferred hydride disk, according to the preferred embodiment of FIG. 13.

FIG. 14 shows a diagrammatic view, illustrating the atomic order of hydride disk 1210, according to embodiment 1200 of FIG. 13. Hydride disk 1210 preferably comprises multiple layers 1265 of hydrogen-storing material 1270, preferably magnesium 1272, as shown. Hydrogen-storing material 1270 preferably comprises at least one crystalline structure 1275, as shown. Within crystalline structure 1275, hydrogen-storing material 1270 preferably stores hydrogen 1280, as shown.

Figure 15:
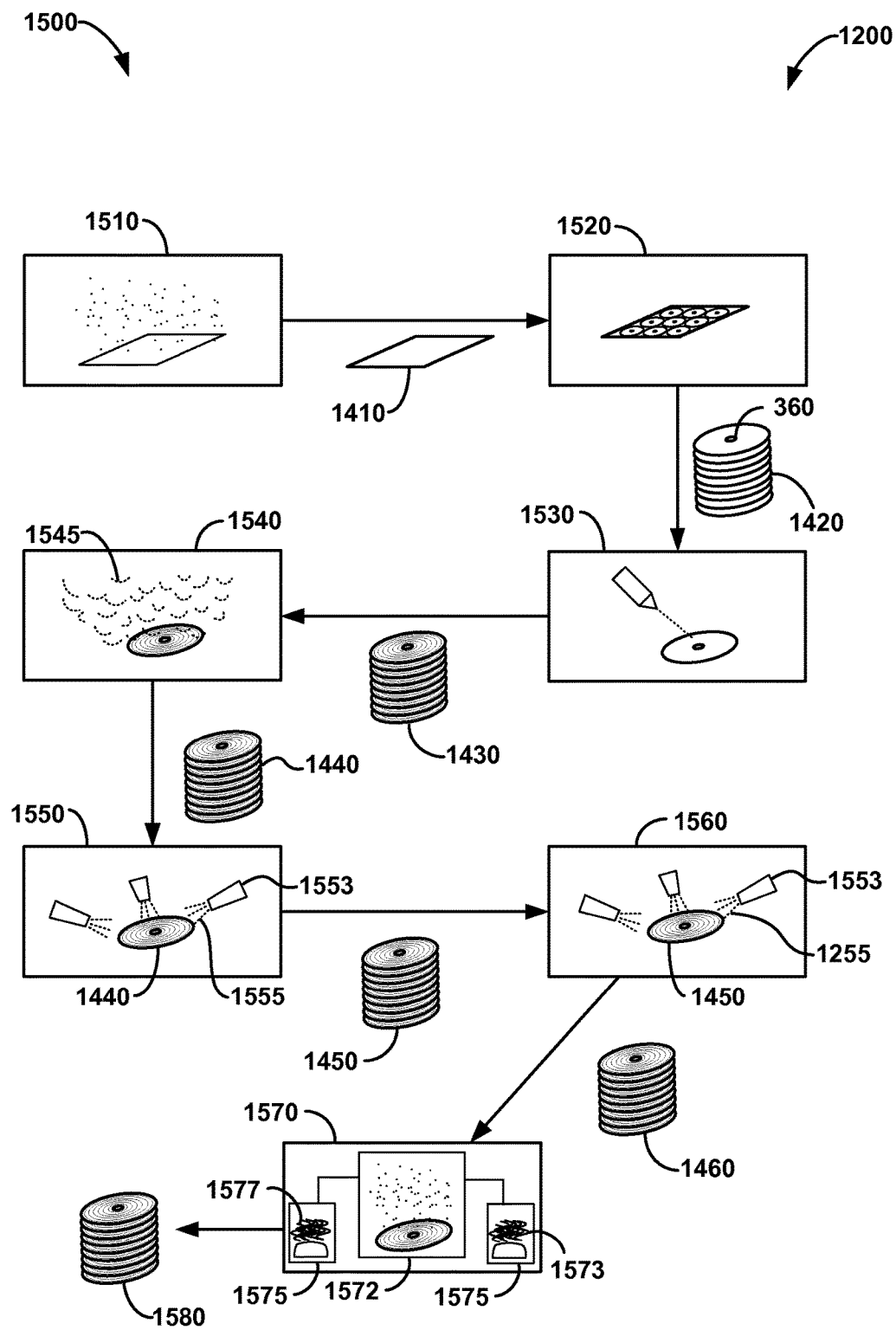
FIG. 15 shows a flow chart, illustrating at least one hydride disk manufacturing process, according to the preferred embodiment of FIG. 14.

FIG. 15 shows a flow chart, illustrating at least one hydride disk manufacturing process 1500, according to the preferred embodiment of FIG. 14. Hydride disk manufacturing process 1500 preferably comprises the steps of: precipitating sheet 1510; cutting disks 1520; perforating disks 1530; etching disks 1540; washing disks 1550; embedding catalysts 1560; and coating disks 1570. During hydride disk manufacturing process 1500, materials used and processes conducted are preferably kept in an inert atmosphere, alternately preferably under vacuum.

Figure 16:
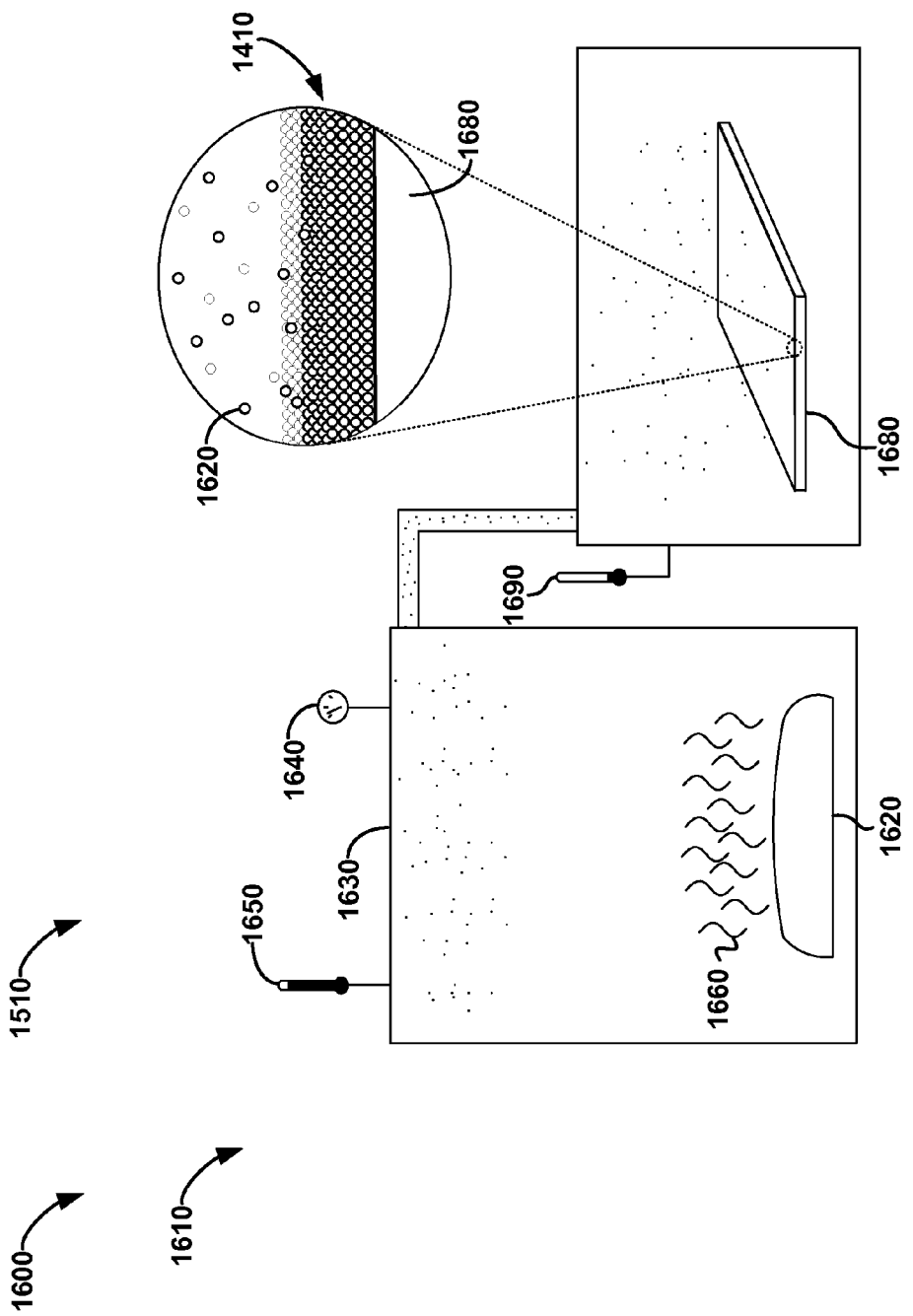
FIG. 16 shows a diagrammatic view, illustrating at least one sheet manufacturing process, according to the preferred embodiment of FIG. 15.

In step precipitating sheet 1510 (at least embodying herein precipitating at least one hydrogen storer material adapted to store hydrogen), at least one sheet 1410 of hydrogen-storing material 1270 is preferably precipitated using precipitation technique 1610, as shown in FIG. 16. Sheet 1410 preferably comprises about 99% by wt magnesium, preferably with a thickness of about 0.6 mm. Sheet 1410 is preferably fabricated with the addition of metals designed to provide enhanced strength, reduced reflectivity, and greater amalgamation when hydrated. Sheet 1410 preferably comprises magnesium, nickel, lithium, boron, aluminum, copper, zinc, and iron, in weight ratios as listed in Table 1.

TABLE 1

| Constituents of Specialty Mg Sheet | |
|---|---|
| Constituent | by Wt % |
| Magnesium | 99.95 |
| Nickel | $0.020 \geq \leq 0.025$ |
| Lithium* | $0.005 \geq \leq 0.010$ |
| Boron* | $0.005 \geq \leq 0.010$ |
| Aluminum | $\leq 0.005$ |
| Copper | $\leq 0.005$ |
| Zinc | $\leq 0.001$ |
| Iron | $\leq 0.001$ |

In step cutting disks 1520 (at least embodying herein cutting such at least one hydrogen storer material into at least one geometric shape), sheet 1410 (at least herein embodying wherein such at least one metal surface portion comprises precipitated magnesium plate adapted to be cut into disks and contain such holes) is preferably cut into at least one disk 1420, as shown, comprising a diameter of about 120 mm and a center hole 360 of about 15 mm diameter. Dimensions of disk 1420 are preferably horizontally similar to conventional compact disks which were introduced as removable storage medium (CD-R) in 1988. Upon reading this specification, those skilled in the art will now appreciate that, under appropriate circumstances, considering such issues as future technologies, costs, materials, etc., other disk manufacturing processes, such as, for example, directly precipitating disks, precipitating cylinders, etc., may suffice.

In step perforating disks 1530 (at least embodying herein perforating such at least one hydrogen storer material), disk 1420 is preferably perforated, preferably with greater than 500,000 perforations 1225, preferably forming at least one perforated disk 1430. At least one perforating process 1700 is discussed in connection with FIG. 17.

In step etching disks 1540 (at least embodying herein etching at least one surface of such at least one hydrogen storer material with at least one chemical), perforated disk 1430 is preferably briefly exposed to hydrochloric gas 1545, preferably between about 40% and about 50% concentration, preferably to provide a sub-micron surface texture. Such exposure to hydrochloric gas is preferably conducted at a temperature of about 70° C., preferably at about 2 psi, preferably for about 15 seconds. Step etching disks 1540 preferably produces at least one etched perforated disk 1440.

Following step etching disks 1540, etched perforated disk 1440 is preferably then placed in an inert atmosphere low pressure sandblaster. In step washing disks 1550 (at least embodying herein washing such at least one surface to remove such at least one chemical), etched perforated disk 1440 is preferably spun on a plate preferably placed about 25 mm from a series of circularly placed nitrogen gas nozzles 1553 married to separate vacuum feed and vacuum removal systems. etched perforated disk 1440 is preferably "washed" with <500 mesh about 99.95% atomized magnesium powder 1555 preferably under weak pressure of Nitrogen gas (about 99.999% purity) to preferably ensure no residual chlorine or $MgCl_2$ is left on etched perforated disk 1440, and preferably only trace amounts (<100 ppm) of $Mg(NH_3)_6Cl_2$ can be detected. Step washing disks 1550 preferably results in at least one washed disk 1450.

In step embedding catalysts 1560 (at least embodying herein embedding, in such at least one surface, at least one catalyst structured and arranged to assist hydrogenation of such at least one surface), nitrogen gas is then used to deliver catalyst particles 1255, preferably precipitated and atomized nickel (99.999+%) and palladium (99.99+%) powders, (at <500 mesh) to washed disk 1450. Delivery of catalyst particles 1255 is preferably conducted at between about 5 psi and about 15 psi for periods ranging from about 5 seconds to about 10 seconds. Overspray preferably nets a resultant exposure of about 0.05 seconds per square mm to catalyst particles 1255. Steps washing disks 1550 and embedding catalysts 1560 preferably provide the necessary catalyst particles 1255, through simple impact adhesion, to act as catalyst elements, preferably without significant ablation of magnesium in resulting catalyzed disk 1460 or reduction of the surface area created in step etching disks 1540. The impact of magnesium, nickel, and palladium powder preferably creates sub-micron fractures in the surface of catalyzed disk 1460 and preferably provides embedded particles (catalyst particles 1255) to preferably act as precipitation points for re-nucleation of magnesium when dehydrogenating from $MgH_2$.

In step coating disks 1570 (at least herein embodying coating such at least one surface with at least one surface reaction preventer), coating 1260 is preferably applied to catalyzed disk 1460. Nickel carbonyl and magnesium are preferably decomposed, preferably by sublimation, preferably in separate decomposition reactors 1575 resulting in gaseous nickel 1573 and gaseous magnesium 1577. Gaseous nickel 1573 and gaseous magnesium 1577 are preferably fed into reactor 1572. The atoms of gaseous nickel 1573 and gaseous magnesium 1577 preferably mix with each other as they preferably precipitate onto catalyzed disk 1460, which is preferably cooled. This process is repeated with cycles of heating and cooling of the disk. Coating 1260 is preferably created from the vapors of the impregnated magnesium and the gaseous precipitates. Coating 1260 preferably aids in preventing loss of stored hydrogen in storage. Step coating disks 1570 utilizes precipitation technique 1610, similar to step precipitating sheet 1510, using catalyzed disk 1460 as precipitation stage 1680 (see FIG. 16).

Hydride disk manufacturing process 1500 preferably yields at least one hydrogenation-ready disk 1580. Hydrogenation-ready disk 1580 preferably comprises about 9.5 grams preferably with an average pre-hydrogenation density of greater than 5 g/cubic cm for the surface 2 μm, preferably a density of greater than 1.8 g/cubic cm from a depth of 2 μm to 20 μm below the surface in perforated areas, and 1.74-1.78 g/cubic cm from 20 μm to the center 250 μm in areas which are not perforated.

FIG. 16 shows a diagrammatic view, illustrating sheet manufacturing process 1600, according to the preferred embodiment of FIG. 15. Sheet manufacturing process 1600 preferably comprises precipitation technique 1610, as shown. In precipitation technique 1610, at least one constituent component 1620 is preferably decomposed in at least one decomposition reaction chamber 1630. Decomposition reaction chamber 1630 preferably heats constituent component 1620 while maintaining a vacuum 1640. Temperature 1650 and vacuum 1640 preferably comprise at least one condition in which constituent component 1620 preferably sublimates forming at least one gaseous constituent component 1660.

Gaseous constituent component 1660 is preferably transferred into at least one precipitation chamber 1670. Precipitation chamber 1670 preferably cools gaseous constituent component 1660, preferably allowing gaseous constituent component 1660 to precipitate onto at least one precipitation stage 1680. Precipitation stage 1680 is preferably chilled to at least one precipitation temperature 1690. Precipitation technique 1610 preferably allows uniform distribution of multiple constituent components 1660, preferably molecularly layered, to form sheet 1410 using constituent components 1660 as listed in Table 1.

Upon reading the specification, those skilled in the art will now appreciate that, under appropriate circumstances, other sheet manufacturing processes, such as, for example, sputter precipitation, electrolytic precipitation, other future molecular layering techniques, etc., may suffice.

Figure 17:
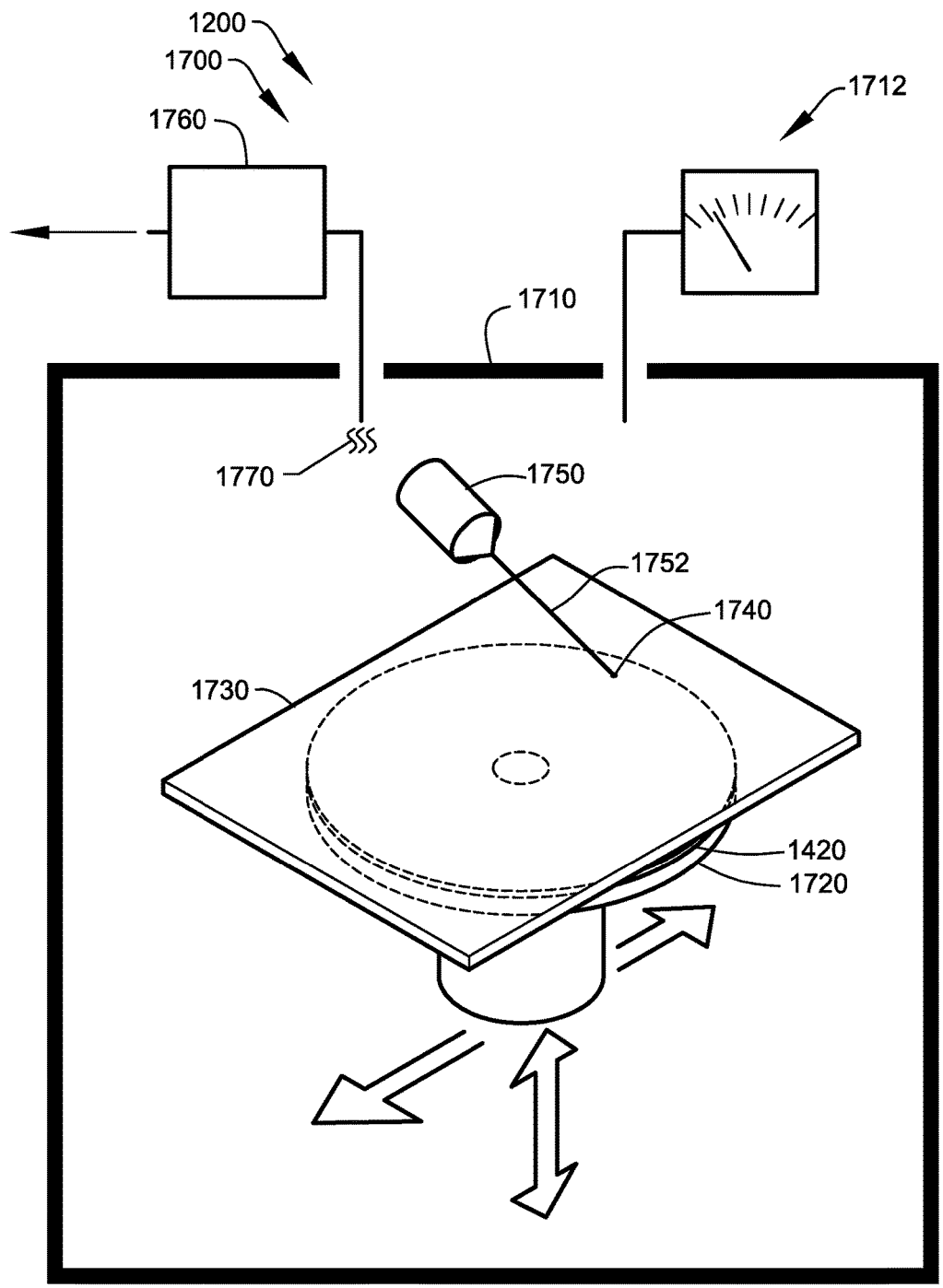
FIG. 17 shows a diagrammatic view of at least one drilling chamber, illustrating at least one perforating process, according to the preferred embodiment of FIG. 15.

FIG. 17 shows a diagrammatic view of at least one drilling chamber 1710, illustrating at least one perforating process 1700, according to the preferred embodiment of FIG. 15.

In perforating process 1700, disk 1420 is preferably placed in a cold inert atmosphere and preferably secured flat on at least one stage 1720, preferably comprising at least one submicron-sensitive 3-dimensional stage. Stage 1720 is preferably cooled; and drilling chamber 1710 preferably is kept under vacuum 1712. At least one pressure plate 1730 preferably comprises at least one orifice 1740. Pressure plate 1730 preferably covers disk 1420, preferably applying pressure in order to prevent warping during perforating process 1700. Orifice 1740 preferably exposes a circular surface area of about 0.7 mm in diameter of disk 1420. Stage 1720 preferably moves to expose different portions of disk 1420 during perforating process 1700.

At least one laser 1750 preferably perforates disk 1420, preferably through orifice 1740. Laser 1750 preferably comprises a Niobium-YAG laser. Laser 1750 preferably is collimated with the ability to focus a beam 1752 of about 45 μm diameter, preferably with a divergence of less than 2 percent. Laser 1750 is preferably incident at an about 45 degree angle to disk 1420. Upon reading the specification, those skilled in the art will now appreciate that, under appropriate circumstances, other perforating processes, such as, for example, wire drilling, plasma drilling, etc., may suffice.

At least one drilling sequence places perforations 1225 such that no perforations 1225 are placed within about 1 mm of a previously placed perforation 1225 during any about 1 minute period. At least one vacuum 1760 evacuates vaporized magnesium 1770 during perforating process 1700 for later reuse in step washing disks 1550. Warping is prevented by pressure plate 1730 and such at least one drilling sequence.

Figure 18:
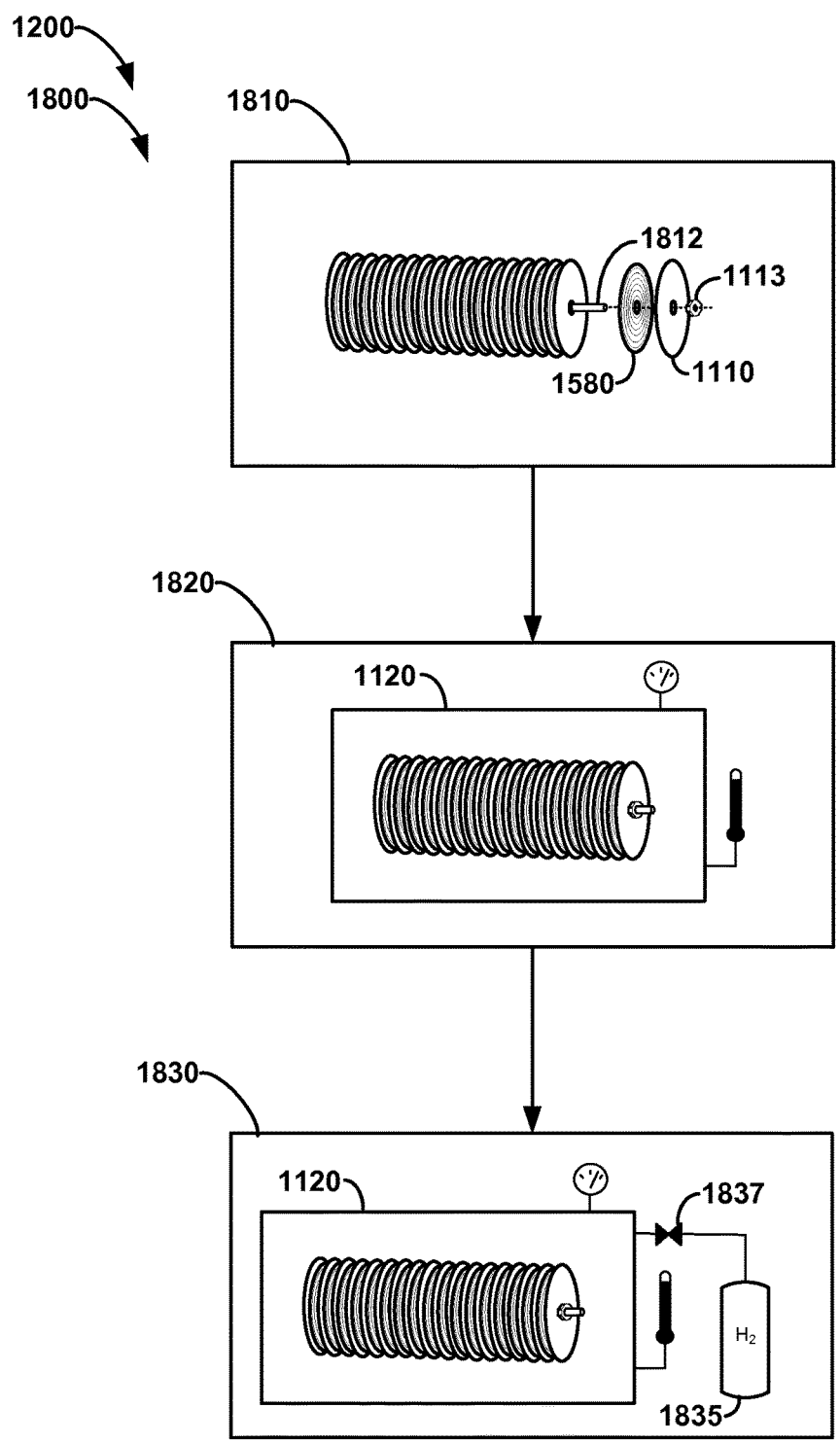
FIG. 18 shows a diagrammatic flow chart, illustrating at least one hydrogenation process, according to the preferred embodiment of FIG. 15.

FIG. 18 shows a diagrammatic flow chart, illustrating at least one hydrogenation process 1800, according to the preferred embodiment of FIG. 15.

Hydrogenation process 1800 preferably comprises placing hydrogenation-ready disks 1580 on at least one threaded spindle 1812 between at least one spacer 1110, as shown in step spindle disks 1810. Spacer 1110 preferably is cleaned and heat treated in a vacuum, to remove impurities, prior to use. Hydrogenation-ready disks 1580 are secured, between spacers 1110, with at least one nut 1113 on at least one threaded spindle 1812.

Hydrogenation process 1800 preferably employs at least one reactor 1120, preferably capable of temperatures of about 500° C. and preferably pressures in excess of about 65 bar. Hydrogenation process 1800 preferably takes place between about 55° C. and about 440° C. and preferably between about 2 bar and about 30 bar, preferably over periods ranging from about 2 hours to about 6 hours. Since magnesium approximates a closed packet crystalline structure, twinning is possible, and preferably desirable, in an enabled isometric configuration to improve hydrogen absorption and desorption kinetics. Therefore, hydrogenation process 1800 preferably uses a slow stepped process (temperature staging process 1820), preferably which avoids annealing as much as possible, and preferably allows equalized distribution of hydrogen in hydride disk 1210.

Hydrogenation process 1800 preferably uses bottled ultrapure (99.999%) hydrogen gas, preferably ALPHAGAZ 2, preferably cooled to near liquid state (cooled hydrogen 1835). During stage 1823 of temperature staging process 1820, small amounts of cooled hydrogen 1835 are preferably introduced by high speed, high pressure injection into reactor 1120. At least one injection valve 1837 preferably creates an about 1 μs blast of cooled hydrogen 1835 preferably about each second for an about 10 second interval. The about 10 second interval is preferably repeated about 10 times. Repeated introduction of the cold hydrogen preferably creates sonic pressure waves as cooled hydrogen 1835 expands supersonically inside reactor 1120. The super-sonic waves preferably facilitate cracking of coating 1260, and preferably permit deeper hydrogenation into hydrogenation-ready disks 1580, and preferably later adsorption from hydride disk 1210.

Figure 19:
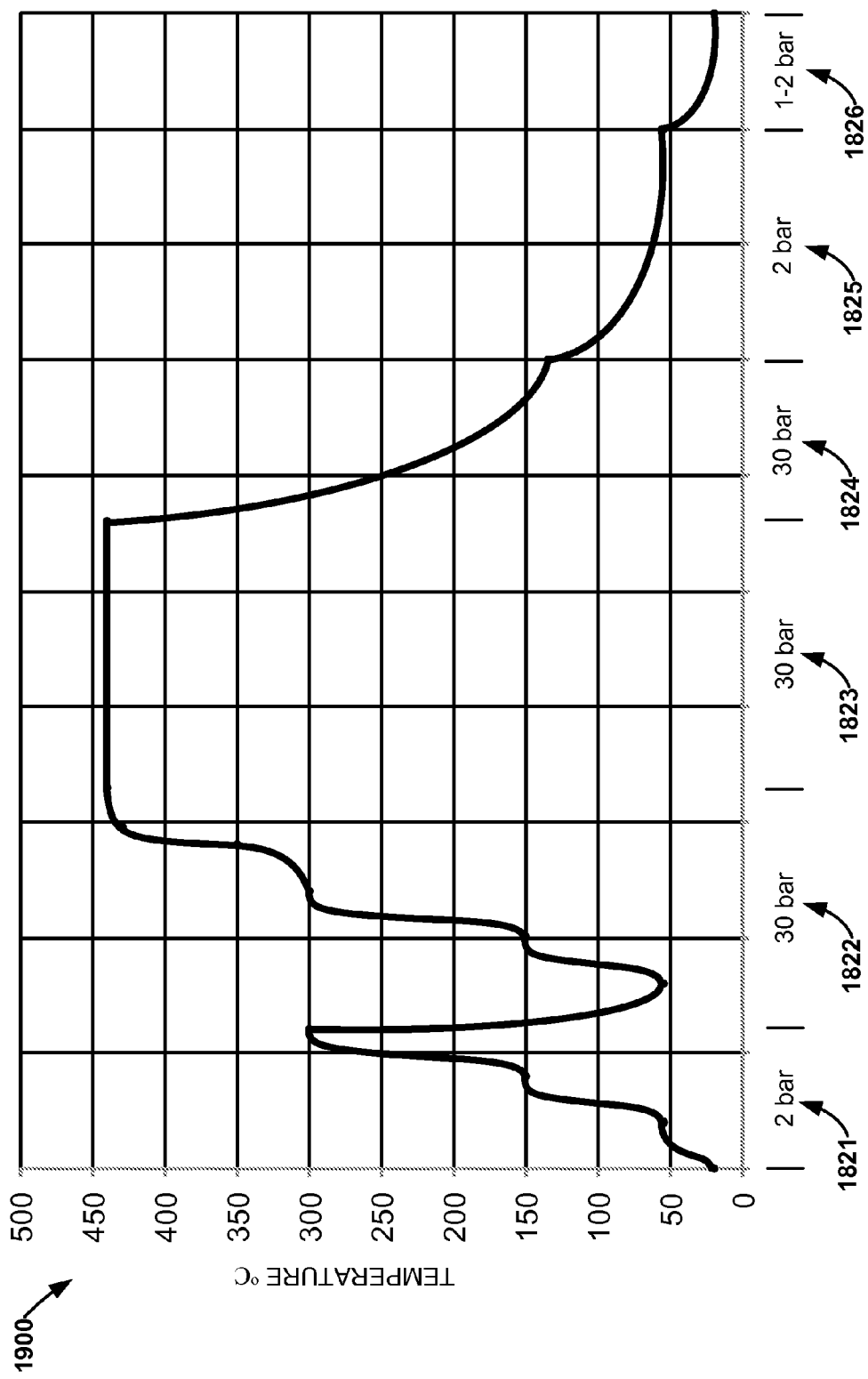
FIG. 19 shows a chart view illustrating temperature staging processes, during hydrogenation processes, according to the preferred embodiment of FIG. 18.

FIG. 19 shows a chart view illustrating temperature staging process 1820, during hydrogenation process 1800, according to the preferred embodiment of FIG. 18.

The temperature in reactor 1120 is preferably increased from about 20° C. slowly, and preferably allowed to reach equilibrium at about 55° C., about 150° C., and about 300° C. preferably over about 1 hour, in stage 1821. Stage 1821 comprises a constant hydrogen pressure of about 2 bar. In stage 1822, temperature is preferably then reduced to about 55° C. and pressure is preferably increased to about 30 bar. Temperature is preferably then increased and preferably allowed to reach equilibrium again at about 55° C., about 150° C., and about 300° C. preferably over about 1 hour. Stage 1822 also comprises a constant pressure of about 30 bar, preferably utilizing venting as temperature increases. Temperature is preferably then allowed to rise to about 440° C., preferably moving particularly quickly between about 350° C. and about 430° C. to reduce annealing.

In stage 1823, reactor 1120 preferably remains at about 440° C. temperature for about 1 additional hour before being cooled. In stage 1824, preferably while under constant hydrogen pressure of about 30 bar, reactor 1120 is preferably cooled to about 135° C. Pressure is preferably reduced to about 2 bar of hydrogen and hydride disks 1210 preferably cool further to about 55° C. preferably under a constant pressure of about 2 bar, in stage 1825. Hydride disks 1210 are preferably then removed to at least one inert gas oven at about 55° C. and about 1-2 bar, to undergo stage 1826. Hydride disks 1210 are preferably then cooled as the oven temperature reduces and inert gas is preferably added to ensure constant positive atmospheric pressure of about 1-2 bar.

Figure 20:
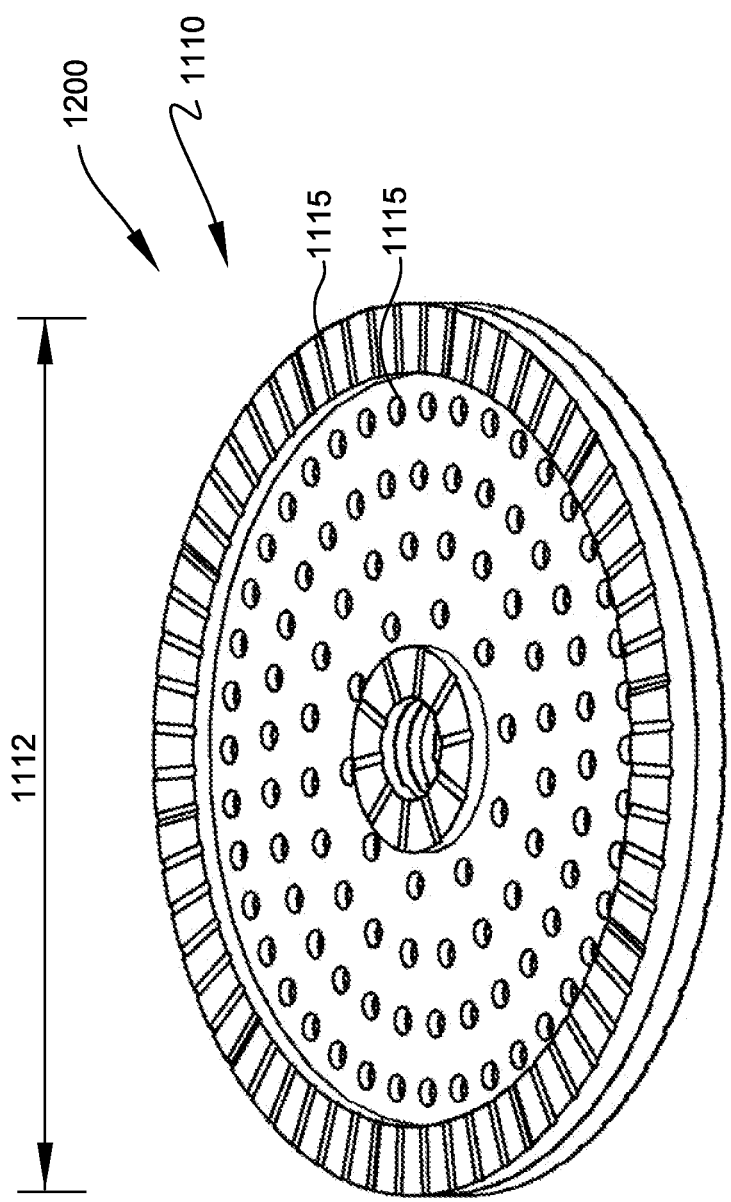
FIG. 20 shows a perspective view, illustrating a preferred spacer, according to the preferred embodiment of FIG. 18.

FIG. 20 shows a perspective view, illustrating spacer 1110, according to the preferred embodiment of FIG. 18. Spacer 1110 preferably comprises a thickness of about 3 mm. Spacer 1110 preferably comprises at least one ventilator 1115, preferably designed to allow hydrogen flow to as much surface area of hydrogenation-ready disk 1580 as possible. Spacer 1110 preferably prevents warping of hydrogenation-ready disk 1580 during hydrogenation process 1800. Spacer 1110 preferably comprises titanium, preferably 99.98% titanium. Spacer 1110 preferably comprises an outer diameter 1112 of about 130 mm, preferably extending beyond outer diameter 1214 of hydrogenation-ready disk 1580 to account for expansion during hydrogenation process 1800.

Upon reading the teachings of this specification, those skilled in the art will now appreciate that, under appropriate circumstances, considering such issues as cost, future technologies, etc., other hydrogenation methods, such as, for example, laser-induced plasma ionization hydrogenation, thermal heating hydrogenation using chemical, physical or laser cooling of the medium, switched multi-frequency light activation hydrogenation, etc., may suffice.

Figure 21A:
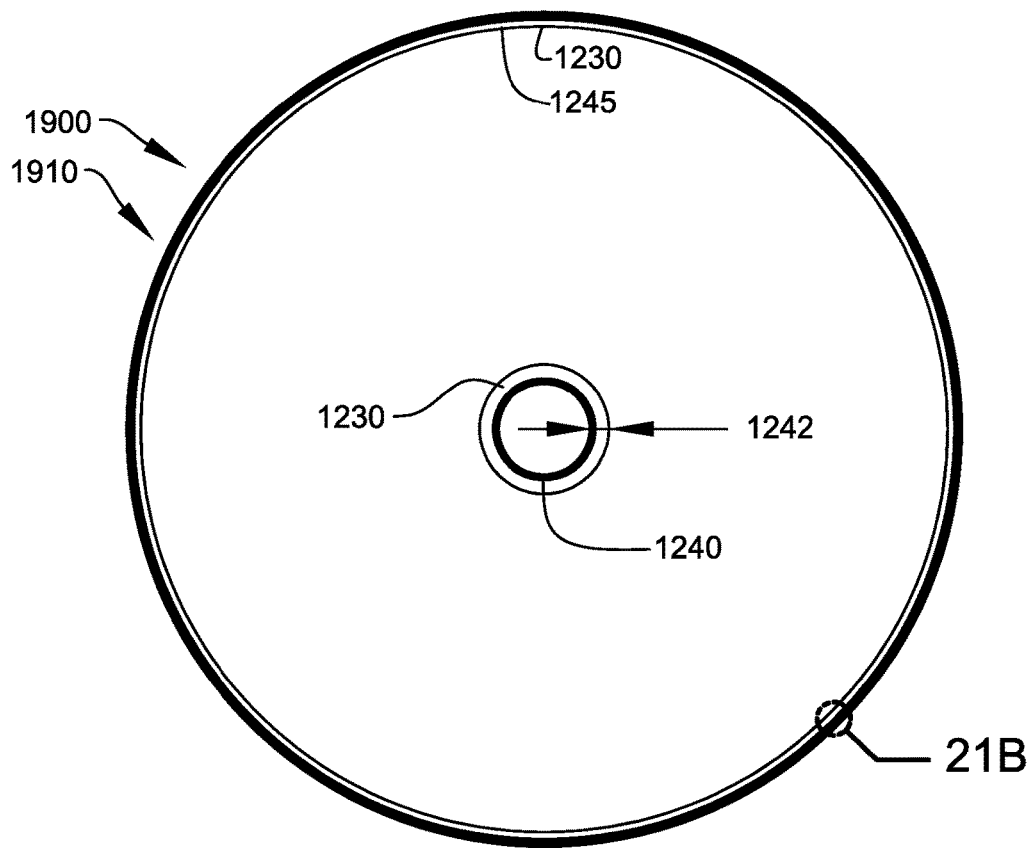
FIG. 21A shows a plan view illustrating at least one hydride disk according to an alternate preferred embodiment of the present invention.

FIG. 21A shows a plan view illustrating at least one hydride disk 1910 according to a preferred embodiment of the present invention.

Figure 21B:
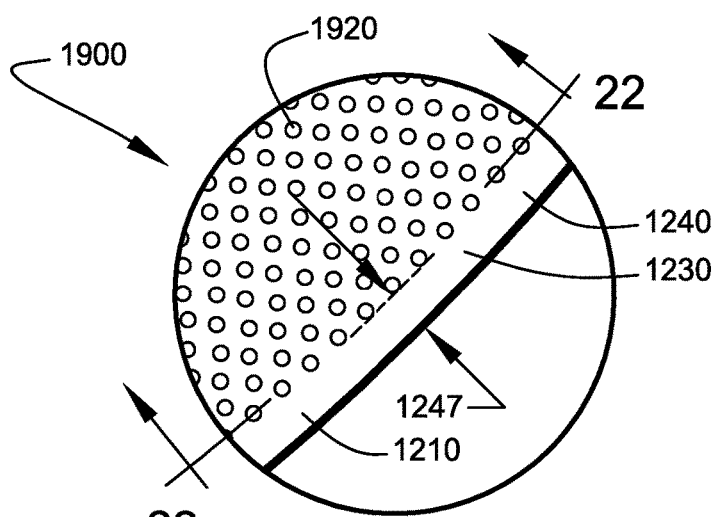
FIG. 21B shows a magnified view of such preferred hydride disk according to the preferred embodiment of FIG. 21A.

FIG. 21B shows a magnified view of hydride disk 1910 according to the preferred embodiment of FIG. 21A.

Figure 22:
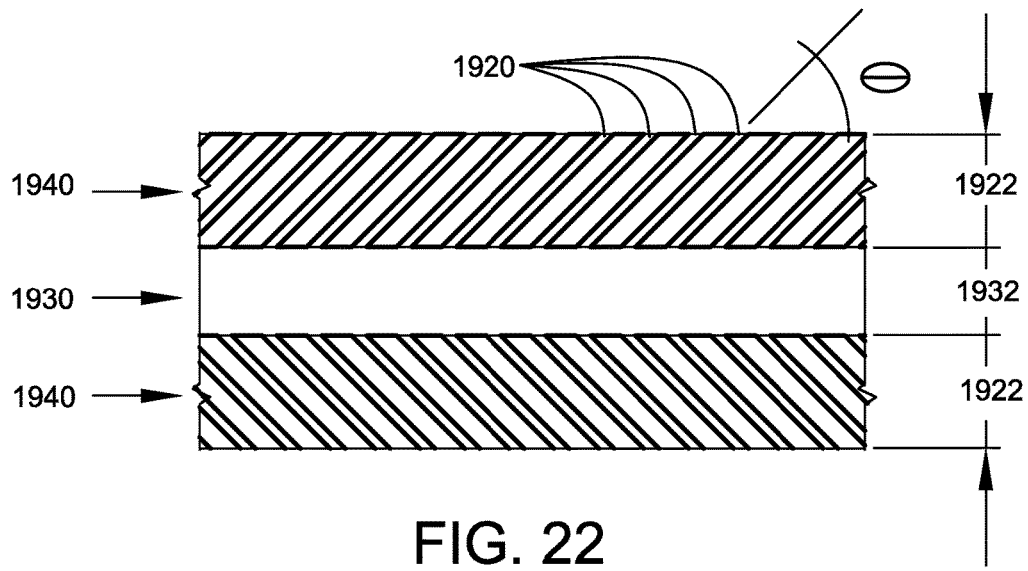
FIG. 22 shows an enlarged view of section 22-22 of FIG. 21B.

FIG. 22 shows an enlarged view of section 22-22 of FIG. 21B.

Referring to FIG. 21A, FIG. 21B and FIG. 22, an alternative method of disk fabrication preferably includes precipitation of constituent components 1620 (as in precipitation technique 1610) onto at least one core disk 1930 preferably comprising a thickness 1932 of about 0.1 mm. Core disk 1930 preferably comprises carbon, preferably carbon fiber. Core disk 1930 (at least herein embodying wherein such at least one metal surface portion comprises at least one thin, stiff non-magnesium frame structured and arranged to add stiffness) preferably provides stability to hydride disk 1910, to replace non-perforated band 1235 as structural integrity maintainer 1230.

Core disk 1930 preferably comprises hydrogen passages 1920 which are preferably closed at the top. Hydrogen passages 1920 preferably rise from core disk 1930 about 0.2 mm, preferably at an angle θ of about 45°. Hydrogen passage 1920 comprises a diameter of about 0.0001 mm (100 nanometers), and preferably are perforated to allow passage of hydrogen between hydrogen passage 1920 and hydride disk 1910.

Precipitation preferably produces at least one layer 1940 of constituent components 1620 to a thickness 1922 of about 0.2 mm on each side of core disk 1930. After precipitation hydrogen passages 1920 are preferably sanded opened to reveal holes similar to perforations 1225 and providing the possibility of more than 5 million hydrogen passages 1920 per hydride disk 1910, which increases surface area and Hydrogen adsorption, without reducing strength or storage capacity.

Figure 23:
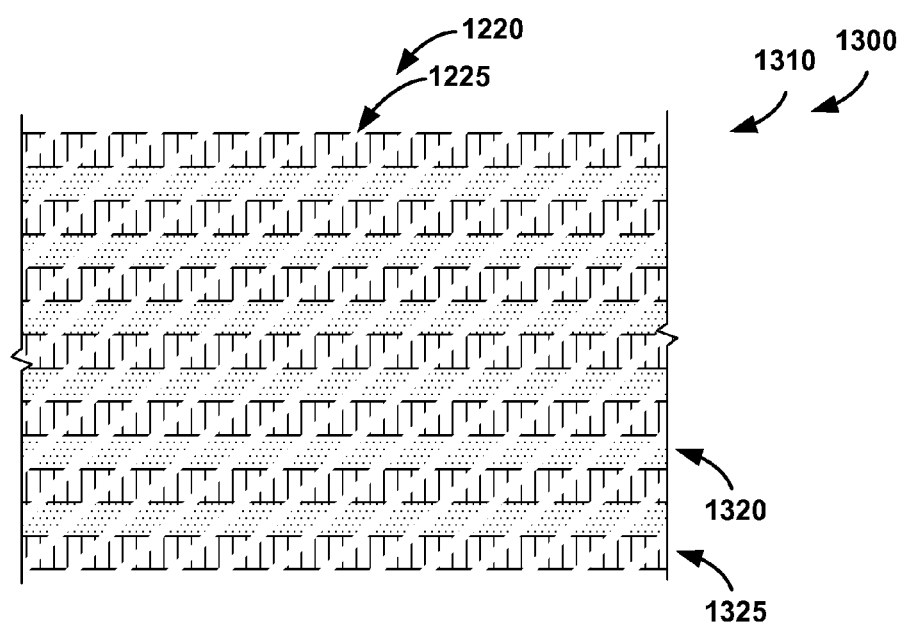
FIG. 23 shows an enlarged view of section 22-22 of FIG. 21B according to an alternately preferred embodiment of the present invention.

FIG. 23 shows an enlarged view of section 22-22 of FIG. 21B according to an alternately preferred embodiment of the present invention.

Although most features of embodiment 1300 are repeated from preferred embodiment 1200, in embodiment 1300, as shown, embodiment 1300 preferably comprises hydride disk 1310, as shown. Hydride disk 1310 preferably comprises at least one magnesium layer 1320 and at least one Nitinol (TiNi) layer 1325. Like in hydride disk 1210, hydride disk 1310 preferably comprises perforations 1225, however in hydride disk 1310, multiple perforations 1225 are preferably spaced about 100 μm apart (measured center-to-center).

Magnesium layer 1320 preferably comprises at least one magnesium and nickel formula, in the form of small-grain, semi-porous, deposited and perforated material, preferably formed and preferably perforated in an anaerobic environment (≤50 ppm oxygen) with the 99.99% purity constituents (Table 2) listed below.

TABLE 2

Constituents of Specialty Mg layer

| Element | Min wt % | Max wt % | Moles/100 g | Purpose |
|---|---|---|---|---|
| Magnesium | 98.45 | 98.55 | 4.0451 | $H_2$ storage α, β, γ |
| Nickel | 1.45 | 1.55 | 0.0256 | $H_2$ storage/kinetics/elect-opt α, β |
| Oxygen | 0.00 | ≤50 ppm | 0.0 | contaminant/lowers storage |

Nitinol (TiNi) layer 1325 preferably comprises at least one substrate employed for vapor deposition of Magnesium layer 1320. Nitinol (TiNi) layer 1325 preferably is baked to allow super-elasticity prior to vapor deposition. The vapor deposited (electron beam) magnesium and nickel material grain sizes are preferably similar to those achieved with equal channel angular pressing at temperatures, which preferably permit homogenous and bimodal grain structures preferably with nano-grains and a small volume fraction of micro-grains. Material grain sizes are preferably in the range of about 0.4 μm to about 1.1 μm, preferably with a mean value of the planar grain size of less than about 500 nm, with twins included as grain boundaries. Nitinol (TiNi) layer 1325 preferably provides super-elasticity to the deposited material and allows Hydride disk 1310 to return to the required shape repeatedly after hydrogen absorption and desorption cycles.

Magnesium layer 1320 preferably comprises structures of stacked partial glancing angle vapor deposition solid sheet magnesium and nickel, preferably with a small grain size (<500 nm diameter), preferably with micro-fractures which preferably localizes material of nano-clusters preferably with only about 2500 nm between fractures, and preferably beam channeling microstructures (50 μm diameter perforations 1225), preferably deposited on Nitinol (TiNi) layer 1325. Preferably, Multi-gun plasma magnetron sputtering, alternately preferably, plasma enhanced magnetron sputtering (PEMS), alternately preferably, ion-beam assisted deposition (IBAD), alternately preferably, e-beam evaporation (EVAP) may be used to create Magnesium layer 1320. Magnesium layer 1320 preferably comprises suitable semi-porosity, preferably micro-fractures, preferably solidity, and preferably adequate surface area to effect laser-induced desorption. Alternately preferably, hydride chemical vapor deposition (HCVD) may be used with a formula which includes hydrogen and preferably results in mixtures of $MgH_2$ and $Mg_2NiH_4$.

Light beam channeling microstructures (perforations 1225) are preferably placed in the material with a focused laser beam preferably in a trepanning manner, alternately preferably in a compounding manner. Perforations 1225 are placed about 100 μm on center apart, and are preferably created at about a 45 degree angle to the surface. Perforations 1225 may preferably be drilled blind (not through Nitinol (TiNi) layer 1325) when only a single layer of material (thin foil) is to be used. Note that normally layers will preferably be stacked, as shown, and blind holes will not be used.

The storage structure of hydride disk 1310 is preferably porous and preferably has channels to allow hydrogen and light into, and out of, the material. The fabrication process preferably provides perforations 1225 at about a 45 degree angle to the surface, with a preferred diameter of about 50 μm prior to hydrogen absorption. Perforations 1225 will shrink due to expansion during hydrogen absorption. While the overall material volume change is on the order of 8 to 15%, the holes tend to close by more than 20% and have a diameter of about 36 μm after hydrogen absorption. The channels preferably have an average population density between about 300 and about 440 channels per 0.01 cm2. The internal porosity preferably contains about 1000 macro and meso-pores (open cell) per inch. Fabrication is preferably conducted in an anaerobic atmosphere. Initial hydrogen absorption and degassing, with medium vacuum, preferably will rupture any closed cell structures.

Applicant has found through testing that this preferred formula (Mg+MgNi) and preferred structure (NiTi—Mg+MgNi—NiTi) absorb hydrogen at modest temperature and hydrogen pressure. What Applicant found to be remarkable and novel is the effect that UV (100 nm to 400 nm) and IR laser light (400 nm to 1 mm) have on the sorption kinetics of the material. The dielectric created by the hydrogen material ($MgH_2+Mg_2NiH_4$) (higher insulation), while stacked between layers of a partially hydrogenated Nitinol (NiTi) metal material (lower insulation) creates multi-layers of surface plasmon polaritons. The interface between the layers gives rise to coupled modes in the metal-insulator-metal heterostructure. The ability to control wave vectors through these structures can preferably be attained with geometry, including the holes drilled in the material, and also preferably with triangular V-grooves in the surfaces of the Nitinol metal. The localized surface plasmons in the metal nano-particles and near the insulator nano-particles, allows electromagnetic energy to be confined into a volume less than the diffraction limit. This leads to field enhancement and supports emissive processes which further the effect of the UV and laser light in photon-molecular interactions. In addition, the preferred structures selected, and preferred frequencies used, preferably allow coupling of the electromagnetic field to lattice vibrations at infrared frequencies, and preferably give rise to localized and propagating surface phonon polaritons. This preferred arrangement preferably provides that photonics with phonons at infrared frequencies and plasmonics at lower frequencies preferably provide sub-wavelength energy localization, preferably with evanescent waves, and together preferably contribute to the enhanced sorption kinetics observed by Applicant in the magnesium-hydrogen complexes and structures developed with drilled beam-channel holes, as described herein, and also with triangular V-grooves. Upon reading the teachings of this specification, those skilled in the art will now appreciate that, under appropriate circumstances, considering such issues as cost, future technologies, etc., other substrates, such as, for example, silicon substrates, other nickel substrates, gold substrates, iron substrates, etc., may suffice.

Upon reading the teachings of this specification, those skilled in the art will now appreciate that, under appropriate circumstances, considering such issues as cost, future technologies, etc., other light sources, such as, for example, UV LED, deuterium lamp, laser irradiation, IR electromagnetic energy, diode, diode pumped lasers, active gain media fiber lasers including ytterbium at 1080 nm, multi-wavelength (stable single-, dual- and triple-wavelength dissipative soliton) in a dispersion fiber laser passively mode-locked with a semiconductor saturable absorber with active mode locking (SESAM), etc., may suffice.

These preferred nano-optic and plasmonic effects, in combination with the previously claimed beam channeling, electromagnetic, and electro-optical properties, provides insight into the exceptional excitation energies noted in release of hydrogen, from preferred formulated and structured metal hydrides, by electromagnetic irradiation.

Figure 24:
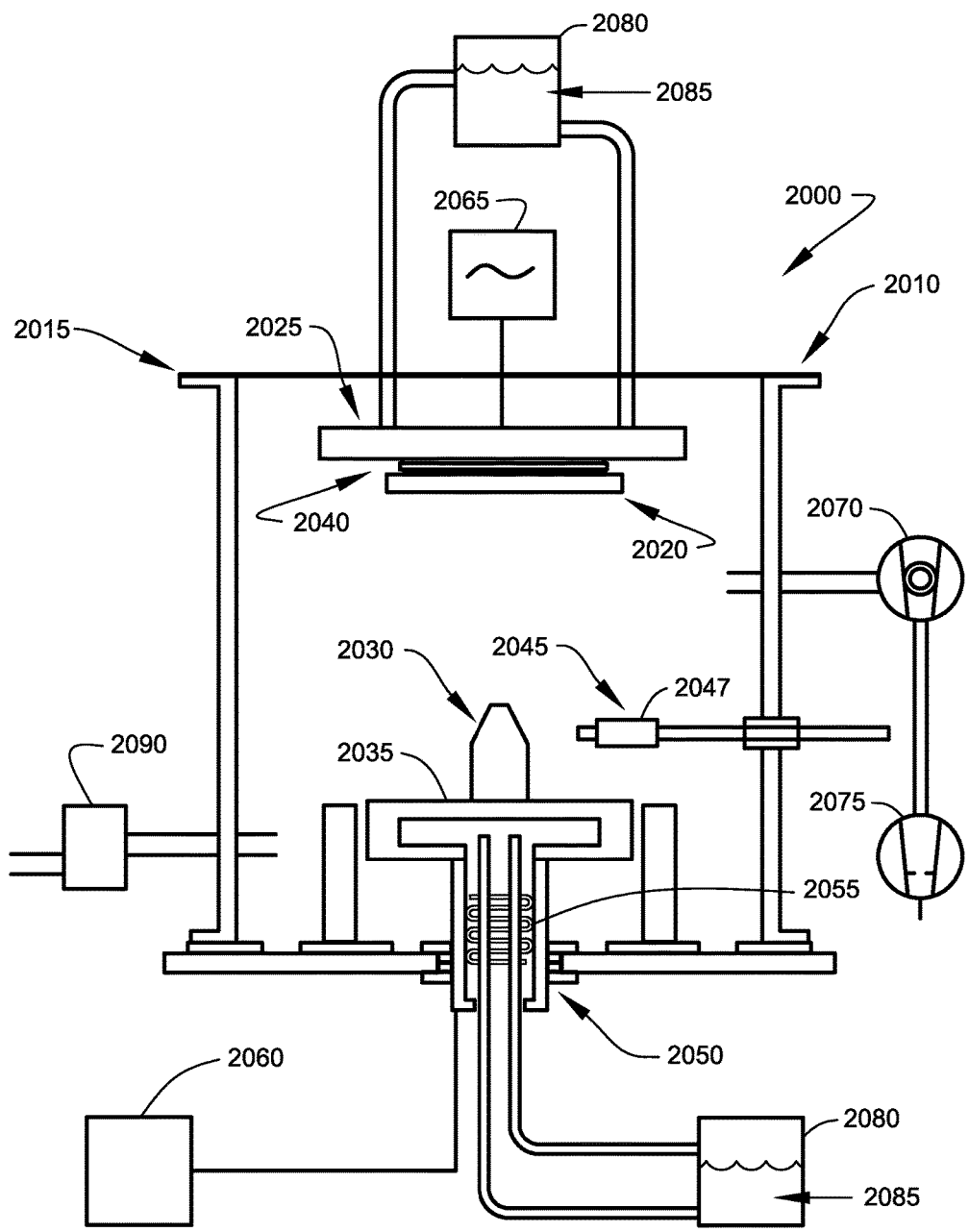
FIG. 24 shows a diagrammatic view of at least one filtered cathodic arc deposition apparatus according to an alternately preferred embodiment of the present invention.

FIG. 24 shows a diagrammatic view of at least one filtered cathodic arc deposition apparatus 2010 according to an alternately preferred embodiment of the present invention. Material manufacturing method 2000 preferably uses filtered cathodic arc deposition apparatus 2010.

Material manufacturing method 2000 preferably is used to produce hydride disks 1310, for use in hydrogen energy system 100. Material manufacturing method 2000 preferably comprises plasma-assisted processes to produce hydride disks 1310. Such plasma-assisted processes preferably create the addition of micro-structures similar to those previously mentioned. Preferred hydride disks 1310, fabricated with the preferred constituents previously mentioned (see Table 1), are demonstrated to have the preferred capacity for hydrogen storage, when preferably fabricated by such plasma-assisted processes.

Material manufacturing method 2000 preferably fabricates hydride disks 1310 with layered constituents preferably comprising primarily magnesium, alternately preferably magnesium and nickel (Table 1), preferably between nickel-titanium (Nitinol) layers to a thickness between 0.06 micrometers and 0.6 mm. While various steps of material manufacturing method 2000 are ordinarily uncommon in magnesium deposition, they are useful as preferred fabrication steps of the preferred hydrogen storage material described in this application. Specifically, magnetron sputtering techniques, including ion-beam sputtering, are preferably used for the non-hydrogen containing material fabrication, and reactive sputtering techniques are preferably used in the fabrication of hydrogen containing material fabrication. The hydrogen containing material is nearly identical in composition and structure to the non-hydrogen containing material with the difference that the hydrogen is preferably added to the material during fabrication, rather than as a separate reactor-based process. These processes preferably allow small grain sizes of magnesium and nickel and preferably permit absorption and desorption of hydrogen with light irradiation.

In addition, filtered cathodic arc vapor deposition of the primarily magnesium and magnesium and nickel constituents, both with and without hydrogen present in the fabrication process, is alternately preferably a useful method employed for fabricating the preferred hydrogen storage material.

The cathodic arc vapor deposition technique is primarily employed in the formation of coatings or films for use in tribological applications, such as the formation of wear-resistant coatings for cutting tools, bearings, gears, and the like. These wear-resistant coatings have been made from plasmas formed from titanium or graphite sources. When a titanium source material is used, a reactive gas such as nitrogen is often introduced into the deposition chamber during the vaporization of the titanium source. The nitrogen gas reacts with the titanium, and the coating plasma within the chamber comprises Ti, N.sub.2 and TiN. The TiN forms a coating that has been found to be a very durable coating. A graphite source material is used to form diamond-like carbon (DLC) films, tetrahedral amorphous carbon (ta-C), and carbon nitrogen (C:N) films. —reference U.S. Pat. No. 6,100,628 and other descriptions can be found in U.S. Pat. No. 3,393,179 to Sablev, et al., U.S. Pat. No. 4,485,759 to Brandolf, U.S. Pat. No. 4,448,799 to Bergman, et al., and U.S. Pat. No. 3,625,848 to Snaper The use of the cathodic arc vapor deposition technique for magnesium and magnesium and nickel hydrogen storage material fabrication is novel in at least use to construct a whole material not merely a coating. Important to this preferred process is the preferred ability to create microstructures, preferably including columnar micro and nano-structures which preferably permit minimal particle grain size, and preferably permit desorption of hydrogen with incident photonic irradiation.

A process chamber 2015 preferably holds a deposition substrate 2020 where the film-like material is deposited, preferably at least one cathode 2030 that contains the material to be deposited, and preferably anodes (triggering anode 2045 and process anode 2040) for creating an electrical potential to preferably vaporize cathode 2030. Deposition substrate 2020 is preferably held at a distance of about 25 centimeters along a line of sight preferably from cathode 2030. Deposition substrate 2020 preferably comprising nickel titanium (Nitinol), alternately preferably poly(4,4'-oxydiphenylene-pyromellitimide) (Kapton®). Cathode 2030 preferably comprises a solid high purity magnesium source, alternately preferably magnesium, to which preferably solid high purity nickel is preferably added, by recessing nickel rods in the magnesium, preferably in amounts to comprise about 2 percent by weight. Upon reading the teachings of this specification, those skilled in the art will now appreciate that, under appropriate circumstances, considering such issues as future technologies, available materials, cost, etc., other cathodes, such as, for example, a pressed powder solid cathodes of magnesium, a pressed powder solid cathodes of magnesium and nickel powders, premixed molded magnesium and nickel cathodes, other cathodes of hydrogen storing materials, etc., may suffice.

Process chamber 2015 preferably comprises a portion which is preferably wound with at least one copper coil 2055 to form an electromagnet 2050. Electromagnet 2050 preferably creates an electric field preferably used during the deposition of the hydrogen storage material from cathode 2030 on to deposition substrate 2020. The field strength preferably comprises between about 0 Tesla to about 0.2 Tesla. A wave controllable voltage source 2060 is preferably coupled to cathode 2030 (preferably the magnesium and nickel source) to provide an electric arc which preferably operates between cathode 2030 and triggering anode 2045 (preferably comprising tungsten) to vaporize the magnesium or magnesium and nickel from cathode 2030, preferably forming plasma. The electric arc is preferably maintained between the magnesium or magnesium and nickel source which is preferably electrically biased to serve as cathode 2030, and triggering anode 2045, preferably spaced apart a suitable distance to initiate the arc of electrical discharge. Process chamber 2015 and process anode 2040 attached to deposition substrate 2020 preferably take over to conduct vaporized magnesium and nickel particles toward substrate 2020.

The electric arc preferably carries high electric current levels, preferably from about 25 amperes to about 300 amperes and preferably vaporizes the magnesium and nickel into a coating plasma. Desired microstructural components of the deposited metal hydrogen storage film are preferably improved by controlling the movement of the arc over the surface of the magnesium and nickel source. A suitable magnesium and nickel hydrogen storage film is preferably formed by controlling: the magnetic field generated by electromagnet 2050 of process chamber 2015; the distance between cathode 2030 and deposition substrate 2020; the thermal velocity imparted to the plasma during vaporization;

and the electrical potential difference between deposition substrate 2020 and cathode 2030. Deposition substrate 2020 is preferably held at a negative voltage preferably within a range of about 0 volts to about 1000 volts.

At least one negative biasing controller 2065 preferably provides at least one negative bias to deposition substrate 2020. When non-conductive substrates and/or non-conductive deposition materials are used, negative biasing controller 2065 preferably comprises at least one radio frequency voltage source. Metal hydrogen storage films are preferably deposited on nickel titanium foil and Kapton® film. The deposition on these non-conductive substrates requires such at least one radio frequency voltage source preferably operably coupled to the substrate to provide it with a negatively biased voltage. Such at least one radio frequency voltage source is also required when hydrogen is added to the material during deposition, as the deposition material (magnesium hydride and magnesium nickel hydride) then is non-conductive. When using conducting substrates, such as silicon or stainless steel, and depositing only conductive deposition materials, such as metal film (without hydrogen), negative biasing controller 2065 preferably comprises at least one DC bias source, alternately preferably at least one low frequency pulsed power source (up to 100 kHz). Upon reading the teachings of this specification, those skilled in the art will now appreciate that, under appropriate circumstances, considering such issues as cost, available materials, future technologies, etc., other negative biasing controllers, such as, for example, grounds, other DC sources, other frequency sources, etc., may suffice.

Material manufacturing method 2000, comprising filtered cathodic arc deposition method, of preparing the magnesium hydrogen storage material is preferably performed in a relative vacuum with a base pressure between about 0.0000005 Torr ($5\times10^{-7}$ Torr) and about 0.00001 Torr ($1\times10^{-5}$ Torr). Higher pressures between about 0.0001 Torr and about 0.5 Torr preferably result when the material is processed to contain hydrogen during the deposition process. The pressure rise results from the introduction of hydrogen and argon gases to stabilize the electric arc and to preferably incorporate hydrogen into the deposition material as magnesium hydride and magnesium nickel hydride. Applicant has found that the resulting film thickness is similar, as preferred, to previously described physical vapor depositions of magnesium and nickel film performed with ion-beam sputtering and reactive sputtering mentioned, and that using the filtered cathodic arc deposition method provides particularly useful results for hydrogen storage within the range of about 0.05 micrometers and about 20 micrometers. The deposited material contains grain sizes similar to those achieved with physical vapor deposition with sputtering in the range of about 18 nm to about 225 nm. The deposited material with grain sizes greater than about 150 nm are preferably created with hydrogen added during the fabrication process and reflect the higher partial pressure created by addition of hydrogen to process chamber 2015. The smaller grain sizes reflect lower operating pressures capable without the addition of gas during the fabrication process. Deposited material preferably forms into a unified material, and is preferably manipulatable as a unit. Further, due to the granular deposition of material, such unified material comprises a unified matrix of granular material. Such unified matrix permits use as a hydrogen storage medium that is a whole solid and not subject to the limitations of liquids and powders.

After completing the filtered cathodic arc deposition method to create a hydrogen storage material, hydrogen storage material is further processed to create hydride disks 1310. The hydrogen storage material may preferably comprise a homogeneous layer of material, alternately preferably alternating layers of Mg+Ni and NiTi, as previously discussed. Additionally, the hydrogen storage material is preferably laser drilled at a 45 degree angle, as previously discussed (see at least FIG. 23), to permit light transmission through the stacked layers for greater hydrogen storage capacity and interaction with laser light.

Example 1

Referring to FIG. 24, there is depicted a schematic representation of filtered cathodic arc deposition apparatus 2010 suitable for performing the preferred steps of material manufacturing method 2000 for forming a primarily magnesium and magnesium and nickel hydrogen storage material preferably resulting with preferred grain sizes and micro and nano-structures. Such hydrogen storage material preferably is capable of absorbing hydrogen and desorbing hydrogen preferably by excitation with photonic irradiation, as described in this application. Filtered cathodic arc deposition apparatus 2010 is preferably configured and operated so as to produce magnesium and magnesium nickel films, preferably in a vacuum of about 0.0000005 Torr ($5\times10^{-7}$ Torr). Such magnesium and magnesium nickel films preferably comprise a thickness between about 15 microns and about 20 microns. Additionally such magnesium and magnesium nickel films preferably comprise grain sizes less than about 150 nm, preferably with an average near about 50 nm. Process chamber 2015 of filtered cathodic arc deposition apparatus 2010 is preferably evacuated to a vacuum of about $5\times10^{-7}$ Torr, preferably by at least one turbomolecular pump 2070 and at least one rotary vane pump 2075. Process chamber 2015, substrate holder 2025 and cathode holder 2035 are preferably cooled with at least one coolant circulator sub-system 2080, preferably circulating at least one water and glycol solution 2085. Substrate holder 2025, coupled to negative biasing controller 2065, preferably provides a secondary potential to substrate 2020 with a negative potential comprising about −100 volts. Substrate 2020 (preferably stainless steel) is preferably placed in contact with substrate holder 2025 to provide the indicated negative potential, and is preferably placed about 25 cm above cathode 2030 (preferably magnesium and nickel). Upon reading the teachings of this specification, those skilled in the art will now appreciate that, under appropriate circumstances, considering such issues as cost, future materials, future technologies, etc., other substrates, such as, for example, nickel titanium (Nitinol), Kapton®, nickel foil, silicon, etc., may suffice.

Electrical potential is preferably established between substrate 2020 and cathode 2030. Additionally, a magnetic field, comprising about 0.01 Tesla, is preferably established with electromagnet 2050, comprising copper coils 2055 wound around cathode holder 2035. Wave controllable voltage source 2060, preferably comprising a first square wave voltage source with low voltage and high amperage, is preferably operably coupled to cathode 2030 to provide the electric arc which operates on the magnesium and nickel source. Triggering anode 2045 preferably comprises at least one arc-initiating trigger element 2047, preferably comprising tungsten. Arc-initiating trigger element 2047 is preferably brought into close proximity with cathode 2030. Upon reading the teachings of this specification, those skilled in the art will now appreciate that, under appropriate circumstances, considering such issues as cost, future technologies, available materials, etc., other trigger elements, such as, for example, carbon, stainless steel, other conductive materials, etc., may suffice.

Arc-initiating trigger element 2047 is preferably momentarily contacted to cathode 2030 so that electrical current flows between the electrodes. Arc-initiating trigger element 2047 preferably is then withdrawn and the electricity arcs between arc-initiating trigger element 2047 and cathode 2030. The visible electric arc preferably remains and moves randomly around cathode 2030 and vaporizes magnesium and nickel into a plasma as it moves across the surface of cathode 2030, preferably with a delivered current of between about 25 amperes and about 150 amperes. The vaporized magnesium and nickel plasma particles are preferably directed by the magnetic field created by electromagnet 2050 and the electric potentials between substrate 2020 and cathode 2030. The ion energy is preferably relative to the ion current and the partial pressure in process chamber 2015. The thermal velocities and the electric potentials accelerate the magnesium plasma species with a kinetic energy of about 8 eV in the $5 \times 10^{-7}$ Torr vacuum chamber with no added partial gas pressure and an arc current of about 150 amperes and a substrate potential of about $-100$ volts. The film coating is preferably deposited with a DC bias on the conductive stainless steel substrate and without addition of hydrogen gas. The magnesium rich plasma is preferably readily visible through glass portals in process chamber 2015, not shown, with a bright greenish blue color with spectral peaks at 516.7, 517.3, and 518.4 nm. The film of magnesium with grain sizes of less than about 150 nm, and most commonly about 50 nm is preferably deposited with columnar structures induced by magnetic field modulation to a thickness of about 15 microns to about 20 microns in less than about 2 minutes.

Alternatively, other non-conducting substrates preferably may be utilized, including Kapton® and NiTi with the coupling of a radiofrequency voltage source to the substrate rather than the DC bias, as previously discussed above.

Example 2

Referring to also to FIG. 24, there is depicted a schematic representation of filtered cathodic arc deposition apparatus 2010 suitable for performing the preferred steps of material manufacturing method 2000 for forming a primarily magnesium hydride and magnesium and nickel hydride hydrogen storage material preferably resulting with preferred grain sizes and micro and nano-structures. Such hydrogen storage material preferably is prepared with absorbed hydrogen and is capable of desorption of hydrogen, therein contained, by excitation with photon irradiation, as described in this application, and absorbing hydrogen after such desorption. Filtered cathodic arc deposition apparatus 2010 is preferably configured and operated so as to produce magnesium hydride and magnesium hydride plus nickel and nickel hydride films in a vacuum with a partial gas pressure of about 0.0005 Torr ($5 \times 10^{-4}$ Torr). Such magnesium hydride and magnesium hydride plus nickel and nickel hydride films preferably comprise a thickness of between about 20 microns and about 30 microns. Additionally such magnesium hydride and magnesium hydride plus nickel and nickel hydride films preferably comprise grain sizes between about 150 nm and about 400 nm, with an average near about 225 nm. Process chamber 2015 of filtered cathodic arc deposition apparatus 2010 is preferably evacuated to a vacuum of about $5 \times 10^{-7}$ Torr, preferably by at least one turbomolecular pump 2070 and at least one rotary vane pump 2075. Process chamber 2015, substrate holder 2025 and cathode holder 2035 are preferably cooled with at least one coolant circulator sub-system 2080, preferably circulating at least one water and glycol solution 2085. Substrate holder 2025, coupled to negative biasing controller 2065, preferably provides a secondary potential to substrate 2020 with a negative potential comprising about $-100$ volts. Substrate 2020 (preferably nickel titanium) is preferably placed in contact with substrate holder 2025 to provide the indicated negative potential, and is preferably placed about 25 cm above cathode 2030 (preferably magnesium and nickel). Upon reading the teachings of this specification, those skilled in the art will now appreciate that, under appropriate circumstances, considering such issues as cost, future materials, future technologies, etc., other substrates, such as, for example, stainless steel, Kapton®, nickel foil, silicon, etc., may suffice.

Electrical potential is preferably established between substrate 2020 and cathode 2030. Additionally, a magnetic field, comprising about 0.01 Tesla, is preferably established with electromagnet 2050, comprising copper coils 2055 wound around cathode holder 2035. Wave controllable voltage source 2060, preferably comprising a first square wave voltage source with low voltage and high amperage, is preferably operably coupled to cathode 2030 to provide the electric arc which operates on the magnesium and nickel source. A partial pressure of filter-dried ultra-high purity hydrogen gas is preferably allowed to enter the chamber while controlled by at least one mass flow controller 2090 until a partial pressure in the chamber has risen to about $1 \times 10^{-5}$ Torr. Triggering anode 2045 preferably comprises at least one arc-initiating trigger element 2047, preferably comprising tungsten. Arc-initiating trigger element 2047 is preferably brought into close proximity with cathode 2030. Upon reading the teachings of this specification, those skilled in the art will now appreciate that, under appropriate circumstances, considering such issues as cost, future technologies, available materials, etc., other trigger elements, such as, for example, carbon, stainless steel, other conductive materials, etc., may suffice.

Arc-initiating trigger element 2047 is preferably momentarily contacted to cathode 2030 so that electrical current flows between the electrodes. Arc-initiating trigger element 2047 preferably is then withdrawn and the electricity arcs between arc-initiating trigger element 2047 and cathode 2030. The visible electric arc preferably remains and moves randomly around cathode 2030 and vaporizes magnesium and nickel into a plasma as it moves across the surface of cathode 2030, preferably with a delivered current of between about 25 and about 150 amperes. The vaporized magnesium and nickel plasma particles are preferably directed by the magnetic field created by electromagnet 2050 and the electric potentials between substrate 2020 and cathode 2030. The ion energy is preferably relative to the ion current and the partial pressure in process chamber 2015. The pressure in the chamber is preferably adjusted by the control of hydrogen gas to a partial pressure between about $1 \times 10^{-5}$ Torr and about $1 \times 10^{-4}$ Torr. The thermal velocities and the electric potentials preferably accelerate the magnesium plasma species with a kinetic energy of about 8 eV, however contact with hydrogen creates hydrogen ions and degrades the energy of the magnesium. A significant portion of the magnesium ions then preferably combine with hydrogen ions to form magnesium hydride. The resulting magnesium hydride particles have a significantly reduced kinetic energy and electrical potential. The use of a high power, high frequency (13.56 MHz) radio frequency voltage source and impedance matching network preferably assists in the direction of the plasma and recombined species toward the substrate. The arc current of 200 amperes and a substrate potential of −150 volts, along with the high power RF voltage source preferably produces a magnesium, magnesium hydride, nickel and nickel hydride film coating on the non-conductive nickel titanium substrate with grain sizes of about 150 nm to about 300 nm, and most commonly about 225 nm, with columnar and angular structures induced by magnetic field modulation and differential species potentials to a thickness of about 20 microns to about 30 microns in about 4 minutes.

Example 1 and Example 2 represent the fabrication of a preferred magnesium and preferred magnesium plus nickel thin films which incorporate, as part of the invention, the storage of hydrogen in a material which absorbs or contains hydrogen for desorption and adsorption of hydrogen by laser irradiation. These films are preferably stacked, preferably up to 7 layers thick, for increased storage capacity and preferably plasmonic interaction effects between layers, as previously discussed. These films are preferably further processed with laser hole drilling, after stacking, to incorporate light beam channels which facilitate hydrogen absorption, desorption, stress relaxation, and light penetration (see at least FIG. 23). The storage capacity of these layered materials is preferably similar to other methods of fabrication mentioned previously with a maximum near 5 percent, by weight, hydrogen.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A hydrogen energy method comprising the steps of:
   a) using at least one material deposition apparatus structured and arranged to manufacture at least one hydrogen storer; and
   b) manufacturing such at least one hydrogen storer structured and arranged to store at least one substantial amount of hydrogen;
   c) wherein such at least one hydrogen storer comprises at least one hydrogen-release permitter structured and arranged to permit photonic-excitation-assisted release of stored hydrogen from such at least one hydrogen storer; and
   d) providing such at least one hydrogen storer to assist at least one use of hydrogen gas.

2. The hydrogen energy method according to claim 1 wherein the step of using at least one material deposition apparatus comprises the step of using at least one filtered cathodic arc deposition apparatus.

3. The hydrogen energy method according to claim 2 wherein the step of manufacturing such at least one hydrogen storer comprises the step of forming at least one layer of hydrogen storer material.

4. The hydrogen energy method according to claim 3 wherein such hydrogen storer material comprises magnesium.

5. The hydrogen energy method according to claim 3 wherein such hydrogen storer material comprises magnesium hydride.

6. The hydrogen energy method according to claim 3 wherein the step of manufacturing such at least one hydrogen storer further comprises the step of forming alternating layers comprising such at least one layer of hydrogen storer material and at least one layer of Nitinol.

7. The hydrogen energy method according to claim 6 wherein such hydrogen storer material comprises magnesium.

8. The hydrogen energy method according to claim 6 wherein such hydrogen storer material comprises magnesium hydride.

9. The hydrogen energy method according to claim 3 wherein the step of forming at least one layer of hydrogen storer material comprises the step of deposition of such hydrogen storer material on at least one substrate structured and arranged to receive deposition of such hydrogen storer material.

10. The hydrogen energy method according to claim 9 wherein such at least one substrate comprises stainless steel.

11. The hydrogen energy method according to claim 10 wherein such hydrogen storer material comprises magnesium.

12. The hydrogen energy method according to claim 9 wherein such at least one substrate comprises Nitinol.

13. The hydrogen energy method according to claim 12 wherein such hydrogen storer material comprises magnesium hydride.

14. The hydrogen energy method according to claim 3 wherein the step of forming at least one layer of hydrogen storer material comprise the step of creating at least one magnetic field encompassing such hydrogen storer material during formation of such at least one layer.

15. The hydrogen energy method according to claim 1 wherein such at least one hydrogen storer comprises a thickness greater than about 15 microns.

16. The hydrogen energy method according to claim 15 wherein such at least one hydrogen storer comprises a thickness between about 15 microns and about 30 microns.

17. The hydrogen energy method of claim 1 further comprising the step of forming at least one pattern of cavities structured and arranged to provide substantially uniform porosity.

18. The hydrogen energy method according to claim 17 wherein said at least one pattern of cavities comprises at least one angle, with respect to at least one surface of hydrogen storer material, of about 45°.

19. The system according to claim 18 wherein each of said cavities comprises a diameter of about 50 μm.

20. The hydrogen energy method according to claim 1 wherein the step of manufacturing such at least one hydrogen storer comprises the step of forming such at least one hydrogen storer as a disk.

21. The hydrogen energy method according to claim 1 wherein said at least one hydrogen storer comprises:
   a) a unified matrix of granules in a material structured and arranged to cyclically store hydrogen and release stored hydrogen; and
   b) wherein controlled storage and release of hydrogen is achieved.

22. The hydrogen energy method according to claim 21 wherein said unified matrix of granules comprises grain sizes less than about 300 nm.

23. The hydrogen energy method according to claim 22 wherein said unified matrix of granules comprises grain sizes less than about 150 nm.

* * * * *